US012327425B2

(12) United States Patent
Yebes Torres et al.

(10) Patent No.: US 12,327,425 B2
(45) Date of Patent: Jun. 10, 2025

(54) METHODS, SYSTEMS, ARTICLES OF MANUFACTURE, AND APPARATUS FOR DECODING PURCHASE DATA USING AN IMAGE

(71) Applicant: Nielsen Consumer LLC, New York, NY (US)

(72) Inventors: Jose Javier Yebes Torres, Valladolid (ES); Aditi Sinha, Weehawken, NY (US); Christine Lebrun, Paris (FR); Fabio Oppini, Milan (IT); Atul Bansal, New York, NY (US); Mukul Kumar, New York, NY (US); Vignesh Chandramouli, New York, NY (US); Filipa Sousa, New York, NY (US); Gisella Mercaldi, Oxford (GB)

(73) Assignee: Nielsen Consumer LLC, Chicago, IL (US)

( * ) Notice: Subject to any disclaimer, the term of this patent is extended or adjusted under 35 U.S.C. 154(b) by 412 days.

(21) Appl. No.: 17/710,649

(22) Filed: Mar. 31, 2022

(65) Prior Publication Data
US 2023/0005286 A1   Jan. 5, 2023

Related U.S. Application Data

(60) Provisional application No. 63/214,571, filed on Jun. 24, 2021.

(51) Int. Cl.
*G06V 30/146*   (2022.01)
*G06Q 30/0283*  (2023.01)
(Continued)

(52) U.S. Cl.
CPC ....... *G06V 30/416* (2022.01); *G06Q 30/0283* (2013.01); *G06V 30/147* (2022.01);
(Continued)

(58) Field of Classification Search
CPC .... G06V 30/416; G06V 30/147; G06V 30/15; G06V 30/413; G06V 30/414; G06Q 30/0283
See application file for complete search history.

(56) References Cited

U.S. PATENT DOCUMENTS

| 3,323,135 A | 6/1967 | Miller |
| 5,410,611 A | 4/1995 | Huttenlocher et al. |

(Continued)

FOREIGN PATENT DOCUMENTS

| CA | 2957433 A1 | 9/2017 |
| CA | 2957433 C | 6/2020 |

(Continued)

OTHER PUBLICATIONS

Leicester et al., "Using Scanner Technology to Collect Expenditure Data," Fiscal Studies, vol. 30, Issue 3-4, 2009, 29 pages.

(Continued)

*Primary Examiner* — Qun Shen
(74) *Attorney, Agent, or Firm* — HANLEY, FLIGHT & ZIMMERMAN, LLC

(57) ABSTRACT

Methods, apparatus, systems, and articles of manufacture are disclosed that decode purchase data using an image. An example apparatus includes processor circuitry to execute machine readable instructions to at least crop an image of a receipt based on detected regions of interest, apply a first mask to a first cropped image to generate first bounding boxes corresponding to rows of the receipt, apply a second mask to a second cropped image to generate second bounding boxes corresponding to columns of the receipt, generate a structure of the receipt by mapping words detected by an optical character recognition engine to corresponding first bounding boxes and second bounding boxes based on a mapping criterion, classify the second bounding boxes by identifying an expression of interest in ones of the second (Continued)

bounding boxes, and generate purchase information by extracting text of interest from the structured receipt based on the classifications.

20 Claims, 38 Drawing Sheets

(51) Int. Cl.
    *G06V 30/148*     (2022.01)
    *G06V 30/413*     (2022.01)
    *G06V 30/414*     (2022.01)
    *G06V 30/416*     (2022.01)

(52) U.S. Cl.
    CPC ............ *G06V 30/15* (2022.01); *G06V 30/413* (2022.01); *G06V 30/414* (2022.01)

(56) References Cited

U.S. PATENT DOCUMENTS

| | | |
|---|---|---|
| 5,606,690 A | 2/1997 | Hunter et al. |
| 7,454,063 B1 | 11/2008 | Kneisl et al. |
| 7,792,709 B1 | 9/2010 | Trandal et al. |
| 8,285,047 B2 | 10/2012 | Nagarajan et al. |
| 8,494,281 B2 | 7/2013 | Nagarajan |
| 8,787,695 B2 | 7/2014 | Wu |
| 8,792,141 B2 | 7/2014 | Moore et al. |
| 8,983,170 B2 | 3/2015 | Nepomniachtchi et al. |
| 9,014,432 B2 | 4/2015 | Fan et al. |
| 9,158,744 B2 | 10/2015 | Rao et al. |
| 9,239,952 B2 | 1/2016 | Hsu |
| 9,262,686 B1 | 2/2016 | Singer |
| 9,290,022 B2 | 3/2016 | Makabe |
| 9,298,685 B2 | 3/2016 | Barrus |
| 9,298,979 B2 | 3/2016 | Nepomniachtchi et al. |
| 9,323,135 B1 | 4/2016 | Veloso |
| 9,324,073 B2 | 4/2016 | Nepomniachtchi et al. |
| 9,384,389 B1 | 7/2016 | Sankaranarayanan |
| 9,384,839 B2 | 7/2016 | Avila et al. |
| 9,396,540 B1 | 7/2016 | Sampson |
| 9,684,842 B2 | 6/2017 | Deng |
| 9,710,702 B2 | 7/2017 | Nepomniachtchi et al. |
| 9,747,504 B2 | 8/2017 | Ma et al. |
| 9,760,786 B2 | 9/2017 | Sahagun et al. |
| 9,824,270 B1 | 11/2017 | Mao |
| 9,875,385 B1 | 1/2018 | Humphreys |
| 10,032,072 B1 | 7/2018 | Tran et al. |
| 10,157,425 B2 | 12/2018 | Chelst et al. |
| 10,235,585 B2 | 3/2019 | Deng |
| 10,242,285 B2 | 3/2019 | Thrasher et al. |
| 10,395,772 B1 | 8/2019 | Lucas et al. |
| 10,679,283 B1 | 6/2020 | Pesce |
| 11,032,072 B2 | 6/2021 | Andon |
| 11,256,760 B2 | 2/2022 | Corcoran |
| 11,257,049 B1 | 2/2022 | Durazo Almeida |
| 11,321,956 B1 | 5/2022 | Geng |
| 11,410,446 B2 | 8/2022 | Shanmuganathan et al. |
| 11,414,053 B2 | 8/2022 | Tanaami et al. |
| 11,468,491 B2 | 10/2022 | Dalal |
| 11,476,981 B2 | 10/2022 | Wei et al. |
| 11,562,557 B2 | 1/2023 | Miginnis et al. |
| 11,587,148 B2 | 2/2023 | Elder |
| 11,593,552 B2 | 2/2023 | Sarkar |
| 11,609,956 B2 | 3/2023 | Jain |
| 11,625,930 B2 | 4/2023 | Rodriguez et al. |
| 11,809,985 B2 | 11/2023 | Polania |
| 11,810,383 B2 | 11/2023 | Patel et al. |
| 11,842,035 B2 | 12/2023 | Jahjah et al. |
| 2002/0037097 A1 | 3/2002 | Hoyos et al. |
| 2003/0185448 A1 | 10/2003 | Seeger et al. |
| 2006/0232619 A1 | 10/2006 | Otsuka et al. |
| 2007/0033533 A1* | 2/2007 | Sull ..................... G11B 27/034 715/752 |
| 2007/0041642 A1 | 2/2007 | Romanoff et al. |
| 2008/0205759 A1 | 8/2008 | Zandifar et al. |
| 2009/0164422 A1 | 6/2009 | Pacella |
| 2010/0306080 A1 | 12/2010 | Trandal et al. |
| 2011/0122443 A1 | 5/2011 | Otsuka et al. |
| 2011/0243445 A1 | 10/2011 | Uzelac et al. |
| 2011/0289395 A1 | 11/2011 | Breuel et al. |
| 2011/0311145 A1 | 12/2011 | Bern et al. |
| 2012/0183211 A1 | 7/2012 | Hsu et al. |
| 2012/0274953 A1 | 11/2012 | Makabe |
| 2012/0330971 A1 | 12/2012 | Thomas et al. |
| 2013/0058575 A1 | 3/2013 | Koo et al. |
| 2013/0170741 A9 | 7/2013 | Hsu et al. |
| 2014/0002868 A1 | 1/2014 | Landa et al. |
| 2014/0064618 A1 | 3/2014 | Janssen, Jr. |
| 2014/0188647 A1 | 7/2014 | Argue |
| 2014/0195891 A1 | 7/2014 | Rao et al. |
| 2015/0039479 A1 | 2/2015 | Gotanda |
| 2015/0127428 A1 | 5/2015 | Gharachorloo |
| 2015/0169951 A1 | 6/2015 | Khintsitskiy et al. |
| 2015/0254778 A1 | 9/2015 | Kmak et al. |
| 2015/0317642 A1 | 11/2015 | Argue |
| 2015/0363792 A1 | 12/2015 | Arini |
| 2015/0363822 A1 | 12/2015 | Rowe |
| 2016/0005189 A1* | 1/2016 | Gray .................... G06V 30/413 345/633 |
| 2016/0034863 A1 | 2/2016 | Ross |
| 2016/0063469 A1 | 3/2016 | Etzion |
| 2016/0125383 A1 | 5/2016 | Chan |
| 2016/0171585 A1 | 6/2016 | Singh |
| 2016/0203625 A1 | 7/2016 | Khan et al. |
| 2016/0210507 A1 | 7/2016 | Abdollahian |
| 2016/0234431 A1 | 8/2016 | Kraft et al. |
| 2016/0307059 A1 | 10/2016 | Chaudhury et al. |
| 2016/0342863 A1 | 11/2016 | Kwon et al. |
| 2016/0350954 A1* | 12/2016 | Agarwala ............... G06T 11/60 |
| 2017/0293819 A1 | 10/2017 | Deng |
| 2017/0364450 A1 | 12/2017 | Struttmann |
| 2018/0005345 A1 | 1/2018 | Apodaca et al. |
| 2018/0053045 A1 | 2/2018 | Lorenzini |
| 2018/0060302 A1 | 3/2018 | Liang et al. |
| 2018/0317116 A1 | 11/2018 | Komissarov et al. |
| 2019/0026803 A1 | 1/2019 | De Guzman |
| 2019/0050639 A1 | 2/2019 | Ast |
| 2019/0080207 A1 | 3/2019 | Chang |
| 2019/0130622 A1* | 5/2019 | Hoover .............. G02B 27/0081 |
| 2019/0171900 A1 | 6/2019 | Thrasher et al. |
| 2019/0244020 A1 | 8/2019 | Yoshino et al. |
| 2019/0325211 A1 | 10/2019 | Ordonez et al. |
| 2019/0332662 A1 | 10/2019 | Middendorf |
| 2019/0354818 A1 | 11/2019 | Reisswig et al. |
| 2020/0097718 A1 | 3/2020 | Schäfer |
| 2020/0142856 A1 | 5/2020 | Neelamana |
| 2020/0151444 A1 | 5/2020 | Price |
| 2020/0151902 A1 | 5/2020 | Almazán |
| 2020/0175267 A1 | 6/2020 | Schäfer |
| 2020/0190963 A1* | 6/2020 | Gooneratne ........... H04N 23/00 |
| 2020/0249803 A1 | 8/2020 | Sobel et al. |
| 2020/0279107 A1 | 9/2020 | Staar |
| 2020/0364451 A1 | 11/2020 | Ammar et al. |
| 2020/0401798 A1 | 12/2020 | Foncubierta Rodriguez et al. |
| 2020/0410231 A1* | 12/2020 | Chua ................... G06F 18/2413 |
| 2021/0004880 A1 | 1/2021 | Benkreira et al. |
| 2021/0009163 A1 | 1/2021 | Urtasun |
| 2021/0019287 A1 | 1/2021 | Prasad et al. |
| 2021/0034856 A1 | 2/2021 | Torres et al. |
| 2021/0090694 A1 | 3/2021 | Colley et al. |
| 2021/0117665 A1 | 4/2021 | Simantov |
| 2021/0117668 A1 | 4/2021 | Zhong et al. |
| 2021/0142092 A1 | 5/2021 | Zhao et al. |
| 2021/0149926 A1 | 5/2021 | Komninos et al. |
| 2021/0158038 A1* | 5/2021 | Shanmuganathan .. G06V 30/20 |
| 2021/0216765 A1 | 7/2021 | Xu |
| 2021/0248420 A1 | 8/2021 | Zhong et al. |
| 2021/0295101 A1 | 9/2021 | Tang et al. |
| 2021/0319217 A1 | 10/2021 | Wang et al. |
| 2021/0334737 A1 | 10/2021 | Balaji |
| 2021/0343030 A1 | 11/2021 | Sagonas et al. |
| 2021/0357710 A1 | 11/2021 | Zhang et al. |
| 2021/0406533 A1 | 12/2021 | Arroyo et al. |

(56) References Cited

U.S. PATENT DOCUMENTS

| | | | |
|---|---|---|---|
| 2022/0004756 | A1 | 1/2022 | Jennings |
| 2022/0114821 | A1 | 4/2022 | Arroyo et al. |
| 2022/0189190 | A1 | 6/2022 | Arroyo et al. |
| 2022/0198185 | A1* | 6/2022 | Prebble .......... G06T 11/20 |
| 2022/0383651 | A1 | 12/2022 | Shanmuganathan et al. |
| 2022/0397809 | A1 | 12/2022 | Talpade et al. |
| 2022/0414630 | A1 | 12/2022 | Yebes Torres et al. |
| 2023/0004748 | A1 | 1/2023 | Rodriguez et al. |
| 2023/0005286 | A1 | 1/2023 | Yebes Torres et al. |
| 2023/0008198 | A1 | 1/2023 | Gadde et al. |
| 2023/0196806 | A1 | 6/2023 | Ramalingam et al. |
| 2023/0214899 | A1 | 7/2023 | Martínez Cebrián et al. |
| 2023/0230408 | A1 | 7/2023 | Arroyo et al. |
| 2023/0394859 | A1 | 12/2023 | Montero et al. |

FOREIGN PATENT DOCUMENTS

| | | | | |
|---|---|---|---|---|
| CN | 100369049 | C * | 2/2008 | .......... G06K 9/00463 |
| CN | 103123685 | A | 5/2013 | |
| CN | 104866849 | A | 8/2015 | |
| CN | 108229397 | A | 6/2018 | |
| CN | 108829397 | A | 11/2018 | |
| CN | 109389124 | A | 2/2019 | |
| CN | 108229397 | B | 8/2020 | |
| CN | 112446351 | A | 3/2021 | |
| CN | 112560862 | A | 3/2021 | |
| CN | 112907973 | B * | 4/2023 | ........... G08G 1/0175 |
| DE | 202013005144 | U1 | 10/2013 | |
| GB | 2595412 | A | 11/2021 | |
| JP | H0749529 | A | 2/1995 | |
| JP | 2008021850 | A | 1/2008 | |
| JP | 2008210850 | A | 9/2008 | |
| JP | 2008211850 | A | 9/2008 | |
| JP | 2019139737 | A | 8/2019 | |
| JP | 7049529 | B2 | 4/2022 | |
| KR | 101831204 | B1 | 2/2018 | |
| TW | 200821850 | A | 5/2008 | |
| WO | 2013044145 | A1 | 3/2013 | |
| WO | 2018054326 | A1 | 3/2018 | |
| WO | 2018201423 | A1 | 11/2018 | |
| WO | 2020194004 | A1 | 10/2020 | |
| WO | 2022006295 | A1 | 1/2022 | |
| WO | 2022123199 | A1 | 6/2022 | |

OTHER PUBLICATIONS

United States and Patent and Trademark Office, "Non-Final Office Action," issued in connection with U S. Appl. No. 17/566,135, dated Mar. 27, 2024, 13 pages.

United States Patent and Trademark Office, "Non-Final Office Action," issued in connection with U.S. Appl. No. 18/476,978, dated Apr. 18, 2024, 20 pages.

United States Patent and Trademark Office, "Notice of Allowance and Fee(s) Due," issued in connection with U.S. Appl. No. 17/710,538, dated Apr. 19, 2024, 8 pages.

United States Patent and Trademark Office, "Non-Final Office Action," issued in connection with U.S. Appl. No. 17/710,660, on May 28, 2024, 9 pages.

Canadian Intellectual Property Office, "Office Action," issued in connection with U.S. Pat. No. 3,182,471, dated May 28, 2024, 5 pages.

Arroyo et al., "Multi-label classification of promotions in digital leaflets using textual and visual information", Proceedings of the Workshop on Natural Language Processing in E-Commerce (EComNLP), pp. 11-20 Barcelona, Spain (Online), Dec. 12, 2020, 10 pages.

Levenshtein, "Binary Codes Capable of Correcting Deletions, Insertions, and Reversals," Soviet Physics-Doklady, Cybernetics and Control Theory, vol. 10, No. 8, Feb. 1966, 4 pages.

Smith et al., "Identification of Common Molecular Subsequences," Reprinted Journal of Molecular Biology, Academic Press Inc., 1981, 3 pages.

Govindan et al., "Character Recognition—A Review," Pattern Recognition, vol. 23, No. 7, Jul. 1990, 13 pages.

Poulovassilis et al., "A Nested-Graph Model for the Representation and Manipulation of Complex Objects," ACM Transactions on Information Systems, vol. 12, Jan. 1994, 34 pages.

Hochreiter et al., "Long Short-Term Memory," Neural Computation, vol. 8, Issue 9, Nov. 1997, 46 pages.

Ng et al., "On Spectral Clustering: Analysis and an Algorithm," 14th International Conference on Neural Information Processing Systems: Natural and Synthetic, Jan. 2001, 8 pages.

Crandall et al., "Extraction of Special Effects Caption Text Events from Digital Video," International Journal on Document Analysis and Recognition, 2003, 20 pages.

Lowe, "Distinctive Image Features from Scale-Invariant Key points," International Journal of Computer Vision (HCV), vol. 60, published Nov. 2004, 20 pages.

Marinai, "Introduction to Document Analysis and Recognition," Machine Learning in Document Analysis and Recognition, published 2008, 20 pages.

Vogel et al., "Parallel Implementations of Word Alignment Tool," Software Engineering, Testing, and Quality Assurance for Natural Language Processing, Jun. 2008, 10 pages.

O'Gorman et al., "Document Image Analysis," IEEE Computer Society Executive Briefings, dated 2009, 125 pages.

Oliveira et al., "A New Method for Text-Line Segmentation for Warped Documents," International Conference Image Analysis and Recognition, Jun. 21, 2010, 11 pages.

Krizhevsky et al., "ImageNet Classification with Deep Convolutional Neural Networks," In International Conference on Neural Information Processing Systems (NIPS), published 2012, 9 pages.

Chung et al. "Empirical Evaluation of Gated Recurrent Neural Networks on Sequence Modeling," ArXiv abs/1412.3555, Dec. 2014, 9 pages.

Nshuti, "Mobile Scanner and OCR (A First Step Towards Receipt to Spreadsheet)," Stanford University, published 2015, 3 pages.

Ronneberger et al., "U-Net: Convolutional Networks for Biomedical Image Segmentation," Medical Image Computing and Computer-Assisted Intervention (MICCAI), dated May 18, 2015, 8 pages.

Lecun et al., "Deep Learning," Nature, vol. 521, published May 28, 2015, 9 pages.

Genereux et al., "NLP Challenges in Dealing with OCR-ed Documents of Derogated Quality," Workshop on Replicability and Reproducibility in Natural Language Processing, IJCAI, dated Jul. 2015, 6 pages.

Ren et al., "Faster R-CNN: Towards Real-Time Object Detection with Region Proposal Networks," In International Conference on Neural Information Processing Systems (NIPS), Dec. 7, 2015, 14 pages.

Kim et al., "Character-Aware Neural Language Models," Proceedings of the Thirtieth AAAI Conference on Artificial Intelligence (AAAI'IO), pp. 2741-2749, 2016, 9 pages.

Redmon et al., "You Only Look Once: Unified, Real-Time Object Detection," In Conference on Computer Vision and Pattern Recognition (CVPR), dated May 9, 2016, 10 pages.

Osindero et al., "Recursive Recurrent Nets with Attention Modeling for OCR in the Wild," in Conference on Computer Vision and Pattern Recognition (CVPR), dated Jun. 27, 2016, 10 pages.

Joulin et al., "Bag of Tricks for Efficient Text Classification," 15th Conference of the European Chapter of the Association for Computational Linguistics, dated Aug. 9, 2016, 5 pages.

Konda et al., "Magellan: Toward Building Entity Matching Management Systems Over Data Science Stacks," Proceedings of the VLDB Endowment, vol. 9, No. 13, dated 2016, 4 pages.

Kipf et al., "Semi-Supervised Classification with Graph Convolutional Networks," 5th International Conference on Learning Representations, Apr. 24, 2017, 14 Pages.

Bojanowski et al., "Enriching Word Vectors with Subword Information," In Journal Transactions of the Association for Computational Linguistics, 2017, vol. 5, dated Jun. 2017, 12 pages.

Ozhiganov et al., "Deep Dive Into OCR for Receipt Recognition," DZone, dated Jun. 21, 2017, 18 pages.

(56) References Cited

OTHER PUBLICATIONS

Bartz et al., "STN-OCT: A Single Neural Network for Text Detection and Text Recognition," Computer Vision and Pattern Recognition, dated Jul. 27, 2017, 9 pages.
Vaswani et al., "Attention is all you need," Advances in Neural Information Processing Systems, 31st Conference on Neural Information Processing Systems (NIPS 2017), last revised Dec. 6, 2017, 15 pages.
Hui, "mAP (mean Average Precision) for Object Detection," URL:[https://medium.com/@jonathan hui/map-mean-average-precision-for-object-detection-45c21a311731], Mar. 6, 2018, 2 pages.
Velickovic et al., "Graph Attention Networks," 2018 International Conference on Learning Representations, 2018, 12 pages.
Mudgal et al., "Deep Learning for Entity Matching: A Design Space Exploration," 2018 International Conference on Management of Data, dated Jun. 10, 2018, 16 pages.
Wick et al., "Calamari—A High-Performance Tensorflow-based Deep Learning Package for Optical Character Recognition," Digital Humanities Quarterly, Jul. 5, 2018, 12 pages.
Akbik et al., "Contextual String Embeddings for Sequence Labeling," Proceedings of the 27th International Conference on Computational Linguistics (COLING), dated Aug. 2018, 12 pages.
Follmann et al., "MVTec D2S: Densely Segmented Supermarket Dataset," European Conference on Computer Vision (ECCV), dated 2018, 17 pages.
Ray et al., "U-PC: Unsupervised Planogram Compliance," in European Conference on Computer Vision (ECCV), 2018, 15 pages.
Li et al., "Extracting Figures and Captions from Scientific Publications," Short Paper, 27th ACM Conference on Information and Knowledge Management, CIKM'18, Oct. 22-26, 2018, Torino, Italy, 4 pages.
Elfwing et al. "Sigmoid-Weighted Linear Units for Neural Network Function Approximation in Reinforcement Learning," Neural Networks: Journal of the International Neural Network Society, vol. 107, Nov. 2018, 18 pages.
Huang et al., "Mask R-CNN with Pyramid Attention Network for Scene Text Detection," 2019 IEEE Winter Conference on Applications of Computer Vision, Jan. 2019, 9 pages.
Wikipedia, "Precision & Recall," URL:[https://en.wikipedia.org/wiki/Precision_and_recall], last edited Dec. 17, 2018, 12 pages.
A2ia, "Intelligent Automation Eliminates Manual Data Entry From Complex Documents," Artificial Intelligence & Image Analysis, White Paper, accessed on Jan. 30, 2019, 3 pages.
A2ia, "Historic Document Conversion," Artificial Intelligence & Image Analysis, Industry Paper, accessed on Jan. 30, 2019, 4 pages.
Loshchilov et al., "Decoupled Weight Decay Regularization," 2019 International Conference on Learning Representations, May 6, 2019, 19 pages.
Nathancy, "How do I make masks to set all of image background, except the text, to white?", URL: [https://stackoverflow.com/questions/56465359/how-do-i-make-masks-to-set-all-of-image-background-except-the-text-to-white], Jun. 5, 2019, 5 pages.
Devlin et al., "BERT: Pre-training of Deep Bidirectional Transformers for Language Understanding," Conference of the North American Chapter of the Association for Computational Linguistics (NAACL-HLT), Jun. 24, 2019, 16 pages.
Qasim et al., "Rethinking Table Recognition using Graph Neural Networks," In International Conference on Document Analysis and Recognition (ICDAR), Jul. 3, 2019, 6 pages.
Feng et al., "Computer vision algorithms and hardware implementations: A survey," Integration: the VLSI Journal, vol. 69, dated Jul. 27, 2019, 12 pages.
Hu et al., "Hierarchical Graph Convolutional Networks for Semi-supervised Node Classification," ArXiv abs/1902.06667, Jun. 10, 2019, 8 pages.
Oliveira et al., "dhSegment: A Generic Deep-Learning Approach for Document Segmentation," 16th International Conference on Frontiers in Handwriting Recognition (ICFHR), dated Aug. 14, 2019, 6 pages.
Zhong et al., "PubLayNet: Largest Dataset Ever for Document Layout Analysis," International Conference on Document Analysis and Recognition (ICDAR), dated Aug. 16, 2019, 8 pages.
Guillaume et al., "FUNSD: A Dataset for Form Understanding in Noisy Scanned Documents," International Conference on Document Analysis and Recognition (ICDAR), Sep. 20, 2019, 6 pages.
Yadati et al., "HyperGCN: Hypergraph Convolutional Networks for Semi-Supervised Classification," 33rd International Conference on Neural Information Processing Systems, Dec. 2019, 18 pages.
International Searching Authority, "Written Opinion," issued in connection with International Patent Application No. PCT/IB2019/000299, mailed on Dec. 23, 2019, 4 pages.
International Searching Authority, "International Search Report," issued in connection with International Patent Application No. PCT/IB2019/000299, mailed on Dec. 23, 2019, 3 pages.
Github, "Tesseract OCR," Tesseract Repository on GitHub, URL:[https://github.com/tesseract-ocr/], 2020, 3 pages.
Carbonell et al., "Named Entity Recognition and Relation Extraction with Graph Neural Networks in Semi Structured Documents," 2020 International Conference on Pattern Recognition (ICPR), Jan. 10, 2021, 6 pages.
Zacharias et al., "Image Processing Based Scene-Text Detection and Recognition with Tesseract," arXiv (CoRR), dated Apr. 17, 2020, 6 pages.
Liu et al. "ROBERTa: A Robustly Optimized BERT Pretraining Approach." ArXiv abs/1907.11692, Jul. 26, 2019, 13 pages.
Xu et al., "LayoutLM: Pre-training of Text and Layout for Document Image Understanding," International Conference on Knowledge Discovery & Data Mining (SIGKDD), Jun. 16, 2020, 9 pages.
Dong et al., "HNHN: Hypergraph Networks with Hyperedge Neurons," ArXiv abs/2006.12278, dated Jun. 22, 2020, 11 pages.
Yu et al., "PICK: Processing Key Information Extraction from Documents using Improved Graph Learning-Convolutional Networks," in International Conference on Pattern Recognition (ICPR), Jul. 18, 2020, 8 pages.
Chen et al., "HGMF: Heterogeneous Graph-Based Fusion for Multimodal Data with Incompleteness," 26th ACM SIGKDD International Conference on Knowledge Discovery & Data Mining, KDD '20, Aug. 23-27, 2020, Virtual Event, USA, 11 pages.
Wang et al., "DocStruct: A Multimodal Method to Extract Hierarchy Structure in Document for General Form Understanding," 2020 Conference Empirical Methods in Natural Language Processing (EMNLP), Nov. 16, 2020, 11 pages.
Zhu et al., "Heterogeneous Mini-Graph Neural Network and Its Application to Fraud Invitation Detection," 2020 IEEE International Conference on Data Mining (ICDM), Nov. 17, 2020, 9 pages.
Bandyopadhyay et al., "Hypergraph Attention Isomorphism Network by Learning Line Graph Expansion." 2020 IEEE International Conference on Big Data, 2020, 10 pages.
Arroyo et al., "Multi-label classification of promotions in digital leaflets using textual and visual information," Proceedings of the Workshop on Natural Language Processing in E-Commerce, Dec. 12, 2020, 10 pages.
Deepdive, "Distant Supervision," Stanford University, URL:[http://deepdive.stanford.edu/distant supervision], Apr. 1, 2022, 2 pages.
Nguyen et al. "End-to-End Hierarchical Relation Extraction for Generic Form Understanding", International Conference on Pattern Recognition (ICPR), Jun. 2, 2021, 8 pages.
International Searching Authority, "International Search Report," issued in connection with International Patent Application No. PCT/US2020/061269, mailed on Mar. 11, 2021, 3 pages.
International Searching Authority, "Written Opinion," issued in connection with International Patent Application No. PCT/US2020/061269, mailed on Mar. 11, 2021, 4 Pages.
United States Patent and Trademark Office, "Non-Final Office Action," issued in connection with U.S. Appl. No. 16/692,797, dated Mar. 16, 2021, 12 pages.
Google, "Detect Text in Images," URL:[http://cloud.google.com/vision/docs/ocr], Mar. 29, 2021, 16 pages.
Xu et al., "LayoutXLM: Multimodal Pre-training for Multilingual Visually-rich Document Understanding," arXiv, Sep. 9, 2021, 10 pages.

(56) References Cited

OTHER PUBLICATIONS

Ma et al., "Graph Attention Networks with Positional Embeddings," Advances in Knowledge Discovery and Data Mining, Oct. 24, 2021, 13 pages.
Chen et al., "TextPolar: Irregular Scene Text Detection Using Polar Representation," International Journal on Document Analysis and Recognition (IJDAR), May 23, 2021, 9 pages.
Li et al., "SelfDoc: Self-Supervised Document Representation Learning." 2021 IEEE/CVF Conference on Computer Vision and Pattern Recognition (CVPR), Jun. 20, 2021, 10 pages.
Hwang et al., "Spatial Dependency Parsing for Semi-Structured Document Information Extraction," International Joint Conference on Natural Language Processing (IJCNLP), Jul. 1, 2021, 14 pages.
Li et al., "StructuralLM: Structural Pre-training for Form Understanding," 59th Annual Meeting of the Association for Computational Linguistics, May 2, 2021, 10 pages.
Xu et al., "LayoutLMv2: Multi-modal Pre-training for Visually-rich Document Understanding," ACL Main Conference, Jan. 10, 2022, 13 pages.
Huang et al., "UniGNN: a Unified Framework for Graph and Hypergraph Neural Networks," International Joint Conference on Artificial Intelligence (IJCAI), May 3, 2021, 9 pages.
Tang et al., "MatchVIE: Exploiting Match Relevancy between Entities for Visual Information Extraction", Proceedings of the Thirtieth International Joint Conference on Artificial Intelligence (IJCAI-21) 2021, 7 pages.
Qian et al., "A Region-Based Hypergraph Network for Joint Entity-Relation Extraction," ScienceDirect, Knowledge- Based Systems, vol. 228, Sep. 27, 2021, 8 pages.
Prabhu et al., "MTL-FoUn: A Multi-Task Learning Approach to Form Understanding," 2021 International Conference on Document Analysis and Recognition (ICDAR), Sep. 5, 2021, 5 pages.
Davis et al., "Visual FUDGE: Form Understanding via Dynamic Graph Editing," International Conference on Document Analysis and Recognition (ICDAR), arXiv, Jul. 16, 2021, 16 pages.
Powalski et al., "Going Full-TILT Boogie on Document Understanding with Text-Image-Layout Transformer," International Conference on Document Analysis and Recognition, arXiv, Mar. 2, 2021, 17 pages.
Shen et al., "LayoutParser: A Unified Toolkit for Deep Learning Based Document Image Analysis," in International Conference on Document Analysis and Recognition (ICDAR), arXiv, Jun. 21, 2021, 16 pages.
Garncarek et al., "LAMBERT: Layout-Aware Language Modeling for Information Extraction," ICDAR, arXiv, May 28, 2021, 16 pages.
Hong et al., "Bros: A Pre-Trained Language Model Focusing on Text and Layout for Better Key Information Extraction from Documents," 36th AAAI Conference on Artificial Intelligence, arXiv, Sep. 10, 2021, 13 pages.
Appalaraju et al., "DocFormer: End-to-End Transformer for Document Understanding," ICCV Open Access, arXiv, Sep. 20, 2021, 22 pages.
International Searching Authority, "International Preliminary Report on Patentability," issued in connection With International Patent Application No. PCT/IB2019/000299, issued on Sep. 28, 2021,5 pages.
Li et al., "StrucTexT: Structured Text Understanding with Multi-Modal Transformers," ACM International Conference on Multimedia (ACM Multimedia), arXiv, Nov. 8, 2021, 9 pages.
United States Patent and Trademark Office, "Final Office Action," issued in connection with United States U.S. Appl. No. 16/692,797, dated Oct. 27, 2021, 14 pages.
International Searching Authority, "Written Opinion," issued in connection with International Patent Application No. PCT/US2021/039931, mailed on Nov. 4, 2021, 4 pages.
International Searching Authority, "International Search Report," issued in connection with International Patent Application No. PCT/US2021/039931, mailed on Nov. 4, 2021, 3 pages.
Zhang et al., "Entity Relation Extraction as Dependency Parsing in Visually Rich Documents," Empirical Methods in Natural Language Processing (EMNLP), Nov. 7, 2021, 10 pages.
Hwang et al., "Cost-Effective End-to-end Information Extraction for Semi-structured Document Images," Empirical Methods in Natural Language Processing (EMNLP), arXiv, Aug. 30, 2021, 9 pages.
Datasetlist, "Annotation tools for building datasets," Labeling Tools-List of Labeling Tools, URL:[retrieved from: https://www.datasetlist.com/tools/], Dec. 2021, 12 pages.
Gu et al., "UniDoc: Unified Pretraining Framework for Document Understanding," Neural Information Processing Systems (NeurIPS), Dec. 6, 2021, arXiv, Apr. 28, 2022, 12 pages.
Park et al., "CORD: A Consolidated Receipt Dataset for Post-OCR Parsing. In Workshop on Document Intelligence," Neural Information Processing Systems (NeurIPS), 2019, 4 pages.
United Kingdom Intellectual Property Office, "Notification of Grant," issued in connection with U.K. Patent Application No. 2112299.9, dated Aug. 29, 2023, 2 pages.
Amazon, "Intelligent Document Processing," Amazon Web Services, URL:[https://aws.amazon.com/machine-learning/ml-use-cases/document-processing/fintech/], Sep. 8, 2023, 6 pages.
United States Patent and Trademark Office, "Corrected Notice of Allowability," issued in connection with U.S. Appl. No. 17/075,675, dated Oct. 10, 2023, 2 pages.
United States Patent and Trademark Office, "Non-Final Office Action," issued in connection with U.S. Appl. No. 17/710,538, dated Oct. 26, 2023, 6 Pages.
European Patent Office, "Extended European Search Report," issued in connection with European Patent Application No. 20891012.5, dated Nov. 17, 2023, 12 pages.
United States Patent and Trademark Office, "Non-Final Office Action," issued in connection with U.S. Appl. No. 17/598,792, dated Dec. 29, 2023, 17 pages.
International Searching Authority, "International Preliminary Report on Patentability," issued in connection with International Patent Application No. PCT/US2022/034570, issued on Jan. 4, 2024, 7 pages.
United States Patent and Trademark Office, "Non-Final Office Action," issued in connection with U.S. Appl. No. 18/191,642, dated Feb. 7, 2024, 18 pages.
Wang et al. "LiLT: A Simple yet Effective Language-Independent Layout Transformer for Structured Document Understanding", in Annual Meeting of the Association for Computational Linguistics (ACL), arXiv, Feb. 28, 2022, 11 pages.
United States Patent and Trademark Office, "Advisory Action," issued in connection with U.S. Appl. No. 16/692,797, dated Feb. 16, 2022, 2 pages.
Datasetlist, "Labeling Tools—List of Labeling Tools," Datasetlist.com, URL:[https://www.datasetlist.com/tools/updated], Dec. 2021, 14 pages.
Nielseniq, "Nielsen Brandbank Product Library—Power the Path to Purchase With Brand Approved Content" URL:[https://www.brandbank.com/us/product-librarv/], retrieved on Apr. 1, 2022. 5 pages.
Github, "Fiat tool—Fast Image Data Annotation Tool," URL:[https://github.com/christopher5106/FastAnnotationTool], downloaded on Apr. 1, 2022, 30 pages.
United States Patent and Trademark Office, "Notice of Allowance and Fee(s) Due," issued in connection with U.S. Appl. No. 16/692,797, dated Apr. 5, 2022, 10 pages.
Github, "Doccano Tool," URL:[https://github.com/doccano/doccano], downloaded on Apr. 11, 2022, 12 pages.
United States Patent and Trademark Office, "Corrected Notice of Allowability," issued in connection with U.S. Appl. No. 16/692,797, dated Apr. 22, 2022, 3 pages.
International Searching Authority, "International Preliminary Report on Patentability," issued in connection with International Patent Application No. PCT/US2020/061269, issued on May 17, 2022, 5 pages.

(56) References Cited

OTHER PUBLICATIONS

Gu et al., "XYLayoutLM: Towards Layout-Aware Multimodal Networks For Visually-Rich Document Understanding," Conference on Computer Vision and Pattern Recognition (CVPR), Jun. 18, 2022, 10 pages.

Villota et al., "Text Classification Models for Form Entity Linking," International Symposium on Distributed Computing and Artificial Intelligence, arXiv, Dec. 14, 2021, 10 pages.

Datasetlist, "A Tool Using OpenCV to Annotate Images for Image Classification, Optical Character Reading, . . . ," Datasetlist.com, dated Jul. 13, 2022, 30 pages.

United States Patent and Trademark Office, "Non-Final Office Action," issued in connection with U.S. Appl. No. 17/345,940, dated Aug. 18, 2022, 8 pages.

United States Patent and Trademark Office, "Non-Final Office Action," issued in connection with U.S. Appl. No. 17/075,675, dated Sep. 22, 2022, 12 pages.

Huang et al., "LayoutLMv3: Pre-training for Document AI with Unified Text and Image Masking," 30th ACM International Conference on Multimedia, arXiv, Jul. 19, 2022, 10 pages.

Zhang et al., "Multimodal Pre-training Based on Graph Attention Network for Document Understanding," IEEE Transactions on Multimedia, vol. 25, Oct. 23, 2022, 13 pages.

European Patent Office, "Extended European Search Report," issued in connection with European Patent Application No. 19921870, dated Oct. 12, 2022, 11 pages.

International Searching Authority, "International Search Report," issued in connection with International Patent Application No. PCT/US2022/034570, mailed on Oct. 20, 2022, 3 pages.

International Searching Authority, "Written Opinion," issued in connection with International Patent Application No. PCT/US2022/034570, mailed on Oct. 20, 2022, 5 pages.

Kim et al., "Donut: Document Understanding Transformer without OCR", European Conference on Computer Vision, arXiv, Oct. 6, 2022, 29 pages.

Mexican Institute of Industrial Property, "Office Action," issued in connection with Mexican Patent Application No. MX/a/2022/008170, dated Oct. 27, 2022, 36 pages. [English Machine Translation Included].

United States Patent and Trademark Office, "Notice of Allowance and Fee(s) Due," issued in connection with U.S. Appl. No. 17/364,419, dated Nov. 4, 2022, 10 pages.

Canadian Intellectual Property Office, "Examiner's Report," issued in connection with Canadian Patent Application No. 3,124,868, dated Nov. 10, 2022, 4 pages.

United States Patent and Trademark Office, "Corrected Notice of Allowability," issued in connection with U.S. Appl. No. 17/364,419, dated Nov. 15, 2022, 2 pages.

Zhong et al., "Hierarchical Message-Passing Graph Neural Networks," Data Mining and Knowledge Discovery, Nov. 17, 2022, 28 pages.

European Patent Office, "European Search Report," issued in connection with European Patent Application No. 22180113.7-1207, dated Nov. 22, 2022, 31 pages.

Dwivedi et al., "Benchmarking Graph Neural Networks," Journal of Machine Learning Research, Dec. 2022, 49 pages.

European Patent Office, "Extended European Search Report," issued in connection with European Patent Application No. 22184405.3, dated Dec. 2, 2022, 4 pages.

United States Patent and Trademark Office, "Non-Final Office Action," issued in connection with U.S. Appl. No. 17/379,280, dated Dec. 2, 2022, 14 Pages.

International Searching Authority, "International Preliminary Report on Patentability," issued in connection with International Patent Application No. PCT/US2021/039931, issued on Dec. 13, 2022, 5 pages.

United States Patent and Trademark Office, "Corrected Notice of Allowability," issued in connection with U.S. Appl. No. 17/364,419, dated Jan. 4, 2023, 2 pages.

United States Patent and Trademark Office, "Non-Final Office Action," issued in connection with U.S. Appl. No. 17/883,309, dated Jan. 20, 2023, 14 pages.

United States Patent and Trademark Office, "Corrected Notice of Allowability," issued in connection with U.S. Appl. No. 17/364,419, dated Feb. 15, 2023, 2 pages.

United Kingdom Patent Office, "Examination Report Under Section 18(3)," issued in connection with U.K. Patent Application No. 2112299.9, dated Feb. 17, 2023, 2 pages.

United States Patent and Trademark Office, "Final Office Action," issued in connection with U.S. Appl. No. 17/075,675, dated Mar. 7, 2023, 11 pages.

United States Patent and Trademark Office, "Non-Final Office Action," issued in connection with U.S. Appl. No. 17/345,940, dated Mar. 16, 2023, 13 pages.

United States Patent and Trademark Office, "Final Office Action," issued in connection with U.S. Appl. No. 17/379,280, dated May 5, 2023, 17 pages.

United States and Patent and Trademark Office, "Notice of Allowance and Fee(s) Due," issued in connection with U.S. Appl. No. 17/883,309, dated May 11, 2023, 14 pages.

European Patent Office, "Extended European Search Report," issued in connection with European Patent Application No. 22214553.4, dated May 17, 2023, 9 pages.

United States Patent and Trademark Office, "Advisory Action," issued in connection with U.S. Appl. No. 17/075,675, dated May 30, 2023, 3 pages.

International Searching Authority, International Search Report, issued in connection with International Patent Application No. PCT/US2023/011859, mailed on Jun. 1, 2023, 3 pages.

International Searching Authority, Written Opinion, issued in connection with International Patent Application No. PCT/US2023/011859, mailed on Jun. 1, 2023, 4 pages.

United States Patent and Trademark Office, "Notice of Allowance and Fee(s) Due," issued in connection with U.S. Appl. No. 17/075,675, dated Jun. 26, 2023, 8 pages.

United States Patent and Trademark Office, "Notice of Allowance and Fee(s) Due," issued in connection with U.S. Appl. No. 17/345,940, dated Jul. 7, 2023, 8 pages.

Intellectual Property of United Kingdom, "Intention to Grant Under Section 18(4)," issued in connection with U.K. Patent Application No. 2112299.9, dated Jul. 13, 2023, 2 Pages.

United States Patent and Trademark Office, "Advisory Action," issued in connection with U.S. Appl. No. 17/379,280, dated Jul. 18, 2023, 3 pages.

Gopal et al., "What is Intelligent Document Processing?" Nano Net Technologies, URL:[https://nanonets.com/blog/intelligent-document-processing/], Jul. 19, 2023, 21 pages.

United States Patent and Trademark Office, "Corrected Notice of Allowability," issued in connection with U.S. Appl. No. 17/345,940, dated Jul. 20, 2023, 3 pages.

Canadian Intellectual Property Office, "Examiner's Report," issued in connection with Canadian Patent Application No. 3,124,868, dated Aug. 10, 2023, 5 pages.

United States Patent and Trademark Office, "Corrected Notice of Allowability," issued in connection with U.S. Appl. No. 17/883,309, dated Aug. 17, 2023, 2 Pages.

Visich, "Bar Codes and Their Applications," Research Foundation of State University of New York, 1990, 59 pages.

European Patent Office, "Communication pursuant to Article 94(3) EPC," issued in connection with European Patent Application No. 19 921 870.2-1207, on Apr. 9, 2024, 7 pages.

United States Patent and Trademark Office, "Supplemental Notice of Allowability," issued in connection with U.S. Appl. No. 17/710,538, dated May 8, 2024, 3 pages.

United States Patent and Trademark Office, "Notice of Allowance and Fee(s) Due," issued in connection with U.S. Appl. No. 17/598,792, dated Jun. 17, 2024, 9 pages.

United States Patent and Trademark Office, "Notice of Allowance and Fee(s) Due," issued in connection with U.S. Appl. No. 18/191,642, dated Jun. 17, 2024, 9 pages.

(56) References Cited

OTHER PUBLICATIONS

United States Patent and Trademark Office, "Corrected Notice of Allowability," issued in connection with U.S. Appl. No. 17/598,792, dated Jul. 3, 2024, 2 pages.

United States Patent and Trademark Office, "Final Office Action," issued in connection with U.S. Appl. No. 17/566,135, dated Jul. 25, 2024, 17 pages.

United States Patent and Trademark Office, "Final Office Action," issued in connection with U.S. Appl. No. 18/476,978, dated Aug. 14, 2024, 22 pages.

United States Patent and Trademark Office, "Notice of Allowance and Fee(s) Due," issued in connection with U.S. Appl. No. 17/710,538, dated Aug. 14, 2024, 8 pages.

International Searching Authority, "International Preliminary Report on Patentability," issued in connection with International Application No. PCT/US2023/011859, mailed on Aug. 6, 2024, 6 pages.

United States Patent and Trademark Office, "Notice of Allowance and Fee(s) Due," issued in connection with U.S. Appl. No. 17/598,792, dated Aug. 27, 2024, 9 pages.

United States Patent and Trademark Office, "Notice of Allowance and Fee(s) Due," issued in connection with U.S. Appl. No. 18/191,642, dated Aug. 28, 2024, 7 pages.

United States Patent and Trademark Office, "Notice of Allowance and Fee(s) Due," issued in connection with U.S. Appl. No. 17/566,135, dated Oct. 11, 2024, 9 pages.

United States Patent and Trademark Office, "Supplemental Notice of Allowability," issued in connection with U.S. Appl. No. 17/710,538, dated Sep. 11, 2024, 3 pages.

United States Patent and Trademark Office, "Second Notice of Allowability," issued in connection with U.S. Appl. No. 18/191,642, dated Sep. 16, 2024, 2 pages.

United States Patent and Trademark Office, "Notice of Allowance and Fee(s) Due," issued in connection with U.S. Appl. No. 17/710,660, dated Sep. 25, 2024, 9 pages.

United States Patent and Trademark Office, "Advisory Action," issued in connection with U.S. Appl. No. 18/476,978, dated Oct. 7, 2024, 3 pages.

United States Patent and Trademark Office, "Corrected Notice of Allowability," issued in connection with U.S. Appl. No. 17/710,660, dated Oct. 9, 2024, 2 pages.

United States Patent and Trademark Office, "Corrected Notice of Allowability," issued in connection with U.S. Appl. No. 17/598,792, dated Oct. 10, 2024, 2 pages.

United States Patent and Trademark Office, "Non-Final Office Action," issued in connection with U.S. Appl. No. 18/176,273, dated Apr. 24, 2025, 7 pages.

\* cited by examiner

| UPCs<br>Receipt descriptions | 6408430004539 | 6414230103142 | 6414300154327 | 6414301029051 | 6416021000389 |
|---|---|---|---|---|---|
| Meira Kalamauste yrttinen | 6.4968627 | | 11.58615 | 7.0232487 | 0 |
| Valio Eila viili 1% 200g mton | | 4.380008 | 4.8657813 | 10.312371 | 0 |
| Serla Toilet wC-paperi 8rl kelt | 5.880237 | 0 | 0 | 13.230892 | 0 |
| Muovikassi 4Ol. | 5.880237 | 0 | 43.376844 | 4.5418205 | 6.142237 |
| Serla Talous 3rl puoliarkki | | | | | |

2106 →  2108 →  2110

2104 →

| Code | Type | OGRDS Description |
|---|---|---|
| 6408430004539 | "EAN" | VALIO EILA VIILI MTON 1% |
| 6414201001423 | "EAN" | MEIRA KALAMAUSTE YRTTINEN PS |
| 6414300154327 | "EAN" | SERLA TOILET KELTAINEN |
| 6414301029051 | "EAN" | SERLA PUOLIARKKI VALKOINEN |
| 6416021000389 | "EAN" | MUOVIKASSI |

FIG. 21

METHODS, SYSTEMS, ARTICLES OF MANUFACTURE, AND APPARATUS FOR DECODING PURCHASE DATA USING AN IMAGE

RELATED APPLICATION

This patent claims the benefit of U.S. Provisional Patent Application No. 63/214,571, which was filed on Jun. 24, 2021. U.S. Provisional Patent Application No. 63/214,571 is hereby incorporated herein by reference in its entirety. Priority to U.S. Provisional Patent Application No. 63/214,571 is hereby claimed.

FIELD OF THE DISCLOSURE

This disclosure relates generally to computer-based image analysis and, more particularly, to methods, systems, articles of manufacture, and apparatus for decoding purchase data using an image.

BACKGROUND

Artificial intelligence (AI) leverages computers and machines to mimic problem solving and decision making challenges that typically require human intelligence. Deep learning (DL), computer Vision (CV) and Natural Language Processing (NLP) are powerful AI techniques that can be combined to process an image. For example, these AI techniques can be applied to an image of a purchase document to extract and decode data from the purchase document.

BRIEF DESCRIPTION OF THE DRAWINGS

FIG. 21 is an illustration of an example matrix including matching scores for pairs of product descriptions and barcodes and an example list of the identified matches that can be output by the example decoding circuitry of FIGS. 1, 2, and/or 18.

Figure 1:
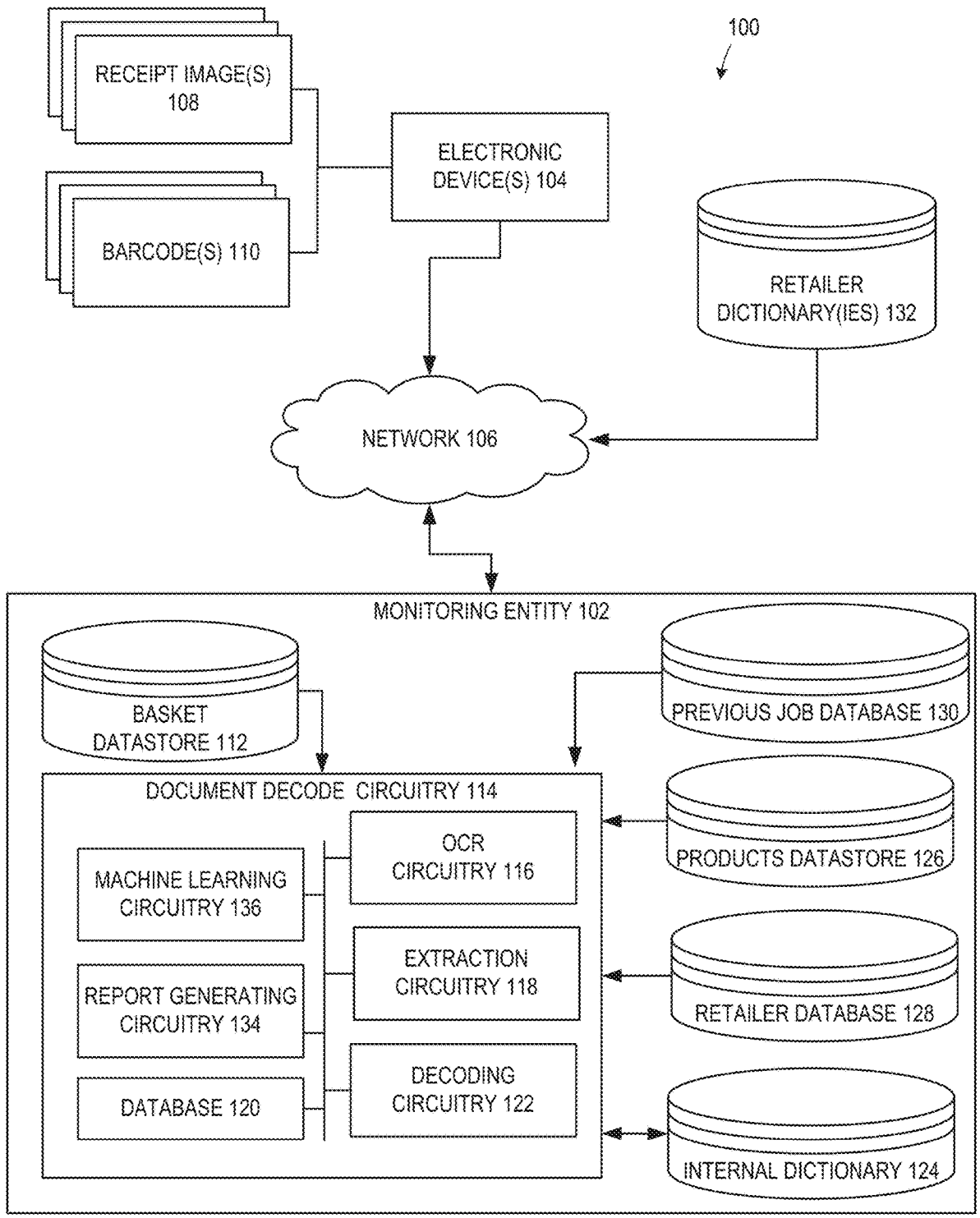
FIG. 1 is a schematic illustration of an example environment constructed in accordance with the teachings of this disclosure for collecting purchase data from a consumer.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Marketing intelligence entities provide manufacturers and retailers with a complete picture of the complex marketplace and actionable information that brands need to grow their businesses. To do so, some marketing research entities collect and analyze purchase data to extract insights. A common source of such purchase data includes consumer panels, which are groups of individuals that have agreed to provide their purchase data and/or other types of data, such as demographic data, to the entity. A consumer panel member (e.g., a panelist) can record individual and/or household purchases (e.g., purchase data) from various retailers and transmit the purchase data to the marketing research entity for analysis. Typically, the panelist represents at least one demographic characteristic such as, but not limited to geographic location, household income, presence of children, etc., enabling the marketing research entity to extract insights about consumer purchase behavior beyond just a sale of a product. Consequently, this data source can be very important for the marketing intelligence entity to facilitate, for example, marketing initiatives that target consumers more likely to purchase goods and/or services of interest.

Panelists around the world share their purchased baskets with marketing research entities using different collection methods. As disclosed herein, a basket refers to a group of items purchased by the panelist and identified on a receipt. Thus, sharing the basket with the entity includes providing purchase information to the entity such as purchase details for each product purchased (e.g., product description, price of product, quantity purchased, etc.), promotions applied, etc. as well as barcodes corresponding to each of the purchased products. In some examples, the panelist can use an electronic device (e.g., a smartphone, a tablet, etc.) to manually enter purchase information for the purchased products and to scan the barcodes of the purchased products (e.g., using a camera of the electronic device and/or a barcode scanner). However, this task can be quite time-consuming and is often burdensome for the panelist, especially for large baskets with numerous items. In some examples, these burdens diminish the panelists' willingness to collaborate with the marketing research entity long term, resulting in reduced data capture by the entity. The reduced data capture can result in missed valuable data that can limit an ability of the research marketing entity to collect actionable consumer behavior data such as consumer consumption and/or impulse purchases, etc. Some entities incorporate and/or rely on reward programs to recruit and/or retain panelists, which can be costly for the entity. For example, the marketing intelligence entity may incorporate a rewards program to maintain a consistent (e.g., dependable) level of data capture and/or increase a level of data capture.

In some examples, the marketing research entity can shift the burden of recording purchase data from the panelist to a workforce. For example, the panelist can save a receipt(s) for a purchase(s) and/or the purchased products as listed in the receipt in a bin (e.g., container, etc.). The workforce can collect the purchase data by periodically and/or aperiodically visiting the panelist's bin to manually enter the purchase data from the receipt(s) (e.g., by scanning the purchased product and entering purchase information). While this collection method eases the burden on the panelist, the process is still manual and may require the entity to train and/or maintain a field of personnel uniquely qualified to perform such tasks. As such, this collection method is typically resource intensive, time-consuming, and costly for the marketing research entity.

In yet another collection method, the marketing research entity can collect the purchase data from purchase documents. Purchase documents, such as receipts and/or invoices, memorialize a transaction between a consumer and a retailer. Such documents can include different information. For example, the receipt typically includes a list of purchased goods and/or services, prices paid, details associated with the point of sale, the total price, and any tax assessed on the transaction. The panel member can capture an image (e.g., via a camera, scanner, etc.) of the receipt and transmit the image to the entity for processing. A workforce can manually process the purchase document to extract purchase-related information corresponding to the purchased basket. For example, the workforce can transcribe, digitize, and store the receipt and/or extracted purchase data in a database. In some examples, the workforce can extract information from relevant fields of the receipt, such as retailer name, product names, item codes, item prices, price total, date, and time, etc. However, this collection method is still manual and may require the entity to train and/or maintain a workforce, which can be resource intensive, time consuming, and costly for the marketing research entity.

Based at least on the foregoing issues, there is a need to transform the manual data collection by auditors and panelists and to provide new tools that can revolutionize current processes towards technology driven product organization. Examples disclosed herein facilitate technology (e.g., automation) to the collection of purchase data from panelists and provide a large improvement on the productivity, error reduction, and digitalization of marketing intelligence companies. Further, technological (e.g., automatic) examples disclosed herein facilitate extraction of purchase data from the receipt to boost the entity's throughput by enabling the entity to collect more data with improved accuracy and, consequently, increase the entity's profits.

Recent advances in artificial intelligence (AI) enable marketing intelligence entities to solve new and challenging business use cases, such as the automatic extraction of information from an image. For example, applying AI techniques to receipt processing can result in more efficient and cost effective processes. Deep learning (DL), computer vision (CV), and natural language processing (NLP) are powerful AI techniques that can be combined to process an image. Deep learning is subset of machine learning in which a neural network attempts to simulate the human brain by "learning" from collections of data. Computer vision is a field of AI that trains computers and machines to interpret and understand an image and to act accordingly. Natural language processing is a field of AI concerned with giving computers the ability to understand human language as it is written. Further, progress in the areas of data science, cloud technology, and DevOps can be applied to receipt processing. DevOps (e.g., software development and information technology (IT) operations) refers to a methodology or practice that aims to increase an efficiency and speed of software development by implementing collaboration between software developers and IT teams.

Disclosed herein are example methods, systems, articles of manufacture, and apparatus for extracting and decoding (e.g., automatically) purchase data using images of receipts. Examples disclosed herein can reduce a burden on a panelist in providing purchase-related information by automatically detecting the information from a receipt uploaded by the panelist. By uploading the receipt, the panelist no longer has to manually enter purchase information such as a product(s) purchased, a price(s), a quantity(ies), and/or a promotion(s) applied to the basket. Additionally, because the panelist burden is relieved via a technological process, erroneous human behaviors are eliminated. Further, the task of providing basket information to the entity that would take, for example, 20 minutes to manually enter can take significantly less of the panelist's time (e.g., only 5 minutes). In some examples, the decoding process reduces an entity's reliance on rewards programs to recruit and/or retain panelists by reducing the burden on the panelists. In some examples, reducing the burdens on the panelist reduces the churn of panelists recruited to participate in consumer panels. Further, automating the extraction of information from a receipt facilitates the collection of more information (e.g., more details of baskets of purchased goods and/or more baskets) by the entity.

In examples disclosed herein, cooperating consumers transmit images of receipts and corresponding barcodes (e.g., universal product code (UPC), European article number (EAN), etc.) to the entity via an electronic device such as a smartphone or tablet. For example, the panelist can download a software application (e.g., application) onto the electronic device and transmit the receipt image and barcodes to the entity via the application. As disclosed herein, the barcode is a unique code that represents a specific product in a machine-readable form. For example, the barcode can include a unique composition of symbols such as numbers, letters, shapes, and/or a specific pattern of stripes.

In some examples, the receipt image is a digital receipt provided to the panelist by a corresponding retailer (e.g., via email, a website, an application, etc.). In some examples, the panelist captures an image of a paper receipt via a camera and/or other image capture device and transmits the captured image to the entity. For example, the panelist can capture the image of a receipt (e.g., receipt image) using the application and a camera on the electronic device. The panelist can also use the electronic device to scan barcodes of barcoded products and/or select barcodes (e.g., for non-barcoded products such fruits, vegetables, fish, etc.) from a codebook, list, library, or other database to provide information about the purchase. In some examples, the codebook or database is also included in the application. In some examples, the panelist also provides a store (e.g., retailer, vendor, merchant, etc.) from which the basket was purchased. For example, the panelist can select the store from a storelist in the application and/or from a favorite's store list (e.g., with store ID of physical location) associated with the panelist.

In examples disclosed herein, collected basket information (e.g., image receipt, barcodes, and retailer) entered into the application by the panelist can be compiled and uploaded to the entity for processing. Examples disclosed herein automatically process the panelists' basket information to collect (e.g., generate, gather, harvest, etc.) purchase data. For example, the entity can apply a ubiquitous and transparent decoding process that extracts purchase information contained in the receipt image and decodes the basket. For example, the decoding process includes associating barcodes uploaded by the panelist with purchase details extracted from the receipt. In some examples, the basket information is uploaded to a backend service that is structured to decode the purchased basket. For example, the decoding process can be deployed as a cloud service (e.g., Software as a Service, Function as a Service, etc.) by a cloud service provider. In some examples, the decoded purchase data can be forwarded to the entity's back office (e.g., via a backend server) for trend analysis and insight extraction.

Automating the receipt decoding process poses several technological, analytical, and/or real-world challenges. In some examples, there can be inherent challenges in processing receipt images based on the nature of the collection process. For example, receipt images are often captured by mobile devices, which means they can be taken in less controlled conditions. Such a collection process can result in issues with a perspective and/or viewpoint of the receipt image, image quality, receipt defects, etc. Moreover, different retailers in different countries have different printing layouts. All this variance in the appearance of the receipt images necessitates a solution that can generalize well to new formats based on large collections of receipt images.

To overcome the foregoing challenges, examples disclosed herein apply AI techniques such as natural language processing, deep learning, and computer vision to the decoding process, which play a significant role in understanding, learning, and modeling specific processing modules that can automatically detect targeted information (e.g., product purchased, price paid, quantity purchased, etc.) on the receipt images. In some examples, the decoding process includes two main phases (e.g., parts, modules, etc.), including an extraction phase in which information is extracted from the image of the receipt and a decoding phase in which detected items (e.g., purchased products) are matched with corresponding barcodes. During the extraction phase, disclosed examples analyze the image to obtain text, detect regions of interest, identify structure in the detected regions of interest, map the obtained text to the identified structure to generate a digitized receipt, and interpret the text in the digitized receipt to generate purchase-related information, such as a list of items (e.g., products) purchased, quantities, prices, applied promotions, and/or a total spent. During the decoding phase, a list (e.g., a first list) of purchased products extracted during the extraction phase and a list (e.g., a second list) of barcodes provided by the panelist can be used to generate matches (e.g., associations) among the two lists. In other words, the decoding process includes detecting and generating associations between product descriptions and provided barcodes. Examples disclosed herein can thus report decoded purchase data that includes prices and quantities associated with specific purchased barcodes.

Examples disclosed herein extract text from the receipt images using optical character recognition (OCR) techniques, which include aspects of computer vision and natural language processing. Techniques based on OCR examine images pixel by pixel, looking for shapes that match character traits. A standard out-of-the-box OCR engine can detect text, generate text boxes corresponding to the text, determine locations (e.g., coordinates) of the text boxes, and transcribe the text. While OCR engines are generally capable of recognizing, detecting, and transcribing text, the OCR output does not guarantee a strict top-to-bottom, left-to-right ordering in the list of obtained words. Further, OCR engines tend to struggle to properly align and arrange detected words in receipts because receipts are often wrinkled (e.g., resulting in non-flat deformations), worn, and/or otherwise difficult for the OCR engine to read. Also, receipts vary in layout (e.g., based on country, store, etc.) and can be captured with differing viewpoints and/or perspectives. For example, the captured receipt images can be skewed, tilted in any direction, squeezed, rotated by some angle, etc. While layouts of receipt can vary, receipts are typically constructed to contain ordered information. For example, information corresponding to purchased products and their respective prices are often horizontally aligned across a receipt. In some examples, failure of an OCR engine to properly align the text in the receipt can result in improperly associated products and prices during the decoding phase, which can reduce the usefulness of the receipt image.

Systems, methods, apparatus, and articles of manufacture disclosed herein correct the above-noted deficiencies by detecting a structural layout of the receipt in a manner that is independent of the OCR output. For example, the structural layout can be detected by identifying regions of interest and using those regions of interest to detect rows and columns of the receipt from the receipt image. In other words, examples disclosed herein detect the rows and columns from the image of the receipt rather than from text of the receipt. Certain disclosed examples apply object detection and recognition techniques to detect the regions of interest, row, and columns. Examples disclosed herein can combine the OCR output with the detected structural layout to generate a digitized receipt from the receipt image. In some examples, the digital receipt is a symbolic representation of a corresponding paper receipt that can be understood and/or processed by computers.

Certain examples detect the regions of interest by applying a trained AI model to the receipt image. In some examples, the AI model is based on a region-based convolutional neural network (R-CNN). However, other neural networks can be used additionally or alternatively, such as faster R-CNNs, deep neural networks (DNN), etc. In some examples, there are two main regions of interest in receipt image including a first region, which is an orthogonal (e.g., rectangular) area in the receipt image where the receipt is present, and a second region, which is a rectangular area around printed text that contains the purchase details (e.g., product description, price, quantity, etc.). Receipt images uploaded by panelists tend to include clutter in a background of the image. In some examples, the background clutter can include irrelevant and/or unwanted text, visual texture, etc. For example, the receipt image can include the receipt and another document adjacent the receipt that can contribute noise and/or undesired text detection during an OCR process. In some examples, the first region (e.g., the receipt region) is needed to segment out (e.g., separate) the receipt from such background clutter. In some examples, the second region (e.g., the products region) is the area containing a list of purchased products with product descriptions (e.g., item descriptions), quantities, prices, promotions, discounts and is thus a main targeted region for extracting data from the receipt. Therefore, detecting the regions of interest can strengthen the extraction process by focusing on a specific region of the receipt image. In some examples, detecting the regions of interest can speed up the decoding process by focusing on data that needs to be processed. In some examples, detecting the regions of interest can reduce instances of falsely identifying other non-product related text in the receipt.

Examples disclosed herein utilize the receipt region to detect rows representing the receipt's horizontal structure. In some examples, row detection can enable structuring of scattered words on the receipt by grouping words that belong to the same line. Certain examples detect the rows by applying a CNN-based pixel-wise predictor (e.g., an AI model) to the receipt image. In some examples, the pixel-wise predictor outputs a pixel-wise mask that identifies each pixel in the image as belonging to part of a text line (e.g., a row) or part of the background (e.g., the rest of the receipt). In some examples, the output of the pixel-wise mask is post-processed (e.g., refined) by detecting polygons representing rows of the receipt. For example, the polygons can be detected by identifying groups of pixels that belong to the same line. In some examples, a merging process is applied to the detected polygons to merge unconnected polygons belonging to the same row. In some examples, the row detection techniques can be used to generate a list of polygonal regions (e.g., bounding boxes) representing the rows of the receipt including locations (e.g., coordinates) of the polygonal regions.

Examples disclosed herein utilize the products region (e.g., purchase region, etc.) to detect columns representing the receipt's vertical structure. In some examples, column detection can be used to identify tabulated lines that include purchase details and/or lines that include promotions and/or discounts applied to the purchased products. In other words, detecting the columns enables identification of elements listed in the detected lines (e.g., rows). Certain examples detect the columns by applying a CNN-based AI model to the products region of the receipt image. For example, the CNN-based AI model can be based on semantic pixel-wise segmentation techniques that generate a pixel-wise classification of the receipt image. In some examples, the CNN-based segmentation model identifies pixels of the image that belong to a column region. The CNN-based segmentation model is a generic detection method that can work on any type of column. For example, the CNN-based segmentation model identifies a pixel as belonging to a column, but does not identify the type of column. That is, the columns are detected in a manner that is independent of OCR output. In some examples, the detected columns are classified at another step of the decoding process. In some examples, an output of the CNN-based segmentation model is post-processed by detecting polygons representing columns of the receipt and/or merging polygons that are determined to belong to the same column. For example, the post-processing steps can be used to generate a list of polygonal regions (e.g., bounding boxes) representing the columns of the receipt that include coordinates for the polygonal regions. In some examples, the post-processing steps are similar to the post-processing steps applied during row detection.

Examples disclosed herein combine the detected columns, the detected rows, and the detected text from the OCR engine to determine and form a structure (e.g., layout, table) of the receipt. In some examples, coordinates of the detected bounding boxes are transformed (e.g., adjusted, corrected, etc.) to reference coordinates of the original receipt image. Disclosed examples map the words and/or characters detected by the OCR engine to corresponding columns and rows. In some examples, Intersection over Union (IoU) calculations are used to map (e.g., assign) each of the words to their respective columns and rows. IoU is a metric for measuring overlap between two bounding boxes by comparing a ratio of an overlap area of the two bounding boxes to a total area of the two bounding boxes. In some examples, the words are assigned to a column and/or row if the IoU ratio reaches a threshold value. In some examples, the threshold value is approximately 0.5 (e.g., 50%). However, the threshold value can be higher or lower in additional or alternative examples. In some examples, the receipt can be substantially fully structured after the words generated by the OCR engine are assigned to the detected rows and/or columns. For example, mapping the word to the detected rows and/or columns generates an example data frame. As disclosed herein, a data frame refers to data displayed in a format as a table. While the data frame can include different types of columns, each column in the data frame should have the same type of data.

Examples disclosed herein digitize the receipt by detecting rows and columns and assigning words detected by OCR to the rows and columns. Examples disclosed herein can utilize the digitized receipt to extract purchase information from the digitized receipt, such as purchase details (e.g., product descriptions, prices, quantities, etc.) and promotion information (e.g., discounts, multi-buy, etc.). Examples disclosed herein apply post-processing methods to the data frame to extract purchase details to be used during the decoding phase. For example, the extracted purchase details are used during the decoding phase to match extracted product descriptions to respective barcodes. In some examples, the purchase details are extracted and transmitted to a decoding module. In some examples, additional purchase information is extracted and associated with the decoded basket (e.g., matched product descriptions and barcodes), such as promotions applied to the basket.

In some examples, NLP techniques are applied to the detected columns to classify (e.g., identify) the columns. For example, the NLP techniques can be used to classify column headers that identify targeted text in the rows. For example, the columns can be classified using generic regular expressions (e.g., regex)) that can be implemented by a regex engine. As disclosed herein, a regex is a sequence of characters that specifies a search pattern that can be used to match and locate text. Disclosed examples include regex for targeted purchase details such as product description, price, and/or product code. For example, if a string of characters in a column matches the product description regex, the column can be classified as a product description column. In some examples, columns that do not match a defined regex are classified as an unknown column type. After the columns are identified, the product description, price, and/or product code columns are extracted as purchase details to be used for the decoding process.

Examples disclosed herein apply a refining process to the extracted purchase details to remove words or elements that are not needed during the decoding phase. Certain examples apply the regex engine over each row to validate and/or drop elements or rows that do not qualify a condition defined by a regex. For example, a word in a row that does not qualify a condition defined in the regex of a respective column can be removed (e.g., erased, dropped, etc.) from the extracted purchase details. For example, a price word can be removed from an product description column, letters can be removed from a price column, etc. Certain examples include a regex for quantity. For example, some receipts include a quantity in the product description column (e.g., before the product description). Accordingly, some examples disclosed herein include a product description regex specifying that a number followed by a spaced followed by a product description is determined to be a quantity. In some examples, the quantity is extracted and associated with a respective purchased product, but is removed from the product description. Certain examples include a collection of words that indicate that a particular row can be determined as invalid for the extraction process. In some examples, the collection of words are referred to as stop words (e.g., stopwords) and are stored in a database. In some examples, the stopwords are a collection of words that are determined to not correspond to purchase details such as, but not limited to total, promotion, multibuy, etc. Examples disclosed herein remove rows that include stopwords from the extracted purchase details. However, certain examples extract such information from such rows to be associated with decoded basket.

Examples disclosed herein utilize the extracted purchase details to decode the purchased basket. In some examples, the information extracted from the receipt can include a list of purchased products that includes, for each purchased product, a product description, a price, and a quantity. In some examples, the panelist provided barcodes for each of the purchased products. However, it may not be known which purchased product corresponds to which barcode. Examples disclosed herein decode the purchased basket by matching (e.g., associating) an extracted product description and corresponding price and quantity with a respective barcode provided by the panelist. In some examples, each purchased product is matched with a respective barcode. In some examples, however, less than all purchased products are matched with a respective barcode. For example, the decoding phase may not be able to match at least one extracted product description with a barcode.

Examples disclosed herein incorporate data from different sources to perform a matching process between extracted product descriptions and uploaded barcodes. Example systems, apparatus, and articles of manufacture disclosed herein generate a search query that includes a first product description of the purchased products detected in the extraction phase as well as a list of the barcodes provided by the panelist. In some examples, the query also includes a store identifier (ID) corresponding to a store from which the receipt was obtained. In some examples, duplicate barcodes are removed so the list of barcodes is a list of unique barcodes. As used herein, a list of unique barcodes represents a list that does not contain duplicate barcodes (e.g., two or more of the same barcodes). For example, if two barcodes provided by the panelist are identical, one of the barcodes can be removed from the query and the other barcode can remain in the query. In some examples, the query is searched against an internal dictionary to identify a match between the first product description and a barcode. In some examples, the internal dictionary is a database that includes previously matched product descriptions and barcodes. For example, the internal dictionary can be generated by the monitoring entity by decoding a plurality of receipts. The internal dictionary can be built and expanded upon over time as more receipts are processed. In some examples, the internal dictionary includes pre-associated barcodes and product descriptions provided by specific retailers who share such information with the document decoding system. For example, the internal dictionary can include information from external dictionaries provided by various retailers.

If the first product description is matched with a barcode, the result can be saved and/or a second product description can be searched. If the first product description is not matched, certain examples disclosed herein generate second query and search the second query against a second database. In some examples, the second database is quite large compared to the internal database. For example, the second database can be a products datastore that includes numerous products, descriptions, barcodes, and other attributes of the products. In some examples, the second query can include the same information as the initial query, including the first product description, the list of barcodes, and the store ID. However, the second query can include different conditions. For example, the initial query can include a condition that demands a substantially exact match of product description for a response and the second query can include a condition for an n-gram match. An n-gram match is a criterion that identifies a match if n elements are shared. For example, if n is 2 and the element is a word, a match can be determined if any two words are the same. In some examples, the second query is searched against the second database to detect a match between the first product description and a barcode. If the first product description is matched with a barcode, the results can be saved and/or a second product can be searched. If the first product is not matched, the second query can be adjusted and searched against the second databased a second time. For example, the second query can be adjusted to remove the store ID. If the first product description is matched with a barcode, the results can be saved and/or a second product can be searched.

In some examples, a third query is generated if the first product description is not matched after searching the second database. The third query can be searched against a third database. For example, the third database can be a historical database that includes "previous jobs." In some examples, the historical database is known as "previous jobs" because each processed receipt can be designated as a job to be served by a cloud service. In some examples, the third query can be searched against the historical database by comparing the third query against historical receipts with the same store ID. If the first product description is matched with a barcode, the results can be saved and/or a second product can be searched. If the first product description is not matched with a barcode, the corresponding receipt can be uploaded to the previous jobs database to potentially be identified at a later time.

In some examples, artificial intelligence and machine learning are leveraged to build and supplement the internal dictionary by associating item descriptions and barcodes based on the analyzed receipt images. In some examples, further details are extracted from receipts to enabling monitoring of trends that provide a greater level of granularity regarding consumer behavior than receipt-only monitoring. Item descriptions on receipts tend to be abbreviated, variable, interchangeable, inconsistent within or across retailers, and missing information such as, for example, barcodes. In examples disclosed herein, actional insights based on data related to consumer brand switch, consumer preferences, efficacy of promotions, online/offline purchasing activity, path to purchase, market penetration, purchase occasion, and market segmentation can be determined from the data analyzed and created in accordance with the details of this disclosure.

Examples disclosed herein may be part of a larger document decoding service (DDS) that can extract and/or decode various types of documents. While examples disclosed herein are applied to receipts, it is understood that examples disclosed herein can be applied to other documents as well, such as invoices and/or other purchase documents. Further, examples disclosed herein can be applied to extraction and decoding of images in other industries or applications, such as historical document digitization, banking and commercial operations, mail sorting, etc. In other words, the example DDS as disclosed herein can be designed to support several types of documents, such as invoices, receipts, historical documents, bank notes, etc.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, different types of model architectures are used. In general, machine learning models/architectures that are suitable to use in the example approaches disclosed herein will be convolution neural networks, a residual neural network (ResNet), etc. However, other types of machine learning models could additionally or alternatively be used such as deep neural networks, other types of neural networks, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Algorithms disclosed herein are used to train ML/AI models. However, any other training algorithm may additionally or alternatively be used. Training is performed using hyperparameters that control how the learning is performed (e.g., a learning rate, a number of layers to be used in the machine learning model, etc.). In some examples re-training may be performed.

Training is performed using training data. In examples disclosed herein, the training data originates from locally generated data. Because supervised training is used, the training data is labeled. Labeling is applied to the training data by a workforce. In some examples, the training data is sub-divided into training data and testing data.

Once training is complete, the model is deployed for use as an executable construct that processes an input and provides an output based on the network of nodes and connections defined in the model. In some examples, the model is saved with the DDS. The model may then be executed by extraction circuitry and/or decoding circuitry.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is a block diagram of an example environment 100 constructed in accordance with the teachings of this disclosure for collecting purchase data from a consumer. In some examples, the purchase data includes purchased product descriptions, quantities, and prices associated with specific purchased barcodes. For example, purchase data refers to processed (e.g., decoded) basket information provided by the panelist. The example environment 100 includes an example monitoring entity 102, which can be, for example, a marketing research entity that enlists consumer panelists from which to collect purchase data. In the illustrated example of FIG. 1, the example monitoring entity 102 is in communication with at least one example electronic device 104 that can be associated with a cooperating consumer(s) (e.g., panelist). The electronic device 104 can be, for example, a personal computing (PC) device such as a laptop, a smartphone, an electronic tablet, a hybrid or convertible PC, etc. used by a panelist to provide basket information to the entity.

In the illustrated example of FIG. 1, the entity 102 and electronic device(s) 104 are communicatively coupled via an example network 106. The example network 106 may be implemented using any network over which data can be transferred, such as the Internet. The example network 106 may be implemented using any suitable wired and/or wireless network(s) including, for example, one or more data buses, one or more Local Area Networks (LANs), one or more wireless LANs, one or more cellular networks, one or more private networks, one or more public networks, among others. In additional or alternative examples, the network 106 is an enterprise network (e.g., within businesses, corporations, etc.), a home network, among others.

The panelist can use the example electronic device 104 to obtain an image(s) 108 of a receipt that memorializes a transaction between the panelist and a retailer. In some examples, the receipt image 108 is a digital receipt the panelist obtained, for example, via email, a website, an application, etc. In some examples, the receipt image 108 is an image of a receipt captured by the panelist (e.g., via the electronic device 104). For example, the panelist can use an application installed on the electronic device 104 that accesses an image sensor (e.g., a camera) to capture the receipt image 108. In examples disclosed herein, the panelist also obtains barcodes 110 corresponding to purchased products as memorialized in the receipt image 108. In some examples, the panelist captures the barcode(s) 110 using the camera of the electronic device 104. In some examples, the panelist uses a barcode scanner that is communicatively coupled to the electronic device 104. In some examples, the panelist selects a barcode from a list of barcodes via the application on the electronic device 104.

In some examples, the panelist provides additional basket information, such as a retailer from which the basket was purchased. In some examples, the panelist provides the retailer's name, a store code identifying the specific store of the retailer, and a country in which the store is located. In some examples, the application includes three lists of stores from which the panelist can select the retailer, including generic stores, banner stores, and favorite stores. In additional or alternative examples, the retailer is extracted from the receipt image 108.

The panelist can use the electronic device 104 to transmit the basket information (e.g., the receipt images 108, barcodes 110, retailer, etc.) to the entity 102 via the network 106. Put another way, the monitoring entity 102 receives or obtains the basket information captured and/or uploaded by panelist via the electronic device 104. In the illustrated example of FIG. 1, the monitoring entity 102 includes an example basket datastore 112, which is structured to store the basket information. In some examples, the basket datastore 112 stores the basket information until the receipts images 108 and barcodes 110 can be processed by example document decode circuitry 114. The example basket datastore 112 of the illustrated example of FIG. 1 is implemented by any memor(ies), storage device(s) and/or storage disc(s) for storing data such as, for example, flash memory, magnetic media, optical media, etc. Furthermore, the data stored in the basket datastore 112 may be in any data format such as, for example, binary data, comma delimited data, tab delimited data, structured query language (SQL) structures, image data, etc.

The example document decode circuitry 114 is structured to process (e.g., apply a decoding process to) receipt images 108 and barcodes 110 obtained by the monitoring entity 102 from any number of panelists using any number of electronic devices 104 to collect purchase data. In the illustrated example of FIG. 1, the example document decode circuitry 114 implements at least a portion of a document decode service (DDS). In some examples, the monitoring entity 102 serves as a host machine for the document decode circuitry 114 to process of the receipt image 108 and/or the barcodes 110. In additional or alternative examples, the monitoring entity 102 enlists a cloud service provider to execute the document decode circuitry 114 as a cloud service (e.g., infrastructure as a service, system as a service, etc.). In some examples, the document decode circuitry 114 is implemented by an Edge network.

The example document decode circuitry 114 processes the receipt image 108 to extract purchase information from the receipt, such as purchased products (e.g., items), quantities, prices, promotions, etc. The document decode circuitry 114 can then decode the receipt by matching the purchased products with respective barcodes 110. In this manner, the example document decode circuitry 114 can report quantities and prices associated with specific purchased barcodes. To process the receipt image 108 and barcodes 110, the document decode circuitry 114 includes example OCR circuitry 116, example extraction circuitry 118, an example database 120, example decoding circuitry 122, and example report generating circuitry 134.

The example OCR circuitry 116 is structured to perform optical character recognition (OCR) on the receipt image 108 to convert text in the receipt image 108 into machine-readable text. For example, the example OCR circuitry 116 can apply an OCR-based algorithm over the receipt image 108 to obtain text data. After applying an OCR-based algorithm over receipt image 108, the OCR circuitry 116 can return the characters and words (e.g., text) obtained from the receipt image 108 as well as their locations. For example, the OCR circuitry 116 can output bounding boxes (e.g., text boxes) corresponding to strings of characters (e.g., transcribed text) and locations (e.g., coordinates) of the bounding boxes within the receipt image 108. As disclosed herein, a word detected by the OCR circuitry 116 can include a word, an abbreviation, a partial word, a number, a symbol, etc. For example, the word can include a price of a purchased product. In some examples, the OCR circuitry 116 is a component of the extraction circuitry 118.

The example extraction circuitry 118 is structured to extract the purchase information from the receipt image 108. The extraction circuitry 118 receives and/or retrieves the receipt image 108 and identifies regions of interest in the receipt. In some examples, there are two main regions of interest in receipt image 108, including a receipt region (e.g., a rectangular area in which the receipt is present) and a product region (e.g., a rectangular area around text that contains purchase details). The receipt region and the products regions are both substantially rectangular regions. In some examples, the regions of interest can thus be detected using object detection techniques. In some examples, the extraction circuitry 118 applies an object detection AI model based on computer vision and deep learning to the receipt image 108 to identify the two main regions of interest. For example, the regions of interest can be detected by applying a faster R-CNN based AI model to the receipt image 108.

In some examples, the detected regions of interest are used to detect rows and columns from the receipt image 108. For example, the example extraction circuitry 118 can use the receipt region to detect rows within the receipt image 108. The rows refer to individual text lines that contain purchase information such as purchased products, volume and unit prices, promotions and/or discounts applied, etc. Further, the extraction circuitry 118 can use the products region to detect columns within the receipt image 108. That is, the extraction circuitry 118 of FIG. 1 detects columns of tables instead of a whole table. While receipt formats can vary depending on a corresponding country, retailer, documents type, etc., most receipts contain tabulated information that mimic a column-wise organization of the purchase details. In some examples, segmenting out the products region enables the extraction circuitry 118 to identify tabulated lines that include the purchase details and/or lines having promotions. For example, detecting columns enables the extraction circuitry 118 to segregate details present in the rows, which can include product description, price, unit of measure, quantity, product code, tax notations, promotions, etc. In some examples, the extraction circuitry 118 applies AI models based on computer vision and deep learning techniques to detect the rows and/or the columns.

In some examples, the extraction circuitry 118 generates a digitized receipt from the receipt image 108 by mapping words generated by the OCR circuitry 116 to detected rows and/or columns. For example, the detected rows and columns can be used to form the structure of a receipt that corresponds to the receipt image 108. Text detected by the OCR engine can be mapped to respective positions within the receipt based on coordinates of the words, the rows, and/or the columns. In some examples, the mapping is based on IoU calculations. In some examples, the digitized receipt can be used to extract purchase information, such as purchase details (e.g., product descriptions, quantities, prices), promotions, etc.

The document decode circuitry 114 includes an example database 120, which is structured to store data related to the DDS. For example, the database 120 can be used to store AI models for detecting regions of interest, rows, and/or columns. In some examples, digitized receipts are stored in an example database 120. The example database 120 can be implemented by any memor(ies), storage device(s) and/or storage disc(s) for storing data such as, for example, flash memory, magnetic media, optical media, etc. Furthermore, the data stored in the database 120 may be in any data format such as, for example, binary data, comma delimited data, tab delimited data, SQL structures, image data, etc.

The example decoding circuitry 122 is structured to decode a basket by matching (e.g., associating) extracted purchase details with specific barcodes 110. To facilitate the matching, the document decode circuitry 114 is communicatively coupled to at least one data source. In the illustrated example of FIG. 1, the document decode circuitry 114 is communicatively coupled to an example internal dictionary 124, an example products datastore 126, an example retailer database 128, and an example previous jobs database 130. In some examples, the monitoring entity 102 is communicatively coupled to an example retailer dictionary(ies) 132. For example, the retailer dictionary 132 can be provided to the monitoring entity 102 by a retailer and can include files that store lists of products sold by the retailer and associated barcodes. In some examples, the monitoring entity 102 can add information from the retailer dictionary 132 to the internal dictionary 124 to help facilitate the matching process.

The internal dictionary 124 is a database that includes associations between product descriptions and barcodes. In some examples, the internal dictionary 124 records associations between item descriptions and barcodes at a retailer level. For example, the internal dictionary 124 can include a plurality of entries in the form of documents and each document can include a retailer, an item description(s), and a corresponding barcode(s) corresponding to a specific product. In some examples, more than one barcode 110 can be associated with the item description. For example, the item description can be associated with different types of barcodes, such as a UPC, an EAN, and/or other types of barcodes 110. Further, a barcode 110 can be associated with more than one product description. For example, different retailers may include different product descriptions for the same product. Accordingly, the internal dictionary 124 can include multiple item descriptions and multiple barcodes 110 for a single product. In some examples, the internal dictionary grows (e.g., expands) over time by recording associations generated by the decoding circuitry 122. In some examples, the internal dictionary 124 is used as a first step in the decoding process. That is, the decoding circuitry 122 searches the internal dictionary 124 first to detect a match between a purchased product and a barcode 110.

In some examples, the internal dictionary 124 is implemented as a standalone full-text search server or platform. For example, the internal dictionary 124 can serve as both a search engine and a distributed document database with SQL support. The internal dictionary 124 can store various information. For example, entries in the internal dictionary 124 can include different fields such as a "brand," "price," "counter," "created_on," "EAN," "entity description," "entity description_n-gram," "receipt description," "receipt description_n-gram," "source," "store ID," "storename," and/or "upid." The brand can refer to a brand of an item and can be obtained from the product datastore 126. The price can refer to a price obtained from the products datastore 126 and associated with a respective barcode (e.g., EAN). The counter can refer to a number of times that a specific product description and storeID have been matched in a receipt. The created_on can refer to a creation date of an entry in the internal dictionary 124. The EAN can refer to an EAN (e.g., barcode) corresponding to a product. The entity description can refer to an item description obtained from the products datastore 126 for a respective barcode. The entity description_n-gram can refer to an n-gram tokenization of a respective entity description. The receipt description can refer to an item description extracted from a receipt image 108. The receipt description_n-gram can refer to an n-gram tokenization of a respective receipt description. The source can refer to a source of information, such as the products datastore 126, the previous jobs database 130, a retailer, etc. The storeID can refer to a unique identifier of a respective store. The upid can refer to a unique identifier for a processed receipt image 108. Below is an example record that can be saved in the internal dictionary 124:

```
"brand":"KAHVIKEKSIT",
"price":"0",
"counter":0,
"created_on":"2020-06-07T19:56:52Z", "ean":"5010204791500",
"entitydescription":"QUADRUPLE CHOCO COOKIES",
"entitydescription_n-gram":"QUADRUPLE CHOCO COOKIES",
"receiptdescription":"QUADRUPLE CHOCO COOKIES",
"receiptdescription_n-gram":"QUADRUPLE CHOCO COOKIES",
"source":"RETAILER-PROVIDED",
"storeid":"0000001022",
"storename":"PRISMA",
"upid":"433053c7-a3cb-4ca2-9e12-3ec68e16dbaa",
"_version_":16688714225664655540},
```

The example products datastore 126 is structured to store product information for a plurality of products. The product information can include, for example, product descriptions, product images, barcodes, etc. and/or other attributes of the products. In some examples, the products datastore 126 is a copy of a larger products database that is periodically and/or aperiodically obtained by the decoding circuitry 122. For example, the decoding circuitry 122 can retrieve the copy of the products datastore 126 that includes a plurality of the products for a specific market or country and selected attributes of the plurality of products that may be less than all available attributes. In some examples, the copy is retrieved on a weekly basis. In some examples, the copies of the products datastore 126 are obtained because the large products database is too large and/or does not include an interface for searching. In additional or alternative examples, the products datastore 126 includes an interface that allows the document decode circuitry 114 to request information.

The products datastore 126 can store various information including different fields such as a "EAN," "store code," "product ID," "description," "price," "type," "BSDSCRID," "data source," and/or other information. The brand can refer to a brand of an item and can be obtained from the product datastore 126. The EAN can refer to an EAN (e.g., barcode) corresponding to a product. The store code can refer to a group code obtain from the products datastore 126 that matches a mapping in the retailer database 128. The product ID can refer to a Not a Number (NAN) key in the products datastore 126. The description can refer to a description as listed in the products datastore 126. The price can refer to a unitary price of the product as found in products datastore 126 for a specific barcodes (e.g., EAN). The type can refers to a barcode type, such a EAN, UPC, local assigned code (LAC), etc. The BSDSCRID can refer to a best description ID attribute from the products datastore 126, which can be the same as the product ID. In some examples, the products datastore 126 stores other fields such as DEPCODE (e.g., department code), DEPDESCR (e.g., department description), SUPPLIER CODE (e.g., supplier code for the product), BRAND (e.g., brand of the product), OWNER (e.g., brand owner of the product), CATEGORY (e.g., product category), PNU (e.g., a number of units in a package of the product), PACKAGING (e.g., product packaging description), PACKAGING MATERIAL (e.g., product packaging material), SUPER GROUP (e.g., a code and/or identifier to group products), IS BEST DESCRIPTION (e.g., a yes or no indication), and/or other information. Below is an example entry that can be saved in the products datastore 126:

```
{
'ean': '6412612460112',
'storecode': 'FI001', 'bsdscrid': '1600752112.0',
'productid': '4422746', 'type': 'EAN',
'description': 'NALLE 100G 75%VILLA/25%POLYAMIDI',
'depcode': '',
'depdscr': '',
'suplrcode': '', 'price': 0,
'isBestDescription': 'Y', 'datasource':, 'brand': '',
'brandowner': '',
'category': '',
'pnu': '',
'packaging': '', 'packagingmaterial': '',
'module': 'SEWNG/HBRDSHRY',
'supergroup': ''
}
```

The example retailer database 128 is structured to store information regarding various retailers or stores for various countries. For example, the retailer database 128 can include information such as a store code (e.g., store_code), a store name (e.g., store_name), a global store code (e.g., global_store), a favorite flag (e.g., is_favorite_store), and/or a products datastore mapping identifier (e.g., products_mappings). In some examples, the decoding circuitry 122 obtains a copy of the retailer database 128, which can be stored in the example database 120. In some examples, the decoding circuitry 122 includes an interface to the retailer database 128. In some examples, the retailer database 128 can be used during decoding to translate a favorite store into a "global store code", which can be useful during a search of the products datastore 126. For example, to limit a search in the products datastore 126 to products belonging to a specific store, the decoding circuitry 122 can use the group code and/or a global store code in a search query. Below are example entries that can be saved in the retailer database 128 and/or stored in the database 120:

| | |
|---|---|
| 1. | store_code: 0000001999 |
| | store_name: MUU SUOMEN LÄHIKAUPPA |
| | global_store: 0000001015 |
| | is_favorite_store: true |
| | products_mappings: ["FI016"] |
| 2. | store_code: 0000001044 |
| | store_name: STOCKMANN |
| | global_store: NULL |
| | is_favorite_store: false |
| | products_mappings: ["FI016"] |
| 3. | store_code: 0000001045 |
| | store_name: TARMO |
| | global_store: NULL |
| | is_favorite_store: false |
| | products_mappings: ["FI016"] |
| 4 | store_code: 0000001046 |
| | store_name: ELINTARVIKE ERIKOISMLÄ |
| | global_store: NULL |
| | is_favorite_store: false |
| | products_mappings: ["FI016"] |
| 5. | store_code: 0000001051 |
| | store_name: ANTTILA/KODINYKK |
| | global_store: NULL |
| | is_favorite_store: false |
| | products_mappings: ["FI016"] |

In some examples, the store code and store name may match the store details provided by the panelist. As illustrated above, the first example corresponds to a favorite store and, thus, includes a global store identifier. The second example on the other hand does not corresponding to a favorite store and, thus, does not include a global store identifier.

The example previous jobs database 130 stores product descriptions and barcodes 110 that were unable to be matched. For example, the decoding circuitry 122 can search the available data sources to identify a match between the product description and barcode 110, but fail to identify such a match. The unmatched item description(s) and barcode(s) 110 can be stored in the previous jobs database 130. In some examples, another product description and barcode(s) 110 can be searched against the previous jobs database 130 to determine whether a similar product description and barcode 110 combination has been previously observed. In other words, the previous jobs database 130 can be used to track previous processed receipts and increase chances of recognizing associations using this historical information.

The previous jobs database 130 can store various information including fields such as "job_id," "description," "EAN," "store_ID," and/or "created_on." In some examples, the description and EAN fields can include an array and/or list of item descriptions as extracted from the extraction circuitry 118 and barcodes 110 provided by the panelist, respectively. In some examples, the previous jobs database 130 can include a record for each processed receipt image 108 that includes un-matched items after searching the available data sources.

The example decoding circuitry 122 is structured to receive and/or retrieve purchase information extracted by the extraction circuitry 118 and respective barcodes 110 corresponding to a receipt image 108. The decoding circuitry 122 generates at least one search query that is used to search a data source, such as the internal dictionary 124, the products datastore 126, and/or the previous jobs database 130. In some examples, the decoding circuitry 122 removes duplicate barcodes 110 provided by the panelist to search with a list of unique barcodes. In some examples, the decoding circuitry 122 matches one extracted purchased product at a time. For example, the decoding circuitry 122 can generate a query that includes a product description for a first product, a store ID, and the unique list of the barcodes 110. In some examples, a barcode 110 that is matched to a product description can be removed from the list of unique barcodes 110 before searching another product.

In some examples, the decoding circuitry 122 may need to search more than one data source to identify a match between a product description and a barcode 110. For example, if a search of a first data source does not yield a match, the decoding circuitry 122 may need to search one or more additional data sources. In some examples, the decoding circuitry 122 searches the internal dictionary 124 first. If no match is identified for a product, the decoding circuitry 122 can search the products datastore 126. In some examples, the decoding circuitry 122 can search the previous jobs database 130 if the products datastore 126 search(es) does not yield a match. If no match is identifies after the previous jobs database 130 search, the un-matched product(s) and barcode(s) 110 can be stored in the previous jobs database 130.

In some examples, the decoding circuitry 122 searches one data source at a time for a specific basket. For example, the decoding circuitry 122 may search each detected product extracted by the extraction circuitry 118 against the internal dictionary 124 (e.g., one product at a time). Products that are matched to barcodes 110 can be saved to a response. Products that were not matched using the internal dictionary 124 can be searched against the products datastore 126 (e.g., one product at a time). Products that are matched to barcodes 110 using the products datastore 126 can be saved to a response. Products that were not matched using the products datastore 126 can then be searched against the previous jobs database 130 (e.g., one product at a time). Unmatched products after the previous jobs database 130 can be saved to the previous jobs database 130 to potentially be matched at a later point in time. In other examples, a first product can be searched against the data source(s) until a match is determined or until all data sources have been searched before searching a second product.

An identified match between a purchased product identified by the extraction circuitry 118 and a respective barcode 110 provided by the panelist can be stored in the internal dictionary 124. Accordingly, the internal dictionary 124 is built (e.g., expanded, added to, grown, etc.) over time. Product descriptions and barcodes 110 that are not matched after the decoding process can be saved in the previous jobs database 130. In some examples, the decoding circuitry 122 generates a response that includes product descriptions, quantities, prices, etc. and associated barcodes 110. In some examples, the response is transmitted to example report generating circuitry 134.

The example report generating circuitry 134 is structured to compile results of receipt extraction to generate a report of the results. In some examples, the report includes decoded purchase data corresponding to the receipt image 108 and respective barcodes 110. In some examples, the report is transmitted to the monitoring entity 102 to be further analyzed.

In the illustrated example of FIG. 1, the document decode circuitry 114 includes example machine learning circuitry 136. The machine learning circuitry 136 is structured to train AI models for use by the document decode circuitry 114 and/or other portions of a DDS. For example, the machine learning circuitry 136 can be used to train AI models to detect regions of interest, rows, and/or columns. In some examples, the machine learning circuitry 136 can train an AI model to save and/or store results of the decoding circuitry 122. In additional or alternative example, the machine learning circuitry 136 is separate from the document decode circuitry 114 in a location that is accessible by the document decode circuitry 114. For example, the machine learning circuitry 136 may located with the monitoring entity 102, where AI models can be trained. In some such examples, the trained models can be transmitted to the document decode circuitry 114, which may be deployed as cloud service.

In some examples, the document decode circuitry 114 includes means for generating text data from an image. For example, the means for generating text data from the image may be implemented by OCR circuitry 116. In some examples, the OCR circuitry 116 may be instantiated by processor circuitry such as the example processor circuitry 3512 of FIG. 35. For instance, the OCR circuitry 116 may be instantiated by the example general purpose processor circuitry 3600 of FIG. 36 executing machine executable instructions such as that implemented by at least blocks 2704 of FIG. 27. In some examples, the OCR circuitry 116 may be instantiated by hardware logic circuitry, which may be implemented by an ASIC or the FPGA circuitry 3700 of FIG. 37 structured to perform operations corresponding to the machine readable instructions. Additionally or alternatively, the OCR circuitry 116 may be instantiated by any other combination of hardware, software, and/or firmware. For example, the OCR circuitry 116 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the document decode circuitry 114 includes means for extracting purchase information. For example, the means for extracting purchase information may be implemented by extraction circuitry 118. In some examples, the extraction circuitry 118 may be instantiated by processor circuitry such as the example processor circuitry 3512 of FIG. 35. For instance, the extraction circuitry 118 may be instantiated by the example general purpose processor circuitry 3600 of FIG. 36 executing machine executable instructions such as that implemented by at least blocks 2706-2712 of FIGS. 27-32. In some examples, the extraction circuitry 118 may be instantiated by hardware logic circuitry, which may be implemented by an ASIC or the FPGA circuitry 3700 of FIG. 37 structured to perform operations corresponding to the machine readable instructions. Additionally or alternatively, the extraction circuitry 118 may be instantiated by any other combination of hardware, software, and/or firmware. For example, the extraction circuitry 118 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the document decode circuitry 114 includes means for decoding a basket. For example, the means for decoding the basket may be implemented by decoding circuitry 122. In some examples, the decoding circuitry 122 may be instantiated by processor circuitry such as the example processor circuitry 3512 of FIG. 35. For instance, the decoding circuitry 122 may be instantiated by the example general purpose processor circuitry 3600 of FIG. 36 executing machine executable instructions such as that implemented by at least blocks 2714 of FIGS. 27, 33, and 34. In some examples, the decoding circuitry 122 may be instantiated by hardware logic circuitry, which may be implemented by an ASIC or the FPGA circuitry 3700 of FIG. 37 structured to perform operations corresponding to the machine readable instructions. Additionally or alternatively, the decoding circuitry 122 may be instantiated by any other combination of hardware, software, and/or firmware. For example, the decoding circuitry 122 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 2:
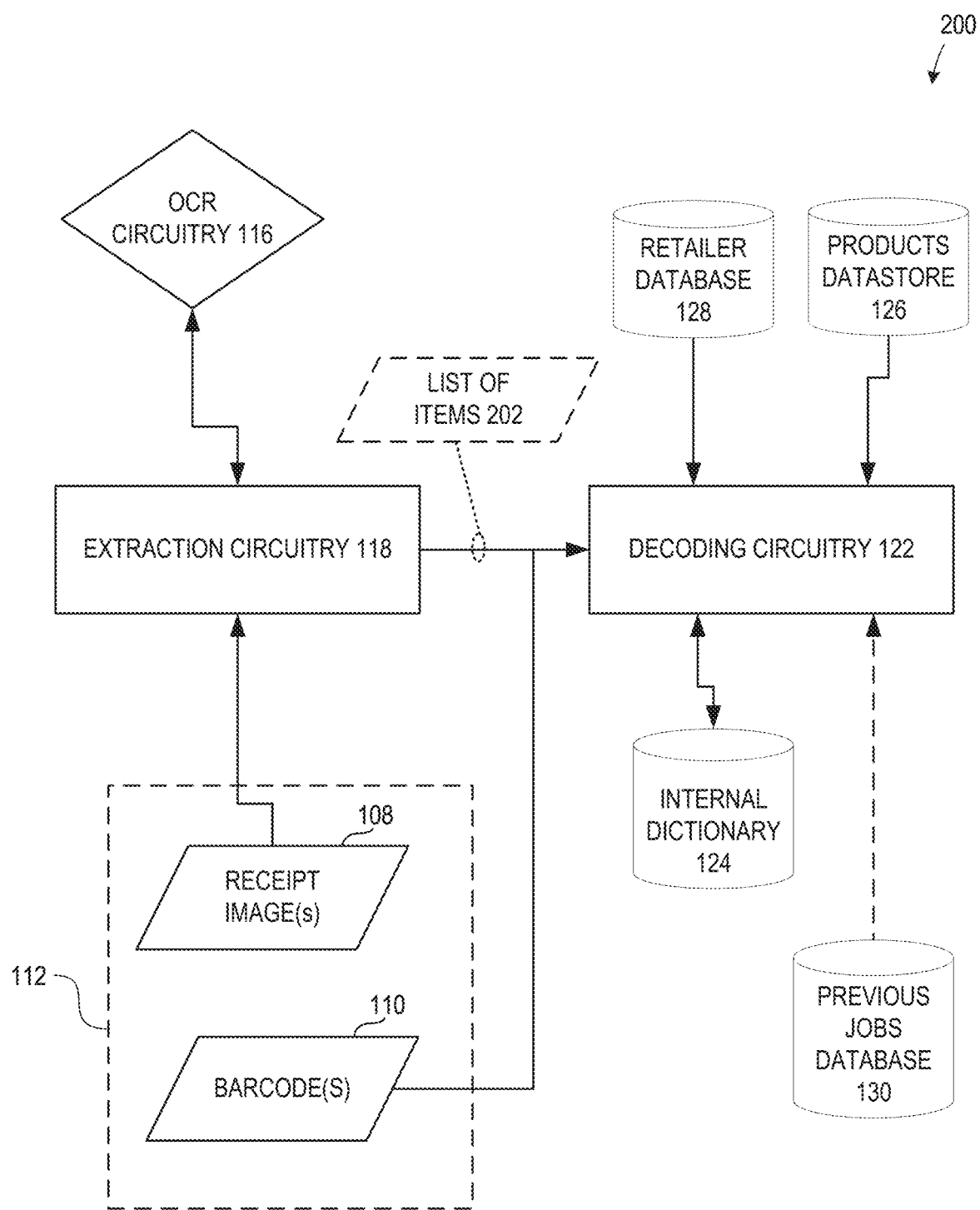
FIG. 2 is a schematic illustration of an example system for generating purchase data from a receipt image and corresponding barcodes constructed in accordance with the teachings of this disclosure.

FIG. 2 is a block diagram of an example system 200 for generating purchase data from a receipt image 108 and barcodes 110 constructed in accordance with the teachings of this disclosure. In some examples, the system 200 implements a decoding process for receipts, which can be part of a larger DDS. In some examples, the system 200 implements the document decode circuitry 114 of FIG. 1. In some examples, the system 200 provides a simpler technique for consumer panelists to record individual and/or household purchases from any number of retailers by allowing the panelists to upload an image of a receipt rather than manually input purchase data contained in the receipt. Further, the system 200 reduces the panelists' burden without losing a granularity and/or accuracy of afforded by other collection methods.

As noted above, a panelist provides a receipt image 108 (e.g., corresponding to a receipt) that includes purchase information and barcodes 110 corresponding to purchased products. In examples disclosed herein, receipt processing is divided into an extraction phase, which can be implemented by the example extraction circuitry 118, and a decoding phase, which can be implemented by the example decoding circuitry 122.

In some examples, the receipt image 108 is provided to the example extraction circuitry 118 to extract purchase information from the receipt image. That is, the extraction circuitry 118 obtains information from the receipt image 108. The extraction circuitry 118 of FIGS. 1 and/or 2 does not rely on the barcodes 110 to process the receipt image 108. Thus, in some examples, the barcodes 110 are provided directly to the example decoding circuitry 122 to be matched with purchase details extracted by the extraction circuitry 118. In some examples, the receipt images 108 and barcodes 110 are provided to the extraction circuitry 118 and the decoding circuitry 122, respectively, from a basket datastore (e.g., basket datastore 112 of FIG. 1).

In some examples, the system 200 relies on a complex variety of data sources that can include useful information but can also provide variance, noise, and uncertainty that the system 200 needs to manage to deliver expected outcomes (e.g., outputs). For example, the receipt image 108 can belong to any of several retailers that employ several printing layouts and formats. The extraction circuitry 118 is structured to leverage OCR text extraction techniques applied by the OCR circuitry 116 and a detected structural layout of the receipt image 108 to automatically extract text from the images. Accordingly, the system 200 can be generalized and still provide accurate data.

The extraction circuitry 118 of FIG. 2 generates a list of items 202 corresponding to purchased products listed on the receipt image 108. The list of items 202 can include, for each purchase product, a product description, a price, a quantity, and/or a discount applied. The list of items 202 is provided to the decoding circuitry 122 along with a list of barcodes 110 uploaded by the panelist.

The decoding circuitry 122 is structured to generate associations between products in the list of items 202 and corresponding barcodes 110. In other words, the decoding circuitry 122 associates a single barcode to a single extracted product description. To facilitate the matching, the decoding circuitry 122 is coupled to one or more databases (e.g., products datastore 126, retailer database 128, previous jobs database 130) and one or more dictionaries (e.g., an internal dictionary 124, a retail dictionary 132). In some examples, the decoding circuitry 122 matches, one product at a time, the list of items 202 to respective barcodes 110. As a product of the list of items 202 is matched, the matched barcode 110 is removed from the list of barcodes 110. A next product of the list of items 202 is searched against at least one database with the list of barcodes 110 less any matched barcodes 110.

In some examples, the system 200 relies on document analysis and recognition techniques that include image processing solutions. In some examples, the image processing solutions include four main steps including pre-processing, object detect, object recognition, and post-processing. The first step (e.g., pre-processing) typically includes applications of techniques such as image enhancement, distortion corrections and/or noise reduction. The second step (e.g., object detection) typically includes layout analysis techniques, which aim to is to obtain the structure of the document such as textual, layout, and image components. The third step (e.g., object recognition) typically aims to recognize specific information contained on the objects detected in the second step. The fourth step (e.g., post-processing) typically includes establishing relationships between the objects of interest recognized in the document.

In some examples, the system 200 incorporates the four main modules or steps. In some examples, the first step (e.g., pre-processing) can correspond to detecting regions of interest within a receipt image 108. For example, the detecting of the regions of interest reduces noise within the receipt image 108 and prepare the receipt image 108 for further processing. In some examples, second step (e.g., object detection) can correspond to detecting rows and columns within the receipt image 108. For example, detecting rows and columns within the receipt image 108 is used to detect the structure of the receipt. In some examples, third step (e.g., object recognition) can correspond to extracting purchase information from the receipt image using the OCR output. For example, by mapping words output by the OCR circuitry 116 to detected rows and columns, a meaning of the words can be determined based on their place in the receipt. In some examples, the fourth step (e.g., post-processing) can correspond to decoding the basket by associated extracted purchase information with provided barcodes 110. That is, the recognized words are post-processed to generate associations between extracted product descriptions and barcodes.

Figure 3:
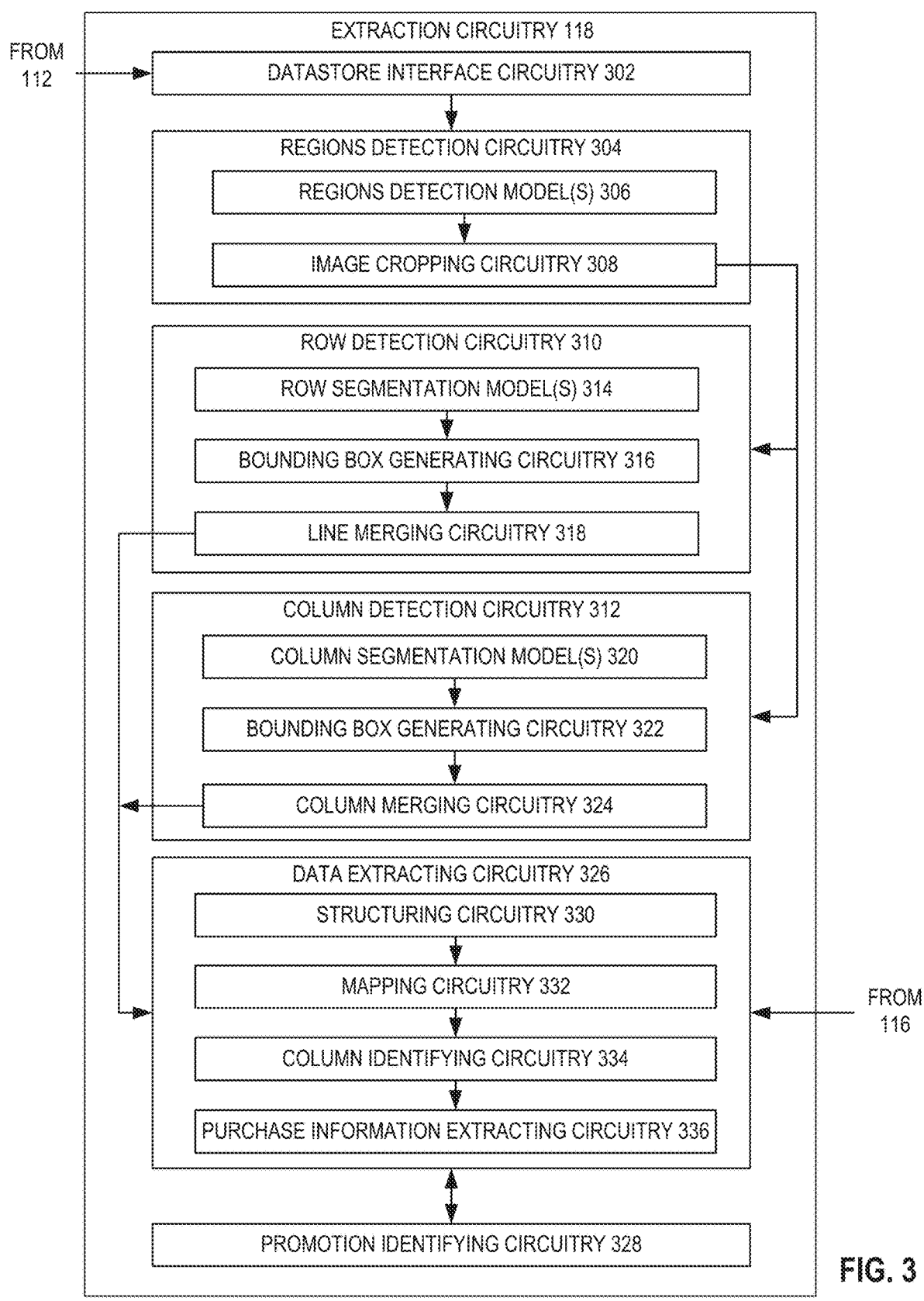
FIG. 3 is a block diagram of the example extraction circuitry of FIGS. 1 and/or 2.

FIG. 3 is a block diagram of the example extraction circuitry 118 of FIGS. 1 and 2 to extract purchase information from a receipt image 108. The extraction circuitry 118 of FIG. 3 may be instantiated (e.g., creating an instance of, bring into being for any length of time, materialize, implement, etc.) by processor circuitry such as a central processing unit executing instructions. Additionally or alternatively, extraction circuitry 118 of FIG. 3 may be instantiated (e.g., creating an instance of, bring into being for any length of time, materialize, implement, etc.) by an ASIC or an FPGA structured to perform operations corresponding to the instructions. It should be understood that some or all of the extraction circuitry 118 of FIG. 3 may, thus, be instantiated at the same or different times. Some or all of the circuitry may be instantiated, for example, in one or more threads executing concurrently on hardware and/or in series on hardware. Moreover, in some examples, some or all of the extraction circuitry 118 of FIG. 3 may be implemented by one or more virtual machines and/or containers executing on the microprocessor.

The extraction circuitry 118 includes example datastore interface circuitry 302, which is structured to provide an interface between the extraction circuitry 118 and the example basket datastore 112. For example, the extraction circuitry 118 can receive and/or retrieve a receipt image 108 from the basket datastore 112 via the example datastore interface circuitry 302. In some examples, the datastore interface circuitry 302 transmits the receipt image 108 to example regions detection circuitry 304.

The example regions detection circuitry 304 is structured to detect regions of interest from the receipt image 108. In some examples, the regions of interest include a receipt region and a products region. In the illustrated example of FIG. 3, the regions detection circuitry 304 applies an AI-based recognition model to the receipt image 108 to detect the regions of interest. Accordingly, the regions detection circuitry 304 includes an example regions detection model(s) 306.

In some examples, the regions detection model 306 is based on computer vision algorithms that focus on object detection and classification techniques. For example, the regions detection model 306 of FIG. 3 is based on a faster R-CNN architecture. Whereas a standard CNN is mainly based on image classification, the faster R-CNN is based on object detection, which combines localization (e.g., detection) and classification. The faster R-CNN architecture is forced to focus on a single region of the receipt image 108 at a time because it is expected that only a single object of interest will dominate in a given region. In some examples, the regions detection model 306 detects the regions using a selective search algorithm followed by a resizing operation. For example, the selective search algorithm can be used to detect the regions and to generate bounding boxes corresponding to the detected regions. The regions detection model 306 can input the bounding boxes into a CNN to be classified. In some examples, the bounding boxes are resized such that each bounding box is of substantially equal size before being fed to the CNN for classification and bounding box regression. In other words, the regions detection model 306 can take the receipt image 108 as an input and produce a set of bounding boxes as an output. The bounding boxes can contain an object (e.g., the region) and a category (e.g., the receipt region or the product region). In some examples, an output of the regions detection model 306 is input to example image cropping circuitry 308.

The regions detection circuitry 304 includes the example image cropping circuitry 308, which is structured to crop the receipt image 108 based on the detected regions of interest. For example, the image cropping circuitry 308 crops the receipt image 108 to generate a first cropped image corresponding to the receipt region and a second cropped image corresponding to the products region. In some examples, the image cropping circuitry 308 crops the receipt image 108 based on the bounding boxes generated by the regions detection model 306. In the illustrated example of FIG. 3, the image cropping circuitry 308 transmits the first cropped image corresponding to the receipt region to example row detection circuitry 310 and transmits the second cropped image corresponding to the products region to example column detection circuitry 312.

Figure 4A:
FIG. 4A is an illustration of an example receipt region of an example receipt image that can be output by the example regions detection circuitry of FIG. 3.

FIG. 4A illustrates an example receipt region 402. The receipt region 402 includes a receipt portion of an example receipt image 108 uploaded by a panelist. The receipt region of FIG. 4A corresponds to a cropped receipt image 108 (e.g., by the image cropping circuitry 308). In some examples, the receipt region 402 is an output of the example regions detection circuitry 304. For example, the receipt region 402 can be output by the regions detection circuitry 304 and provided as an input to example row detection circuitry 310.

Figure 4B:
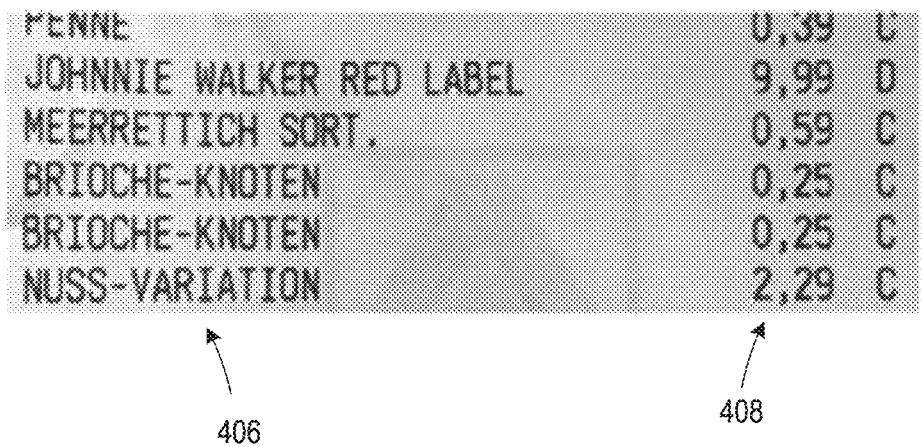
FIG. 4B is an illustration of an example products region of the receipt image of FIG. 4A that can be output by the example regions detection circuitry of FIG. 3.

FIG. 4B illustrates an example products region 404 of the example receipt image 108 of FIG. 4A. The products region 404 includes a listing of purchased products 406 and a listing of prices 408 of the purchased products 406. In some examples, the purchased products 406 portion of the products region 404 includes product descriptions of the purchase products. In some examples, a quantity of a purchased product can be determined by the products region 404. For example, FIG. 4B shows two brioche-knotens purchased. Thus, the brioche-knoten has a quantity of two. The products region 404 of FIG. 4B corresponds to another cropped receipt image 108 (e.g., by the image cropping circuitry 308). In some examples, the products region 404 is another output of the example regions detection circuitry 304. For example, the products region 404 can be output by the regions detection circuitry 304 and provided as an input to example column detection circuitry 312.

Referring again to FIG. 3, the example row detection circuitry 310 is structured to detect rows of text within a receipt region of a receipt image 108. In the illustrated example of FIG. 3, the row detection circuitry 310 applies a CNN-based model to the receipt region to detect the rows. Accordingly, the row detection circuitry 310 includes an example row segmentation model(s) 314. In some examples, the row segmentation model 314 is a pixel-wise predictor. For example, when the row detection circuitry 310 applies the row segmentation model 314 to the receipt region, each pixel within the region can be identified as belonging to a first class or a second class. The first class can be a line (e.g., row) class and the second class can be a background class, a non-line class, other class, etc.

In some examples, the row segmentation model 314 outputs a pixel-wise mask. For example, the pixel-wise mask can include a matrix corresponding to pixels in the receipt region that includes binary (e.g., is and 0 s) corresponding to light space (e.g., 1 s) and dark space (e.g., 0 s).

The pixel-wise mask can thus indicate which pixels are text (e.g., irrespective of a color of the text) and which pixels are not text (e.g., background pixels). In some examples, the pixel-wise mask includes pixels classified as row pixels grouped into clusters. Each of the clusters can correspond to at least part of a line of text. In the illustrated example of FIG. 3, the pixel-wise mask output by the row segmentation model 314 may need refinement to yield a desired outcome of bounding boxes corresponding to text lines.

The row detection circuitry 310 includes example bounding box generating circuitry 316, which is structured to generate bounding boxes corresponding to pixel clusters output by the row segmentation model 314. To generate the bounding boxes, the bounding box generating circuitry 316 of FIG. 3 identifies contours around the clusters of pixels that were identified as belonging to a text line. As disclosed herein, a contour is a free connection of dots that forms a convex closed form. In some examples, the detected contours can be converted into a minimal geometrical representation that can be projected into a set of intersecting lines. For example, a detected contour can be projected into a polygon. In some examples, the polygons are projected using a minimum rotated rectangle (e.g., "min rotated rectangle"). However, other projection can be used in additional or alternative examples, such as rectangle without rotation, quadrilateral, etc.

Figure 5A:
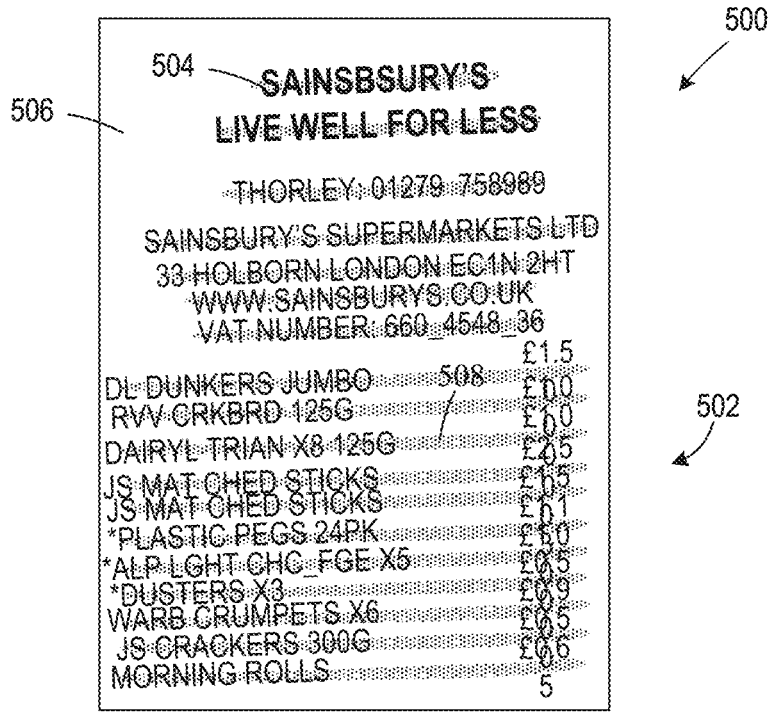
FIG. 5A is an illustration of an example pixel-wise mask on an example receipt region that can be output by an example row detection model.

FIG. 5A illustrates an example receipt region 500 that includes an example pixel-wise mask 502. For example, the receipt region 500 having the pixel-wise mask can be output by an example row segmentation model 314. The pixel-wise mask 502 identifies each pixel of the receipt region 500 as belonging to a text line 504 or as background 506. The pixel-wise mask 502 includes clusters 508 corresponding to groups of pixels identified as belonging to text line 504.

Figure 5B:
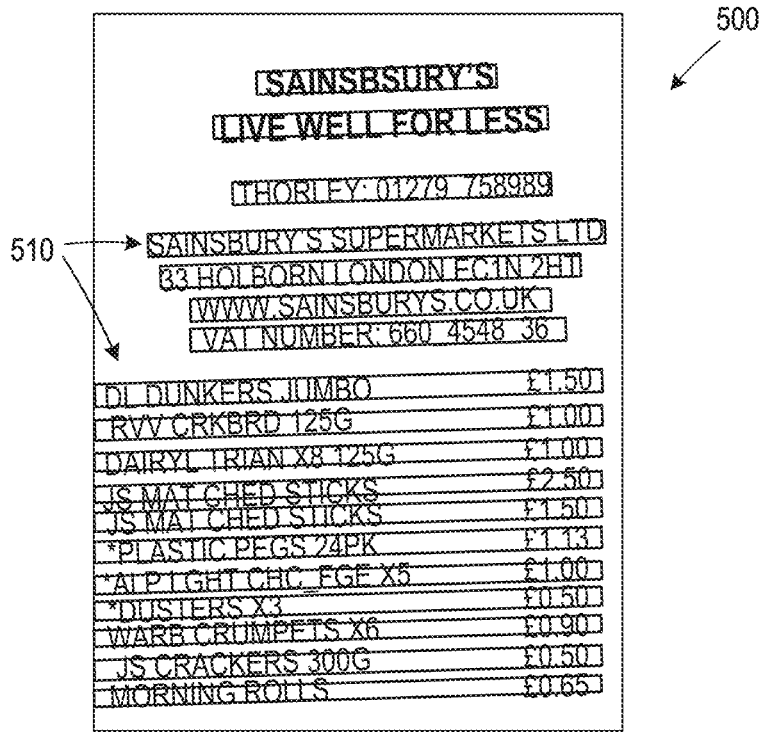
FIG. 5B is an illustration of the receipt region of FIG. 5A after a post-processing block generated bounding boxes corresponding to text lines based on the pixel-wise mask in accordance with the teachings of this disclosure.

FIG. 5B illustrates example bounding boxes (e.g., polygons, polygonal regions, etc.) 510 that can be detected and output by example bounding box generating circuitry 316. For example, the bounding boxes 510 can correspond to cluster 508 of pixels identified as belonging to the text lines 504. In some examples, the bounding boxes 510 correspond to rows of the receipt region 500.

Referring again to FIG. 3, the bounding box generating circuitry 316 outputs a plurality of bounding boxes including respective coordinates corresponding to lines of the receipt region. In some examples, however, two or more bounding boxes that belong to the same text line are not connected. For example, if there is a wide blank space between words, the bounding box generating circuitry 316 may miss such a connection and generate separate bounding boxes for the line. Accordingly, the row detection circuitry 310 includes example line merging circuitry 318.

The example line merging circuitry 318 is structured to identify and connect bounding boxes that belong to the same line. In some examples, the line merging circuitry 318 first identifies bounding boxes that are possible candidates for a merging process. For example, the line merging circuitry 318 can identify candidates for the merging processing by segregating bounding boxes based on example equation 1, where hL is a horizontal length of a particular bounding box, n is a number of total detected bounding boxes, and a refers to the specific bounding box.

$$hL_a < \max(hL_1, hL_2, hL_3, \ldots, hL_n) * 0.9 \qquad \text{Eq. 1}$$

Horizontal lengths of each bounding box can be determined based on coordinates of the bounding boxes. In some examples, a bounding box that has an example largest horizontal length is multiplied by a value of 0.9 (e.g., 90%). However, other values between 0 and 1 can be used additionally or alternatively. In some examples, an output of the formula is a criterion (e.g., a length criterion) for identifying merging candidates and horizontal lengths of each bounding box can be compared to the criterion. Bounding boxes that satisfy the criterion are placed in an example scrutiny list (e.g., candidate list). Bounding boxes that do not satisfy the criterion are determined to not be candidates for the merging process.

In some examples, the line merging circuitry 318 initializes a graph that includes a plurality of nodes. For example, the graph can be a graphical structure used to model pairwise relations between objects. In some examples, each node of the plurality of nodes can represent a bounding box from scrutiny list. After initializing the graph with nodes, edges (e.g., lines, links, etc.) can be added between two nodes whose respective bounding boxes satisfy two conditions. In some examples, conditions are a column connection criterion. For example, adding edges between nodes indicates a connection between respective bounding boxes. In some examples, the first condition is that the two bounding boxes share a positive vertical coordinate (e.g., a y-axis coordinate). In some examples, the second condition is that the two bounding boxes do not have an overlapping horizontal coordinate (e.g., a-axis coordinate).

In some examples, once edges have been added between nodes that satisfy the conditions, connected components (e.g., bounding boxes) can be identified. In some examples, the line merging circuitry 318 applies a depth-first search (DFS) approach to identify connected components in the graph. However, the line merging circuitry 318 can apply other approaches in additional or alternative examples, such as a breadth-first search. The DFS approach is an algorithm for searching graphical data structures that starts at an arbitrary node and explores as far as possible along a branch before backtracking. In the illustrated example of FIG. 3, the line merging circuitry 318 iterates over the connected components (e.g., one by one) and arranges bounding boxes corresponding nodes in a left to right order. In some examples, the arrangement of the bounding boxes can enable the line merging circuitry 318 to merge a leftmost and a rightmost bounding boxes and ignore other (e.g., intermediate) bounding boxes. In some examples, the row detection circuitry 310 outputs a list of polygonal regions (e.g., bounding boxes) that are fitted to printed text lines (e.g., rows) within the receipt region and include coordinates.

Figure 6A:
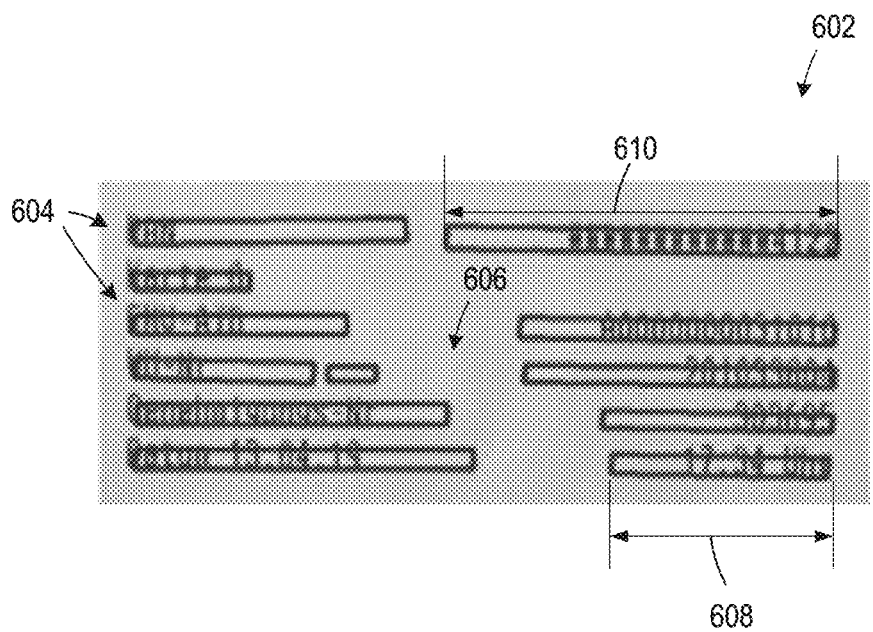
FIG. 6A is an illustration of an example products region of an example receipt image including bounding boxes corresponding to lines of text with missed connections between the lines of text.

FIG. 6A illustrates an example output 602 of example bounding box generating circuitry 316. The output 602 includes a plurality of bounding boxes 604 identified from a pixel-wise mask. In the illustrated example of FIG. 6A, the output 602 includes missed connections 606 between bounding boxes 604 that belong the same row. Accordingly, the output 602 can be provided to example line merging circuitry 318 to identify and connect bounding boxes 604 that belong to the same row.

As noted above, the line merging circuitry 318 identifies lengths 608 of each bounding box 604. The line merging circuitry 318 can then identify a bounding box 604 that has the maximum length (e.g., the largest length value) 610. In some examples, the line merging circuitry 318 multiplies the maximum length 610 by a value (e.g., 0.9) to generate a merging candidate criterion value. In some examples, the line merging circuitry 318 compares each bounding box 604 to the merging candidate criterion value to identify which bounding boxes 604 are shorter than the merging candidate criteria value. Bounding boxes 604 that are shorter than the merging candidate criterion value are determined to be line merging candidates. Bounding boxes 604 that are longer than the merging candidate criterion value are determined to not be merging candidates.

Figure 6B:
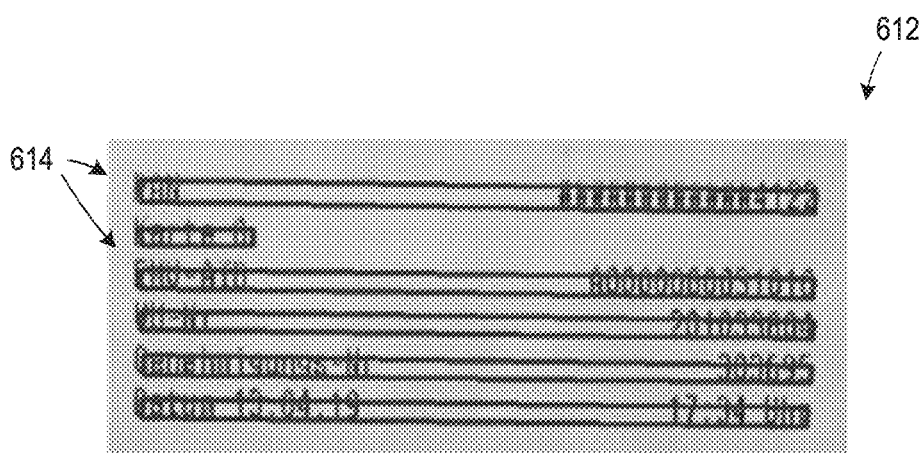
FIG. 6B is an illustration of the products region of FIG. 6A after a post-processing block merged the bounding boxes to connect the lines of text in accordance with the teachings of this disclosure.

FIG. 6B illustrates an example output 612 of the line merging circuitry 318. The output 612 includes a plurality of bounding boxes 614 corresponding to lines (e.g., rows) of a receipt. In other words, the missed connections 606 from FIG. 6A have been connected and/or otherwise fused to generate a text line.

Referring again to FIG. 3, the example column detection circuitry 312 is structured to detect columns using the products region of the receipt image 108. The products region typically includes multiple sub-regions of interest, which are divided or organized based on columns. For example, the products region can include details such as product description, quantity, and price in a column-type organization. In some examples, each column corresponds to one or more purchase details.

In some examples, the column detection circuitry 312 applies a generic column detector that detects columns without having to learn or identify the specific type of column. For example, the generic column detector can be used because the column detection circuitry 312 is concerned with detecting a structure of the receipt, not with text of the receipt. In the illustrated example of FIG. 3, the column detection circuitry 312 applies a CNN-based segmentation model to the products region of the receipt image 108. Accordingly, the column detection circuitry 312 includes an example column segmentation model(s) 320. In some examples, the column segmentation model 320 is a pixel-wise classifier that splits the products region into columns, but does not identify (e.g., classify) types of columns (e.g., price column, products column, etc.). In some examples, when the column detection circuitry 312 applies the column segmentation model 320 to the products region, each pixel within the products region is identified as belonging to a first class or a second class. For example, the first class can be a column class and the second class can be another class, etc. In some examples, the column segmentation model 320 outputs a pixel-wise mask (e.g., classifier) segments pixels. In some examples, the pixel-wise mask includes groups of pixels classified as belonging to a column in a cluster. In the illustrated example of FIG. 3, the pixel-wise mask output by the column segmentation model 320 needs refinement to yield a desired outcome of bounding boxes corresponding to text columns.

The column detection circuitry 312 includes example bounding box generating circuitry 322, which is structured to generate bounding boxes corresponding to pixel clusters output by the column segmentation model 320. To generate the bounding boxes, the bounding box generating circuitry 322 of FIG. 3 identifies contours around the clusters of pixels that were identified as belonging to a column. In some examples, the detected contours can be converted into polygons (e.g., bounding boxes) using example bounding box generating circuitry 322. In some examples, the bounding box generating circuitry 322 is structured to generate a plurality of bounding boxes including respective coordinates corresponding to columns of the products region. In some examples, the bounding box generating circuitry 322 applies similar methods to the example bounding box generating circuitry 316 of the row detection circuitry 310.

Figure 7A:
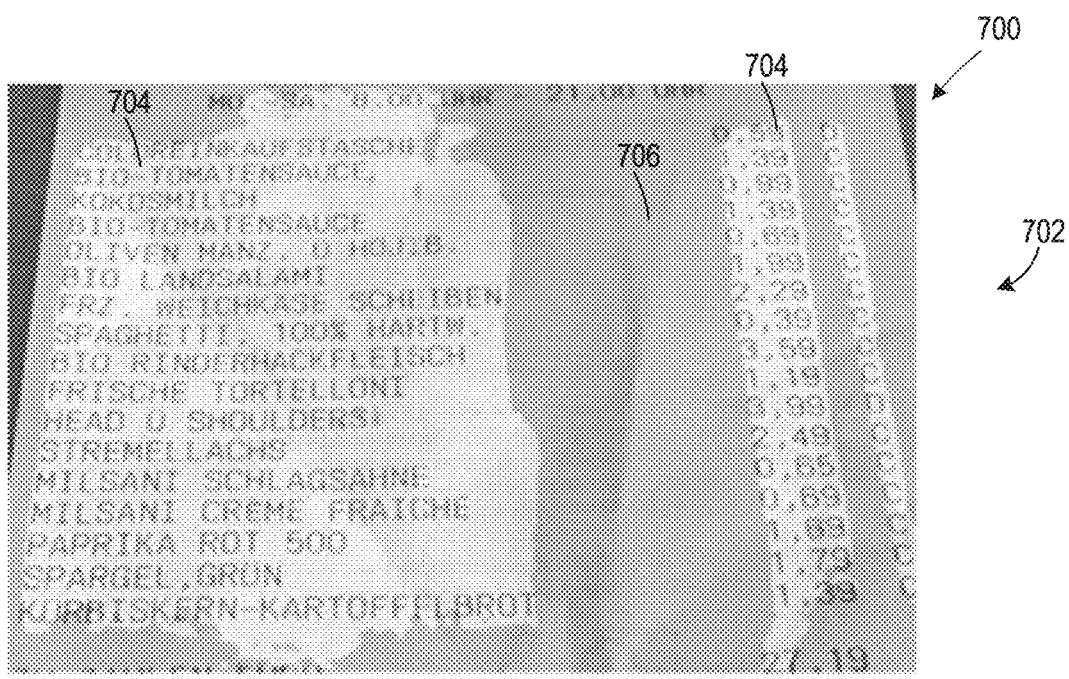
FIG. 7A is an illustration of an example pixel-wise classifier on a products regions of an example receipt image that can be output by an example column segmentation model.

FIG. 7A is an example products region 700 that includes an example pixel-wise classifier 702. For example, the products region 700 having the pixel-wise classifier 702 can be output by the example column segmentation model 320. The pixel-wise segmentation includes segmented regions classified as belonging to a columns 704 and a segment region classified as belonging to background 706.

Figure 7B:
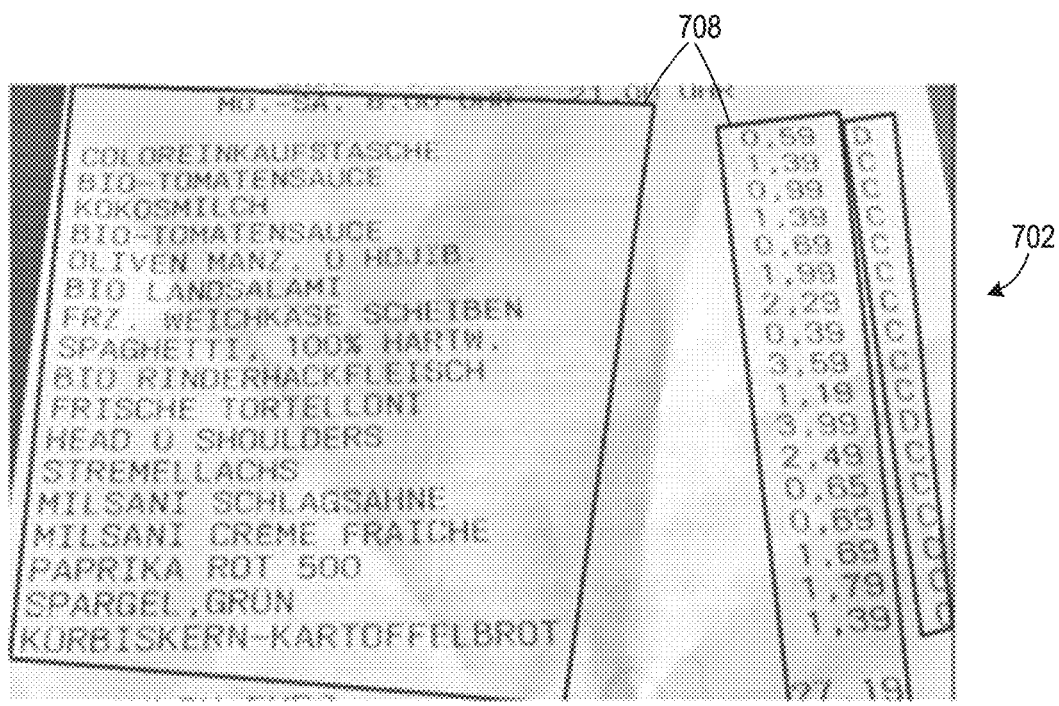
FIG. 7B is an illustration of the products region of FIG. 7A after a post-processing block generated bounding boxes corresponding to columns based on the pixel-mask classifier in accordance with the teachings of this disclosure.

FIG. 7B illustrates example bounding boxes (e.g., polygons, polygonal regions, etc.) 708 that can be detected and output by example bounding box generating circuitry 322. For example, the bounding boxes 708 can correspond to segmented regions classified as belonging to a columns 704. In some examples, the bounding boxes 708 correspond to columns of the products region 700.

Referring again to FIG. 3, the bounding box generating circuitry 322 outputs a plurality of bounding boxes corresponding to columns. In some examples, however, two or more bounding boxes that belong to the same text column are not connected. For example, the bounding box generating circuitry 322 may miss a connection if a wide blank space is present between words. Accordingly, the column detection circuitry 312 includes example column merging circuitry 324.

The example column merging circuitry 324 is structured to connect bounding boxes that belong to the same column but were not connected during by the bounding box generating circuitry 322. In some examples, the column merging circuitry 324 applies similar methods as the line merging circuitry 318 of the row detection circuitry 310. For example, the column merging circuitry 324 can initialize a graph with node representing each detected column and add edges between two nodes that meet two conditions. In some examples, conditions are a column connection criterion. In some examples, first condition is that the two nodes share a positive horizontal coordinate (e.g., a x-axis coordinate). In some examples, the second condition is that the two nodes do not have any overlapping vertical coordinates (e.g., y-axis coordinates). In some examples, connected components in the graph can be identified using a depth-first search (DFS) approach. In the illustrated example of FIG. 3, the column merging circuitry 324 iterates over the connected components one by one and arranges columns to corresponding nodes in a top to bottom to merge a topmost and a bottommost column and ignore other (e.g., intermediate) columns. In some examples, the column detection circuitry 312 outputs a list of polygonal regions that are fitted to columns within the products region and include coordinates.

Figure 8A:
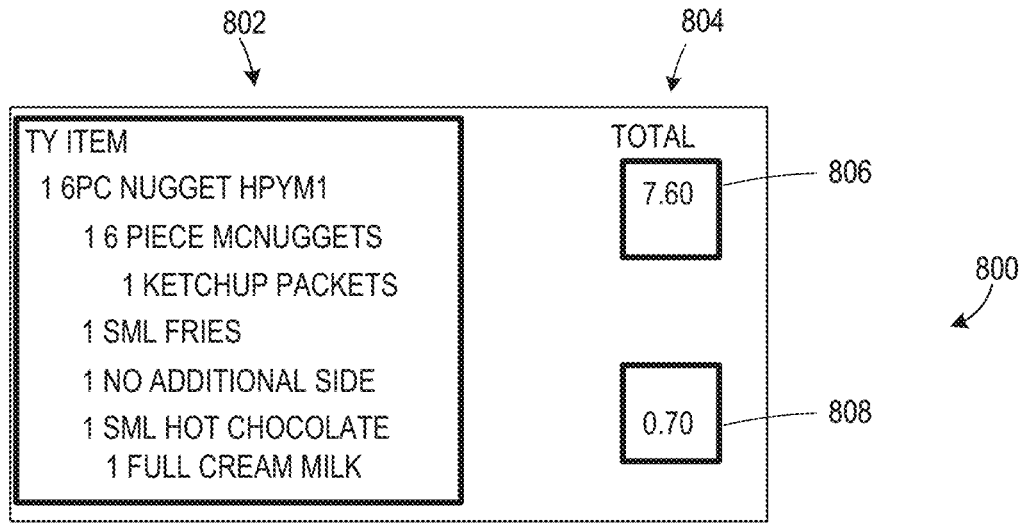
FIG. 8A is an illustration of an example products portion of an example receipt image including bounding boxes corresponding to columns with a missed connection between two bounding boxes that belong to one column.

FIG. 8A illustrates an example products region 800 of an example receipt image 108. The products region 800 includes a first column 802 and a second column 804. In the illustrated example of FIG. 8A, a column segmentation model 320 has been applied to the products regions 800 and bounding box generating circuitry 322 has generated a plurality of bounding boxes corresponding to columns. However, the bounding box generating circuitry 322 missed a connection between a first purchase price and a second purchase price, both of which correspond to the second column 804. That first purchase price has a first bounding box 806 and the second purchase price has a second bounding box 808. However, the first price and the second price should share a bounding box since they both belong to the same column 804.

Figure 8B:
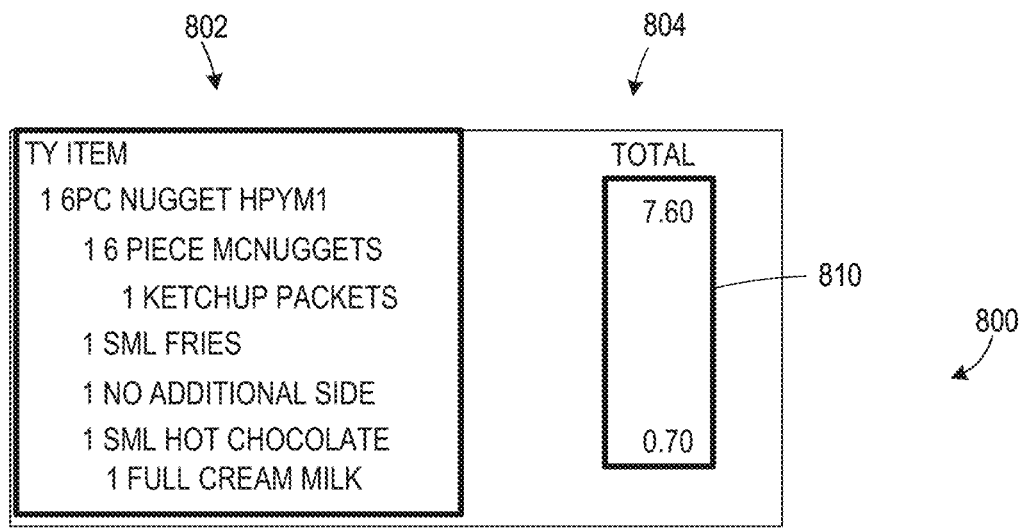
FIG. 8B is an illustration of the example products region of FIG. 8A after a post-processing block merged the two bounding boxes to generate the column in accordance with the teachings of this disclosure.

FIG. 8B illustrates the price column 804 of FIG. 8A after algorithms were applied to merge and/or otherwise fuse the broken column. For example, the column merging circuitry 324 applied algorithms to connect the first bounding box 806 and the second bounding box 808. The result is a bounding box 810 corresponding to the column 804.

Referring again to FIG. 3, the extraction circuitry 118 includes example data extracting circuitry 326, which is structured to extract purchase information from the receipt image 108. The example OCR circuitry 116 transmits detected bounding boxes and coordinates corresponding to detected words to the data extracting circuitry 326. Further, the example row detection circuitry 310 and the example column detection circuitry 312 transmit row bounding boxes and coordinates and column bounding boxes and coordinates, respectively, to the data extracting circuitry 326. The data extracting circuitry 326 inputs the text bounding boxes, row bounding boxes, and column bounding boxes into example structuring circuitry 330.

The example structuring circuitry 330 is structured to form (e.g., generate, build, etc.) a structural layout of at least a targeted portion the receipt. For example, the structuring circuitry 330 can generate a table-like structure corresponding to the products regions of the receipt image 108. In some examples, the structuring circuitry 330 transforms coordinates of the text bounding boxes, the row bounding boxes, and/or the column bounding boxes based on reference coordinates of the original receipt image 108. For example, the coordinates of the bounding boxes may need to be transformed because text bounding boxes were generated using the receipt image 108 while the row bounding boxes were generated using the cropped receipt region and the column bounding boxes were generated using the cropped products region. In some examples, the row bounding boxes are transformed by comparing their coordinates within the receipt region with the receipt region's coordinates with the receipt image 108. For examples, the structuring circuitry 330 can transform the row bounding boxes by adding their coordinates within the receipt regions with the receipt region's coordinates within the receipt image 108. Similarly, in some examples, the column bounding boxes are transformed by comparing their coordinates within the products region with the products region's coordinates with the receipt image 108. For examples, the structuring circuitry 330 can transform the column bounding boxes by adding their coordinates within the products regions with the products region's coordinates within the receipt image 108.

In some examples, the structuring circuitry 330 extends the row bounding boxes and/or the column bounding boxes to an intersection with a products region boundary. For example, the extensions can enable inclusion of words or characters near a borders that may have been missed by the row bounding boxes and/or the column bounding boxes. Once the structure of the receipt is determined, the structure is transmitted to example mapping circuitry 332.

The example mapping circuitry 332 is structured to map words detected by the OCR circuitry 116 to corresponding rows and columns (e.g., to generate a data frame). In some examples, an area of a word that is intersected with a row bounding box and/or a column bounding box is calculated to determine a highest overlapping bounding box in which to position the word. For example IoU calculations between bounding boxes can be calculated to determine the highest overlapping bounding boxes. In some examples, the text bounding boxes are assigned to rows and/or columns that have the highest IoU calculations. In some examples, a digitized receipt corresponding to a receipt image 108 is generated once the mapping is complete. In some examples, the mapping circuitry 332 can transmit the digitized receipt to the database 120 and/or another database for storage.

The extraction circuitry 118 includes example column identifying circuitry 334, which is structured to identify column types by detecting an expression of interest. For example, the column identifying circuitry 334 can classify column headers that identify expressions of interest that correspond to targeted facts (e.g., item description, quantity, and/or price) and/or supplier identification. In some examples, the column identifying circuitry 334 applies techniques based on natural language processing algorithms and tools for manipulation and interpretation of detected text. In some examples, the column identifying circuitry 334 implements a regex engine that applies example regex to identify the column types. For example, the regex can identify strings of characters that specify a search pattern that can be used to match and locate text that corresponds to targeted information such as product description, price, and product code. In some examples, columns that do not include information that falls into a defined regex are classified as an "unknown" column type. In some examples, regex such as quantity, unit of measure, etc. can be present in any column or as a separate line. In some such examples, another regex is generated to account for such regex. For example, the column identifying circuitry 334 can apply a regex that searches for a number followed by a space followed by a product description. In additional or alternative examples, FastText can be used to identify columns. FastText is a technique based on an efficient learning of word representations and sentence classification. This technique allows for supervised and unsupervised representations of words and sentences. In some examples, the representations are named embeddings that can be used for numerous applications from data compression, as features into additional models, for candidate selection, or as initializers for transfer learning. In some examples, a data frame corresponding to a receipt is generated once the columns are identified. In some examples, the column identifying circuitry 334 can transmit the data frame to the database 120 and/or another database for storage.

The example purchase information extracting circuitry 336 is structured to detect purchase information from the digitized receipt. For example the purchase information extracting circuitry 336 extracts purchase details to transmit to the decoding circuitry 122 for the decoding process. In some examples, the purchase information extracting circuitry 336 extracts additional information, such as a promotion applied to the basket. For example, the receipt image 108 can include promotions, such as discounts, multi-buys promotions, etc. Accordingly, in some examples, the column identifying circuitry 334 inputs the digitized receipt into example promotion identifying circuitry 328.

In some examples, the purchase information extracting circuitry 336 is structured to extract purchase details from the data frame. For example, the purchase details include product descriptions for purchased products and prices of the purchased products. In some examples, the purchase information extracting circuitry 336 validates and/or drops elements or rows that do not qualify a condition defined in a respective regex (e.g., removing price from item description column, removing a letter present in a price column, etc.). In some examples, a collection of words is stored in the example database 120 for various retailers, which are referred to as stop words. In some examples, the stop words indicate that a particular row is invalid for the extraction process. For example, stop words can include words such as total, promotion, multibuy, and/or words that cannot be considered as a purchase detail. In some examples, the purchase information extracting circuitry 336 removes rows or elements based on stop words.

After classifying columns and dropping rows of elements that do not include text of interest, the purchase information extracting circuitry 336 has extracted text of interest for the decoding process from the receipt. In some examples, the purchase information extracting circuitry 336 can output a list of purchased products, including product descriptions, prices, quantities, etc. In some examples, the purchase information extracting circuitry 336 transmits the purchase details to the decoding circuitry 122 for decoding.

The promotion identifying circuitry 328 is structured to detect various types of promotions. In some examples, the promotion identifying circuitry 328 can extract a price paid for a specific purchased product (e.g., after a discount is applied), a discount amount, and an original price. In some examples, the price paid, original price, and discount amount are determined for each purchased product detected by data extracting circuitry 326. In some such examples, the price paid and the original price can be the same and the discount amount can be zero (e.g., if no discount was applied). In some examples, the promotion identifying circuitry 328 first identifies a price present in the products region and a price present in a discounting section. For example, the price present in the discounting section can be a discount amount or a paid price. In some examples, the promotion identifying circuitry 328 can calculate a third price based on the two types of prices present in the receipt. In some examples, the promotion identifying circuitry 328 is structured to flag purchased products as including a promotion, multi-buy, etc.

In some examples, the extraction circuitry 118 includes means for generating row bounding boxes. For example, the means for generating row bounding boxes may be implemented by row detection circuitry 310. In some examples, the row detection circuitry 310 may be instantiated by processor circuitry such as the example processor circuitry 3512 of FIG. 35. For instance, the row detection circuitry 310 may be instantiated by the example general purpose processor circuitry 3600 of FIG. 36 executing machine executable instructions such as that implemented by at least blocks 2708 of FIGS. 27 and 29. In some examples, the row detection circuitry 310 may be instantiated by hardware logic circuitry, which may be implemented by an ASIC or the FPGA circuitry 3700 of FIG. 37 structured to perform operations corresponding to the machine readable instructions. Additionally or alternatively, the row detection circuitry 310 may be instantiated by any other combination of hardware, software, and/or firmware. For example, the row detection circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the extraction circuitry 118 includes means for generating column bounding boxes. For example, the means for generating column bounding boxes may be implemented by column detection circuitry 312. In some examples, the column detection circuitry 312 may be instantiated by processor circuitry such as the example processor circuitry 3512 of FIG. 35. For instance, the column detection circuitry 312 may be instantiated by the example general purpose processor circuitry 3600 of FIG. 36 executing machine executable instructions such as that implemented by at least blocks 2710 of FIGS. 27 and 30. In some examples, the column detection circuitry 312 may be instantiated by hardware logic circuitry, which may be implemented by an ASIC or the FPGA circuitry 3700 of FIG. 37 structured to perform operations corresponding to the machine readable instructions. Additionally or alternatively, the column detection circuitry 312 may be instantiated by any other combination of hardware, software, and/or firmware. For example, the column detection circuitry 312 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the extraction circuitry 118 includes means for extracting purchase information. For example, the means for extracting purchase information may be implemented by data extracting circuitry 326. In some examples, the data extracting circuitry 326 may be instantiated by processor circuitry such as the example processor circuitry 3512 of FIG. 35. For instance, the data extracting circuitry 326 may be instantiated by the example general purpose processor circuitry 3600 of FIG. 36 executing machine executable instructions such as that implemented by at least blocks 2712 of FIGS. 27 and 31. In some examples, the data extracting circuitry 326 may be instantiated by hardware logic circuitry, which may be implemented by an ASIC or the FPGA circuitry 3700 of FIG. 37 structured to perform operations corresponding to the machine readable instructions. Additionally or alternatively, the data extracting circuitry 326 may be instantiated by any other combination of hardware, software, and/or firmware. For example, the data extracting circuitry 326 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the example extraction circuitry 118 of FIG. 1 is illustrated in FIG. 3, one or more of the elements, processes, and/or devices illustrated in FIG. 3 may be combined, divided, re-arranged, omitted, eliminated, and/or implemented in any other way. Further, the example datastore interface circuitry 302, example regions detection circuitry 304, example image cropping circuitry 308, example row detection circuitry 310, example bounding box generating circuitry 316, example line merging circuitry 318, example column detection circuitry 312, example bounding box generating circuitry 322, example column merging circuitry 324, example data extracting circuitry 326, example promotion identifying circuitry 328, example structuring circuitry 330, example mapping circuitry 332, example column identifying circuitry 334, example purchase information extracting circuitry 336, and/or, more generally, the example extraction circuitry 118 of FIG. 1, may be implemented by hardware alone or by hardware in combination with software and/or firmware. Thus, for example, any of the example datastore interface circuitry 302, example regions detection circuitry 304, example image cropping circuitry 308, example row detection circuitry 310, example bounding box generating circuitry 316, example line merging circuitry 318, example column detection circuitry 312, example bounding box generating circuitry 322, example column merging circuitry 324, example data extracting circuitry 326, example promotion identifying circuitry 328, example structuring circuitry 330, example mapping circuitry 332, example column identifying circuitry 334, example purchase information extracting circuitry 336, and/or, more generally, the example extraction circuitry 118 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example extraction circuitry 118 of FIG. 1 may include one or more elements, processes, and/or devices in addition to, or instead of, those illustrated in FIG. 3, and/or may include more than one of any or all of the illustrated elements, processes and devices.

Figure 9:
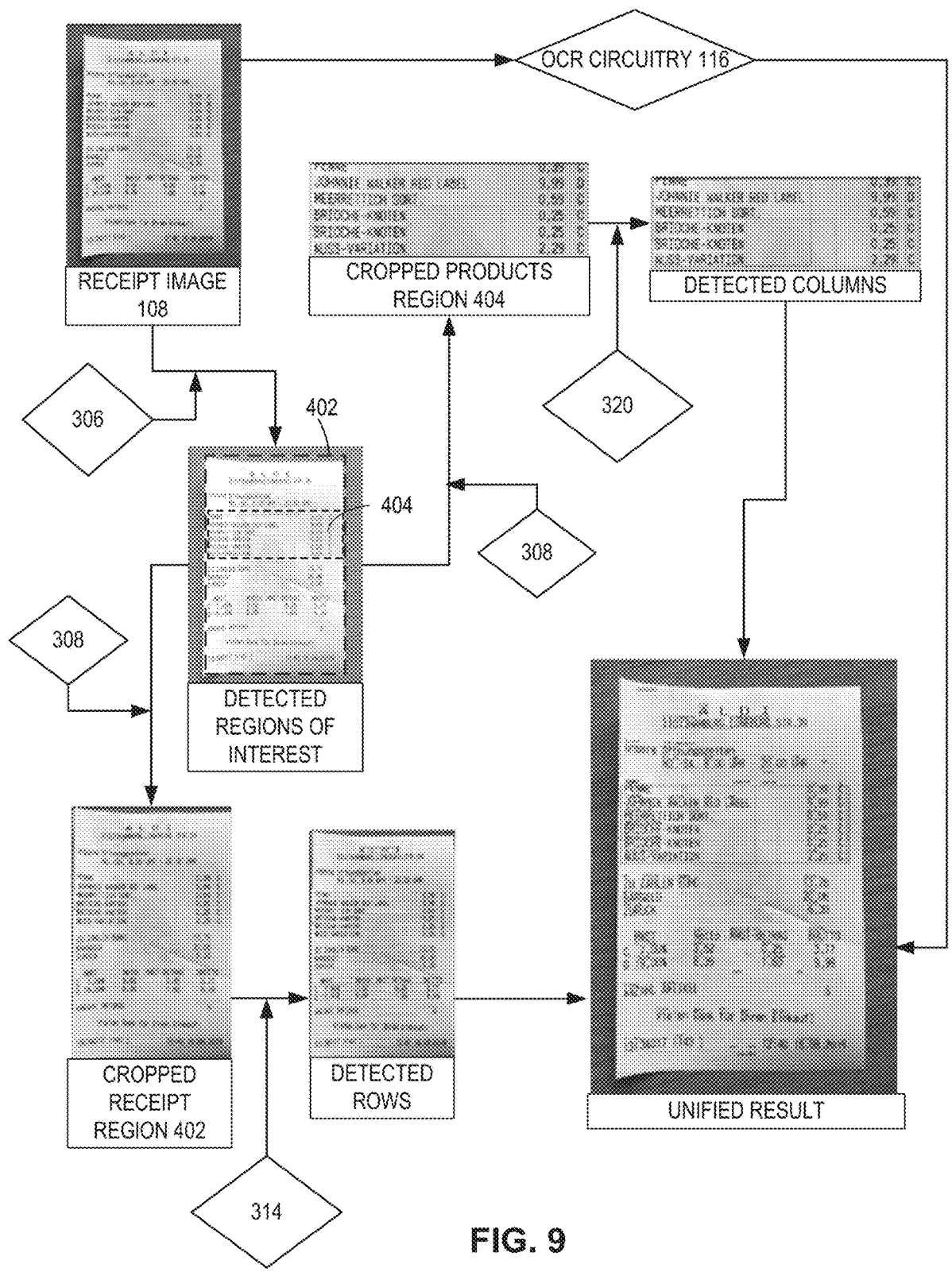
FIG. 9 illustrates an example implementation of the example extraction circuitry of FIGS. 1, 2, and/or 3 including outputs by different models for extracting purchase information from a receipt image.

FIG. 9 illustrates an example outputs of different models for application by the example extraction circuitry 118 for performing document analysis and recognition. Generally, document analysis and recognition aims to automatically extract information from digital documents. In other words, FIG. 9 illustrates steps for detecting targeted regions and text from images of receipts. In some examples, the extraction circuitry 118 relies on AI models to detect the target regions and text. For example, the AI models may implement different aspects of ML and AI including, for example, DL, CV, and NLP.

In the illustrated example of FIG. 9, the example extraction circuitry 118 receives an example receipt image 108 (e.g., from the basket datastore 112). The extraction circuitry 118 transmits the receipt image 108 to the example OCR circuitry 116 to detect and extract text. The extraction circuitry 118 applies an example regions detection model 306 to the receipt image 108 to detect an example receipt region 902 and an example products region 904. In some examples, the extraction circuitry 118 applies a cropping operation (e.g., via the image cropping circuitry 308) to the receipt image 108 based on the detected regions 902, 904. In some examples, the extraction circuitry 118 applies a row segmentation model 314 to a cropped receipt region 902 to detect rows within the receipt region 902. In some examples, the extraction circuitry 118 also applies post-processing steps to the output of the row segmentation model 314 to generate bounding boxes corresponding to the detected row. In some examples, the extraction circuitry 118 applies a column segmentation model 320 to a cropped products region 404 to detect columns within the products region 904. In some examples, the extraction circuitry 118 also applies post-processing steps to the output of the column segmentation model 320 to generate bounding boxes corresponding to the detected columns.

The extraction circuitry 118 aggregates the text extracted by the OCR circuitry 116, the detect columns in the form of bounding boxes to represent the vertical structure, and the detected rows in the form of bounding boxes to represent the horizontal structure. In some examples, the extraction circuitry 118 can combine these outputs with algorithms to generate a unified result that includes rows, columns, and detected text within respective rows and columns. For example, the unified result can correspond to a digitized receipt of the respective receipt image 108. In other words, the extraction circuitry 118 receives an image of a receipt and outputs a digitized receipt and/or a data frame.

Figure 10:
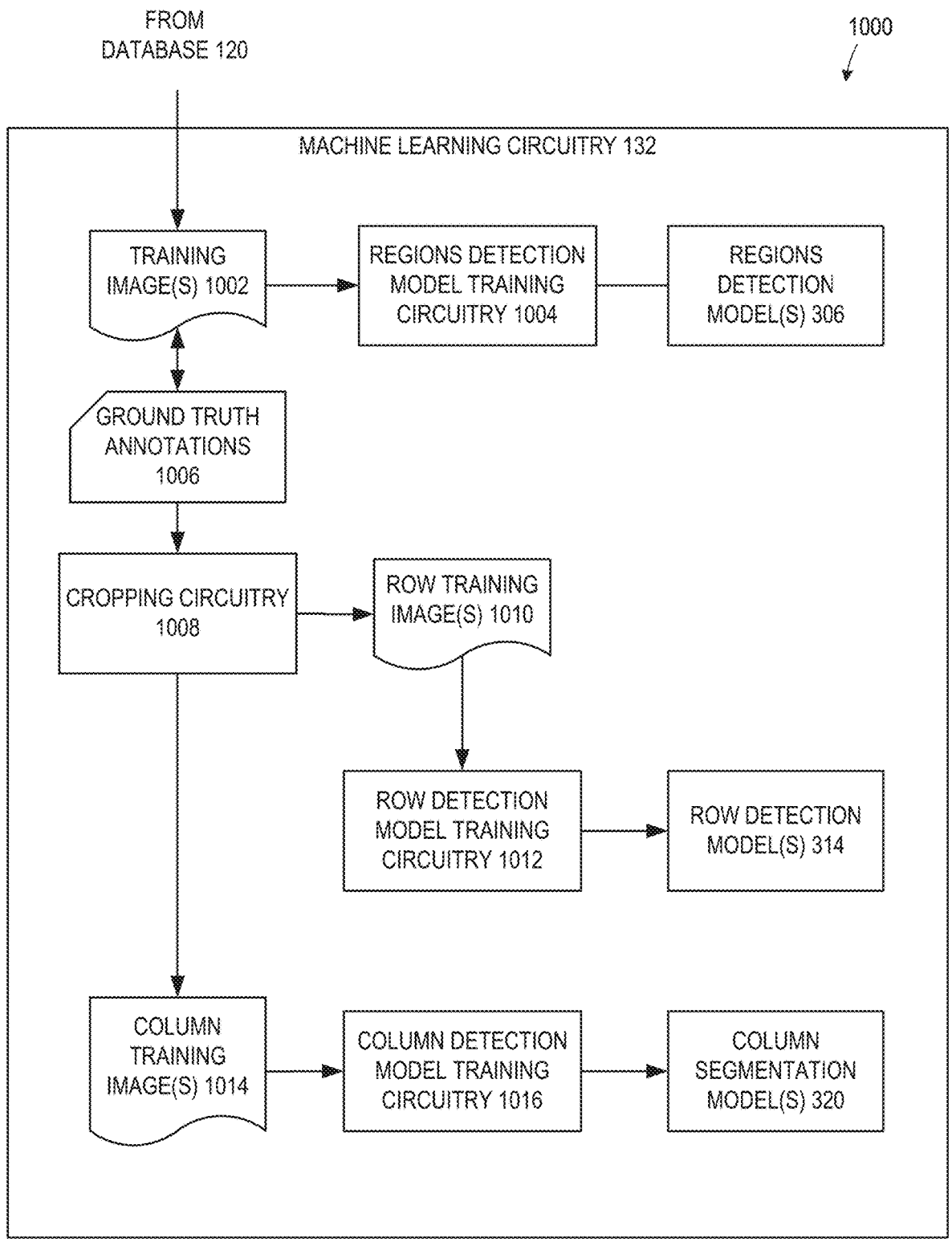
FIG. 10 is a block diagram of an example system, including example machine learning circuitry, for training models for information extraction constructed in accordance with the teachings of this disclosure.

FIG. 10 is a block diagram of example system 1000 for training models including example machine learning circuitry (e.g., machine learning circuitry 136 of FIG. 1). The system 1000 includes example training images 1002, which can be labeled receipt images. In some examples, the models include an example regions detection model(s) 306, an example row segmentation model(s) 314, and/or an example column segmentation model(s) 320 of FIG. 3. In some examples, additional or alternative models may be trained and/or utilized.

In some examples, the training images 1002 are stored in the example database 120 of FIG. 1 and obtained by the system 1000. The training images 1002 can be transmitted to example regions detection model training circuitry 1004, which is structured to train an example regions detection model(s) 306. In examples disclosed herein, the regions detection model(s) 306 is a faster R-CNN model. The faster R-CNN technique localizes and classifies objects over images. However, other model architectures can be use in additional or alternative examples, such as YOLO, SSD, etc. In some examples, the training images 1002 used to train the regions detection model 306 include previously labeled receipt and product detail regions to provide knowledge to the model during training.

In some examples, an output of the regions detection model(s) 306 during training is compared to example ground truth annotations 1006. For example, an IoU can be calculated between detected and annotated regions. In some examples, the IoU calculation should meet a threshold value of 0.8 to be considered an accurate result. In some examples, the regions detection model(s) 306 can be trained with a Resnet-101 as a backbone feature extractor network. For example, the Resnet-101 feature extractor network can be pre-trained with an ImageNet dataset. In other words, a transfer learning strategy can be implemented by using the pre-trained weights on the ImageNet dataset.

In some examples, the training images 1002 can be cropped by example cropping circuitry 1008. For example, the cropping circuitry 1008 can crop the training image 1002 based on the ground truth annotation 1006 to generate example row training images 1010. In some examples, the row training image(s) 1010 are provided to example row detection model training circuitry 1012, which is structured to train example row segmentation model(s) 314. In some examples, the row training image(s) 1010 include pairs of images 1010, including an image and a labeled pixel-wise mask. For example, the training image(s) 1010 used to train the row segmentation model 314 can be collected receipts with labeled polygonal regions. The row detection model training circuitry 1012 can train the row segmentation model(s) 314 using any suitable architecture, such as a dhSegment architecture, U-Net architecture, etc. Examples disclosed herein use the dhSegment architecture to train and implement the row segmentation model(s) 314. The dhSegment architecture was originally proposed as a Deep Learning framework to process handwritten historical documents. In that use case, text is dense and organized in several lines per page. In some examples, the dhSegment techniques can be applied to the detection of rows in receipts to help overcome challenges introduced in the captured images by classifying each pixel as belonging to one of two classes (e.g., a row or background). Further, dhSegment techniques can be applied regardless of purchased item lines in receipts being tabulated and/or having blank spaces longer than one character (e.g., to separate product description from price and/or quantity).

In some examples, an output of the row segmentation model 314 during training is compared to a labeled counterpart. For example, an IoU can be calculated between detected row and the label row. In some examples, the IoU calculation should meet a threshold value of 0.8 to be considered an accurate results. In some examples, the row segmentation model 314 can be trained with a Resnet-101 as a backbone feature extractor network. For example, the Resnet-101 feature extractor network can be pre-trained with an ImageNet dataset.

In some examples, the cropping circuitry 1008 can crop the training images 1002 based on the ground truth annotations 1006 to generate example column training images 1014. In some examples, the column training image(s) 1014 are provided to example column detection model training circuitry 1016, which is structured to train example column segmentation model(s) 320. In some examples, the column training images 1014 include pairs of training images 1014 that include an image and a labeled pixel-wise classifier. The column detection model training circuitry 1016 can train the column segmentation model(s) 320 using any suitable architecture, such as a dhSegment architecture, U-Net architecture, etc. Examples disclosed herein train the column segmentation model 320 using U-Net, which is a semantic segmentation model. U-Net is CNN that was originally applied to biomedical images for segmentation of brain neuronal structures in electron microscopic stacks. U-Net can be used to train the column segmentation model 320 to split a products region into multiple parts based on spatial arrangements of texts inside it. In some examples, the column segmentation model 320 is trained to split the products region into column regions and background.

U-Net can be used as an application of data augmentation strategies to train a CNN with an image dataset of limited size. While dhSegment could be used to train and implement a column segmentation model 320, in some examples, U-Net tends to give better output in terms of precision. In some examples, the U-Net model is used for column detection because higher precision can be needed to avoid unwanted regions in the detected column region.

Figure 11A:
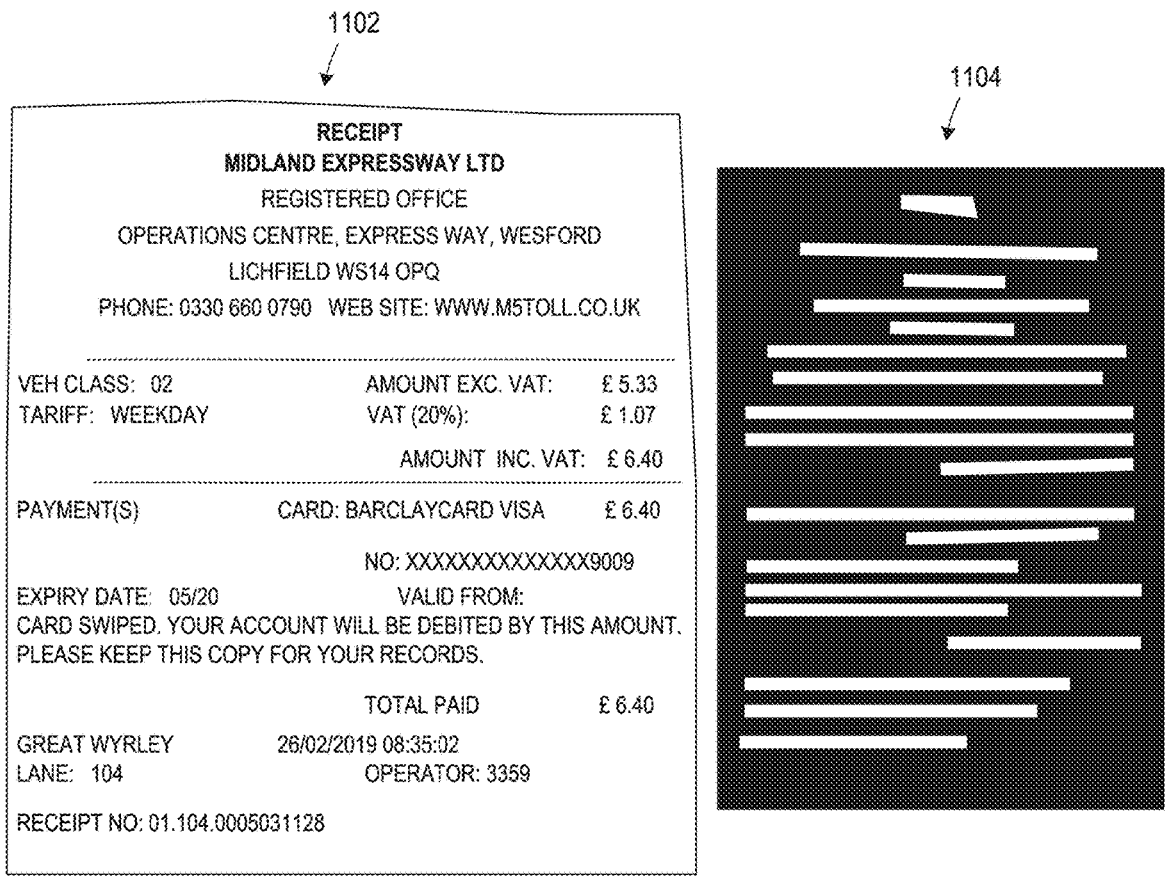
FIG. 11A is an illustration of an example image pair that can be used to train an example row detection model.

FIG. 11A is an example image pair 1100, including an example receipt region 1102 and a labeled receipt region 1104, that can be used to train a row segmentation model 314. The receipt region 1102 is a receipt region of an example receipt image. The labeled receipt region 1104 can be labeled pixel-wise mask. In other words, the labeled receipt region 1104 classifies each pixel of the receipt region 1102 as belonging to either a text line or background. In some examples, the receipt region 1102 can be used to train the row segmentation model 314 and the labeled receipt region 1104 can be used to verify an output of the receipt region 1102 after being run through the row segmentation model 314.

Figure 11B:
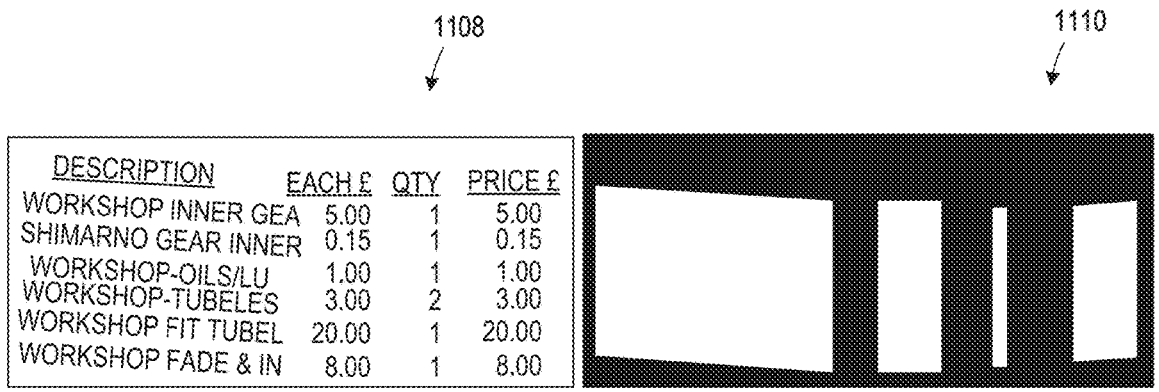
FIG. 11B is an illustration of an example image pair that can be used to train an example column segmentation model.

FIG. 11B illustrates an example image pair 1106, including a products region 1108 of a receipt image and a labeled products region 1110 of the receipt image, used to train a column segmentation model 320. In the illustrated example of FIG. 11B, the labeled products region 1110 is labeled as a pixel-wise classifier. In other words, the labeled products region 1108 classifies each pixel of the products region 1108 as belonging to either a column or background. In some examples, the products region 1108 can be used to train the column segmentation model 320 and the labeled products region 1110 can be used to verify an output of the products region 1108 after being run through the column segmentation model 320.

Figure 12:
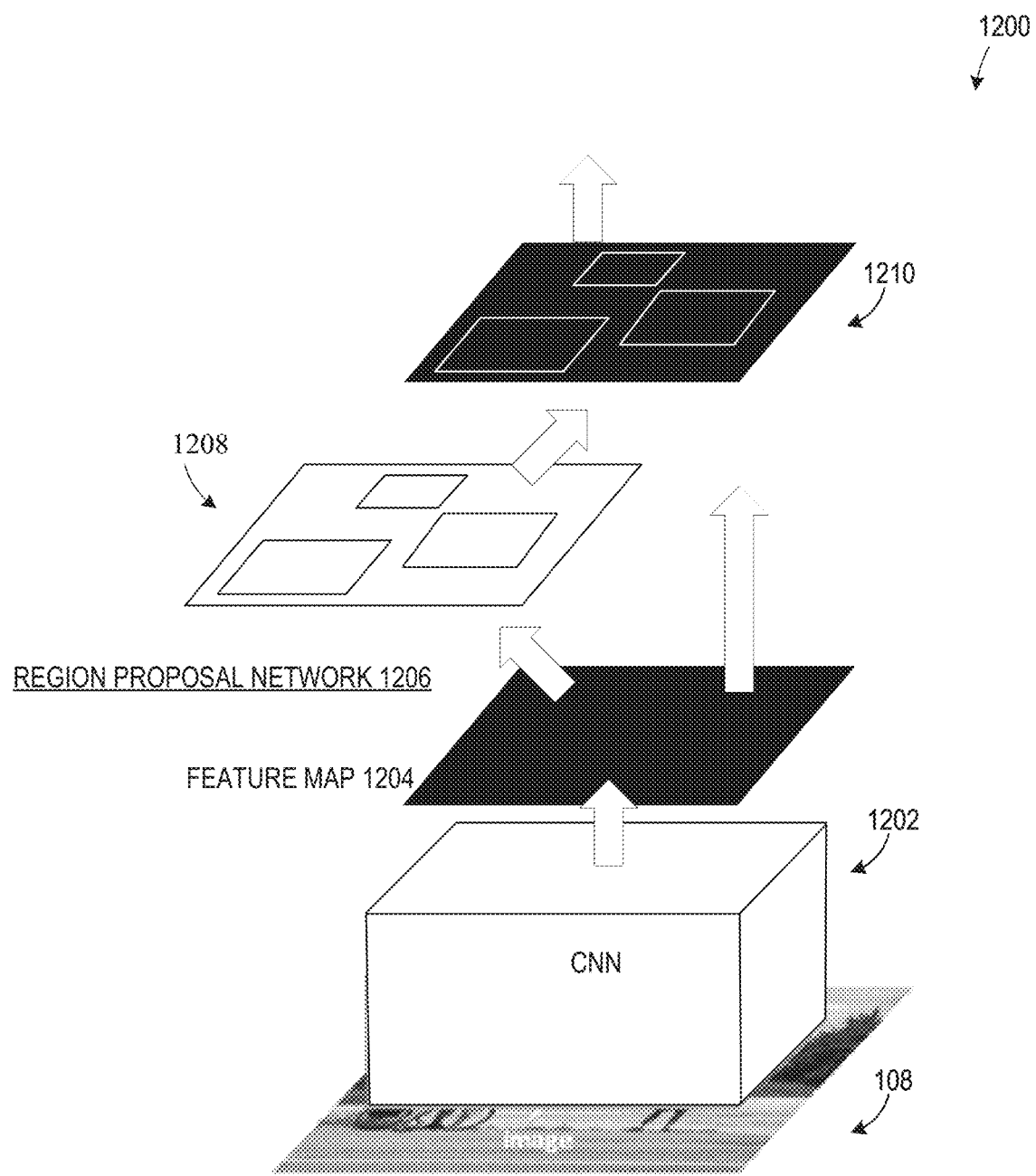
FIG. 12 is a schematic illustration of an example R-CNN architecture that can be used to train and implement an example regions detection model.

FIG. 12 is an illustration of an example faster R-CNN architecture 1200 for detection and classification of a receipt region and a product regions. In some examples, the architecture 1200 can be used to implement and/or train models disclosed herein. In some examples, the architecture 1200 is used to detect regions of interest. In some examples, the architecture 1200 can be applied for detecting the regions of interest based on an R-CNN approach.

In a faster R-CNN architecture 1200, an example image classification CNN 1202 can be applied to an receipt image 108. In some examples, the CNN 1202 generates an example feature map 1204 that includes projections of example regions of interest. In some examples, the feature map 1204 is used as input to an example region proposal network (RPN) 1206. For example, instead of applying a selective search algorithm on the feature map 1204 to identify region proposals as with a R-CNN architecture, the faster R-CNN uses the RPN 1206 to predict example region proposals 1208. The predicted region proposals 1208 can be re-sized using an example regions of interest (RoI) pooling layer 1210, which is then used to classify the image within the proposed region 1208 and predict coordinates for the bounding boxes.

Figure 13:
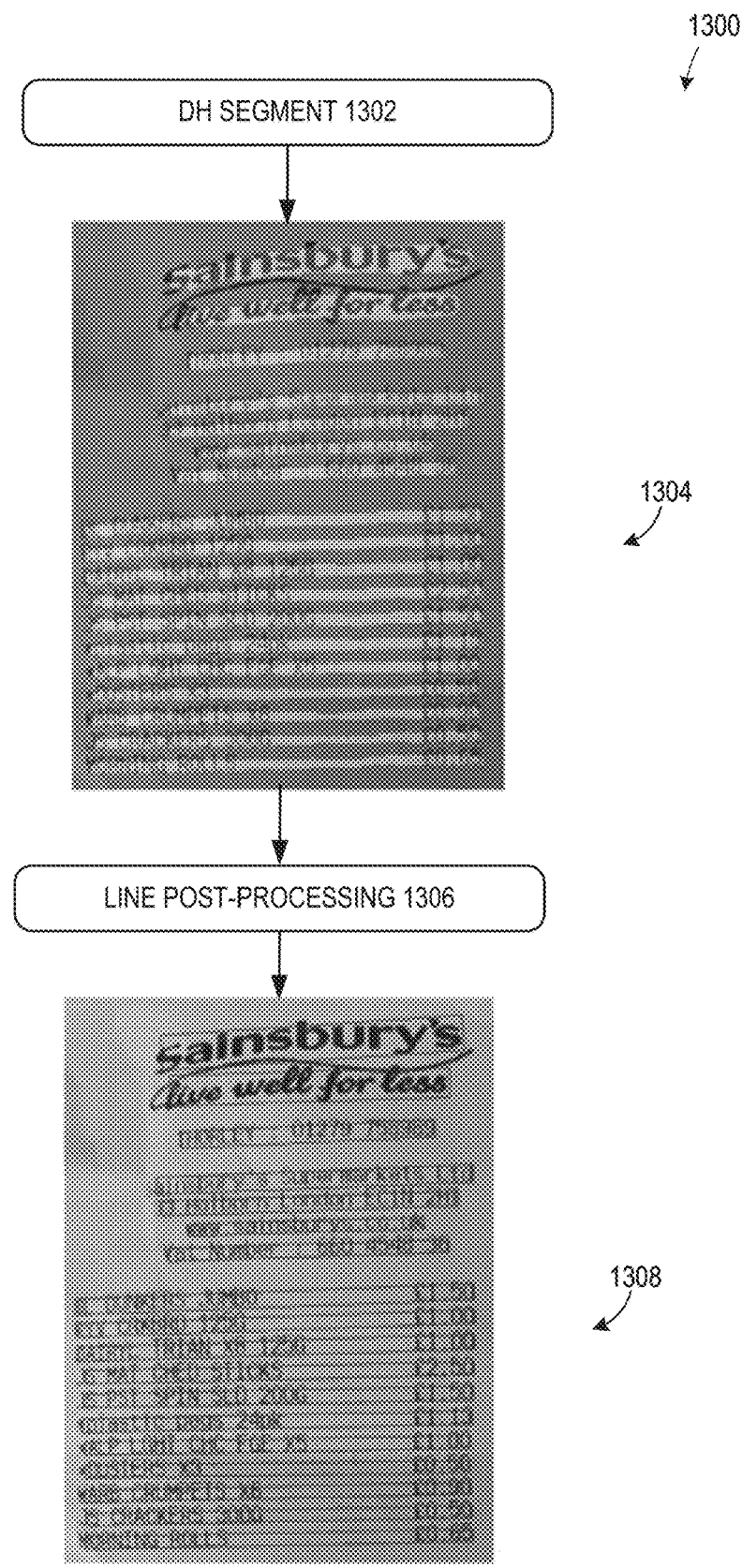
FIG. 13 illustrates an example implementation of the example row detection architecture in accordance with the teachings of this disclosure.

FIG. 13 illustrates an example dhSegment architecture 1300, including an example dhSegment block 1302 and output 1304 and an example line post-processing block 1306 and output 1308. In some examples, the dhSegment 1300 is an example machine learning framework. In some examples, the dhSegment architecture 1300 is used to detect rows within a receipt image 108. Row detection enables structuring scattered words on the receipt canvas. In some examples, the dhSegment block 1302 implements a row segmentation model 314. In some such examples, the output 1304 can be an output of the row segmentation model 314. In some examples, the line post-processing block 1306 can implement example bounding box generating circuitry 316. In some such examples, the output 1308 can be an output of the bounding box generating circuitry 316.

The example dhSegment block 1302 can group words together that belong to the same line in a scanned receipt image as a human would read them. This process can be challenging because the captured images can be skewed, tilted in any direction, squeezed, or rotated by some angle. In addition, the physical receipt may be crumpled and have non-flat surface deformations. In some examples, the dhSegment block 1302 can be used to overcome such challenges because the dhSegment block 1302 classifies each pixel as either belonging to a line or not. As such, imperfections in the receipt image 108 can be ignored by the dhSegment block 1302.

Figure 14:
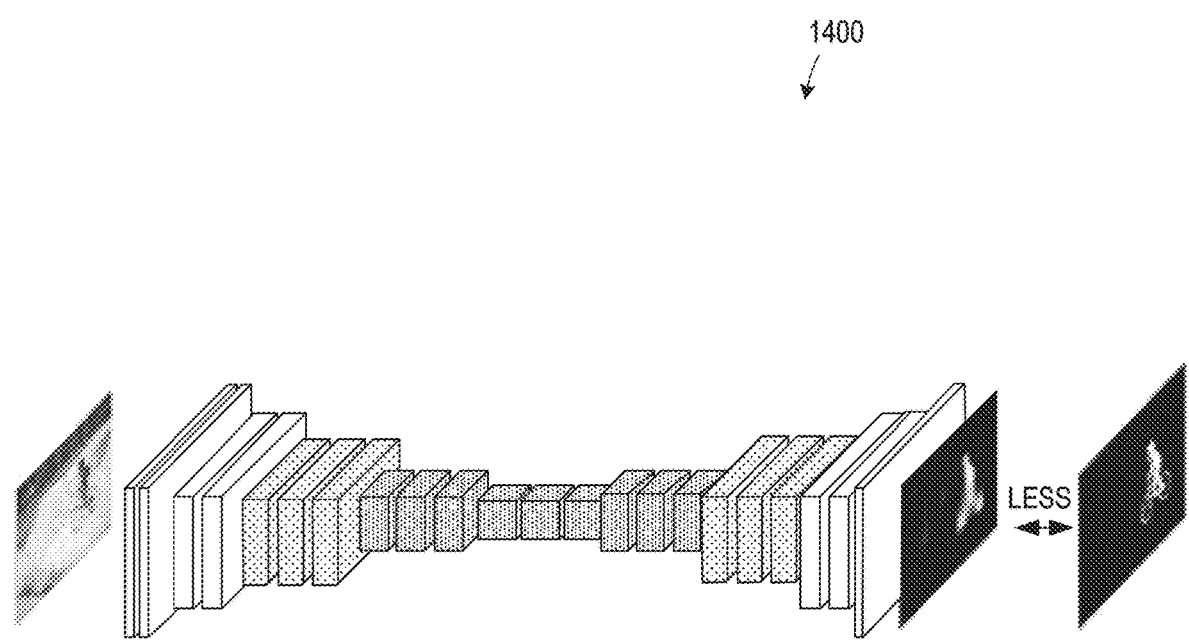
FIG. 14 is a schematic illustration of an example U-Net architecture that can be used to train and implement an example column segmentation model.

FIG. 14 illustrates an example U-Net block diagram 1400, which is an encoder-decoder based architecture. The example architecture 1400 may be implemented with an example column detection model(s) 320. In some examples, the products region includes multiple subregions of interest that are segmented into columns. In some examples, column detection is used to segregate words present in rows based on a column type, which can include item description, price, unit of measure, quantity, UPC/LAC/product code, tax notations, discount/promotions, etc. However, column detection as disclosed herein is managed in a manner that is independent of OCR output. As a result, examples disclosed herein apply the U-Net architecture 1400 to implement example column segmentation models 320.

The U-Net architecture 1400 receives an image as an input and applies an encoder network (e.g., contracting path) followed by a decoder network (e.g., expanding path). In some examples, the encoder network is a pre-trained classification network such as a ResNet. The encoder network can apply a plurality of convolution blocks, each of which can be followed by a maxpool downsampling block. In some examples, the encoder network encodes the input image into feature representations at multiple different levels. A goal of the decoder network is to semantically project the feature representation that the encoder network leaned onto a pixel space to generate a dense classification. In some examples, the decoder network applies upsampling blocks and concatenation followed by regular convolution operations. In other words, the U-Net architecture 1400 combines location information from encoder network with contextual information in the decoder network to obtain a pixel-wise classifier that combines localization and context.

Figure 15A:
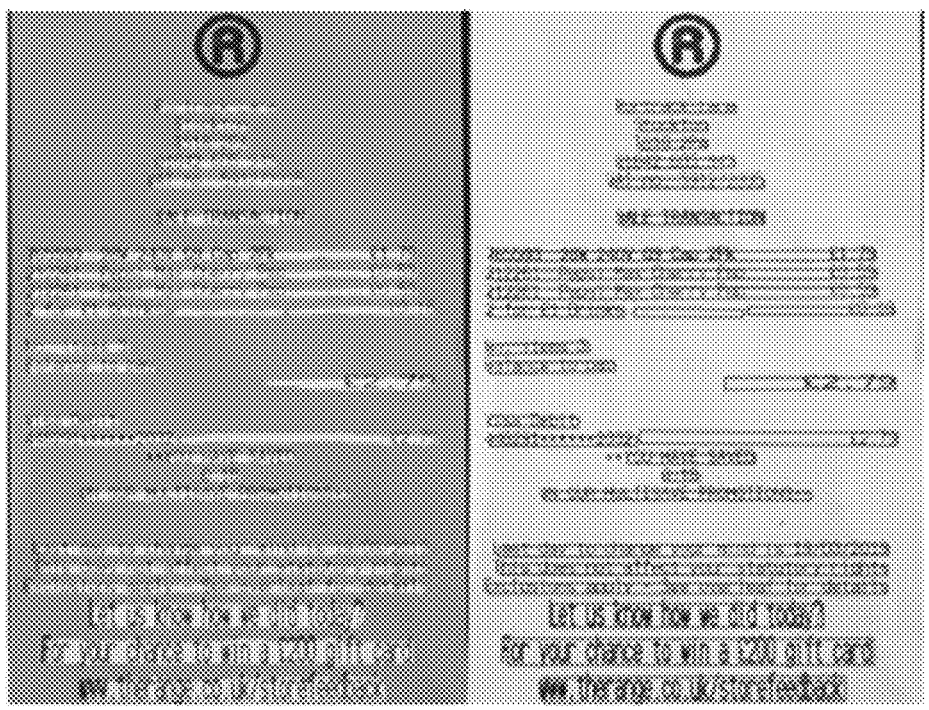
FIG. 15A is an illustration of example receipt image output by an example row detection model and example post-processing block, wherein the row detection model is based on a dhSegment architecture.

FIG. 15A illustrates example detected rows using a dhSegment model. That is, FIG. 15A includes an output 1502 of the dhSegment model and a corresponding output 1504 of bounding box generating circuitry 316.

Figure 15B:
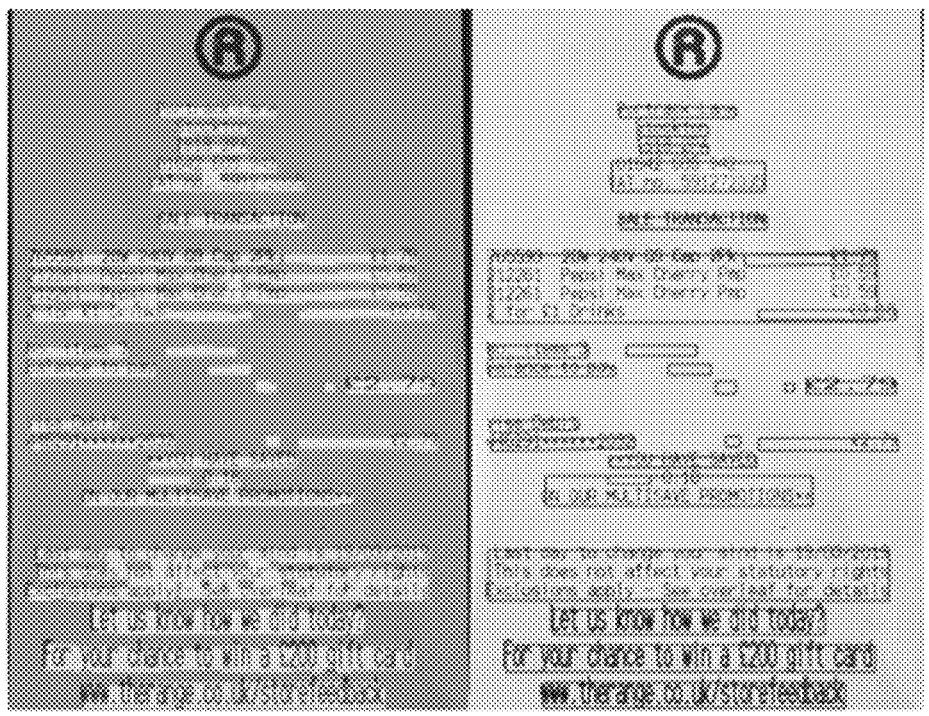
FIG. 15B is an illustration of the example receipt image of FIG. 15A output by an example row detection model and example post-processing block, wherein the row detection model is based on a U-Net architecture.

FIG. 15B illustrates example detected rows using a U-NET model. That is, FIG. 15B includes an output 1506 of the U-NET model and a corresponding output 1508 of the bounding box generating circuitry 316. In some examples, as illustrated in FIGS. 15A and 15B, the dhSegment model can be better at detecting rows. For example, FIG. 15B illustrated numerous bounding boxes that do not include text and/or do not belong to a text line.

Figure 16A:
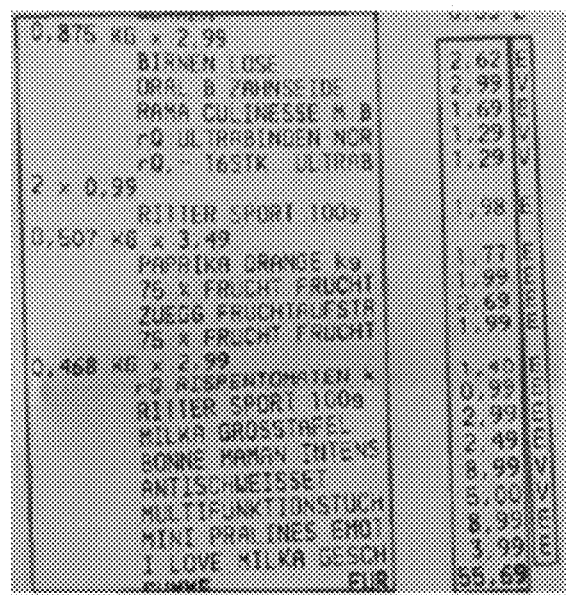
FIGS. 16A-16D are illustrations of example receipt regions output by example column segment models based on the U-Net and example post-processing blocks in accordance with the teachings of this disclosure.
Figure 16B:
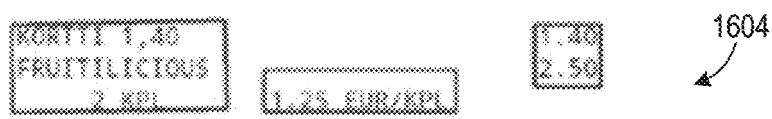
Figure 16C:
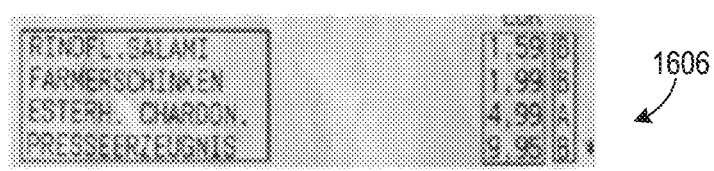
Figure 16D:
Figure 17:
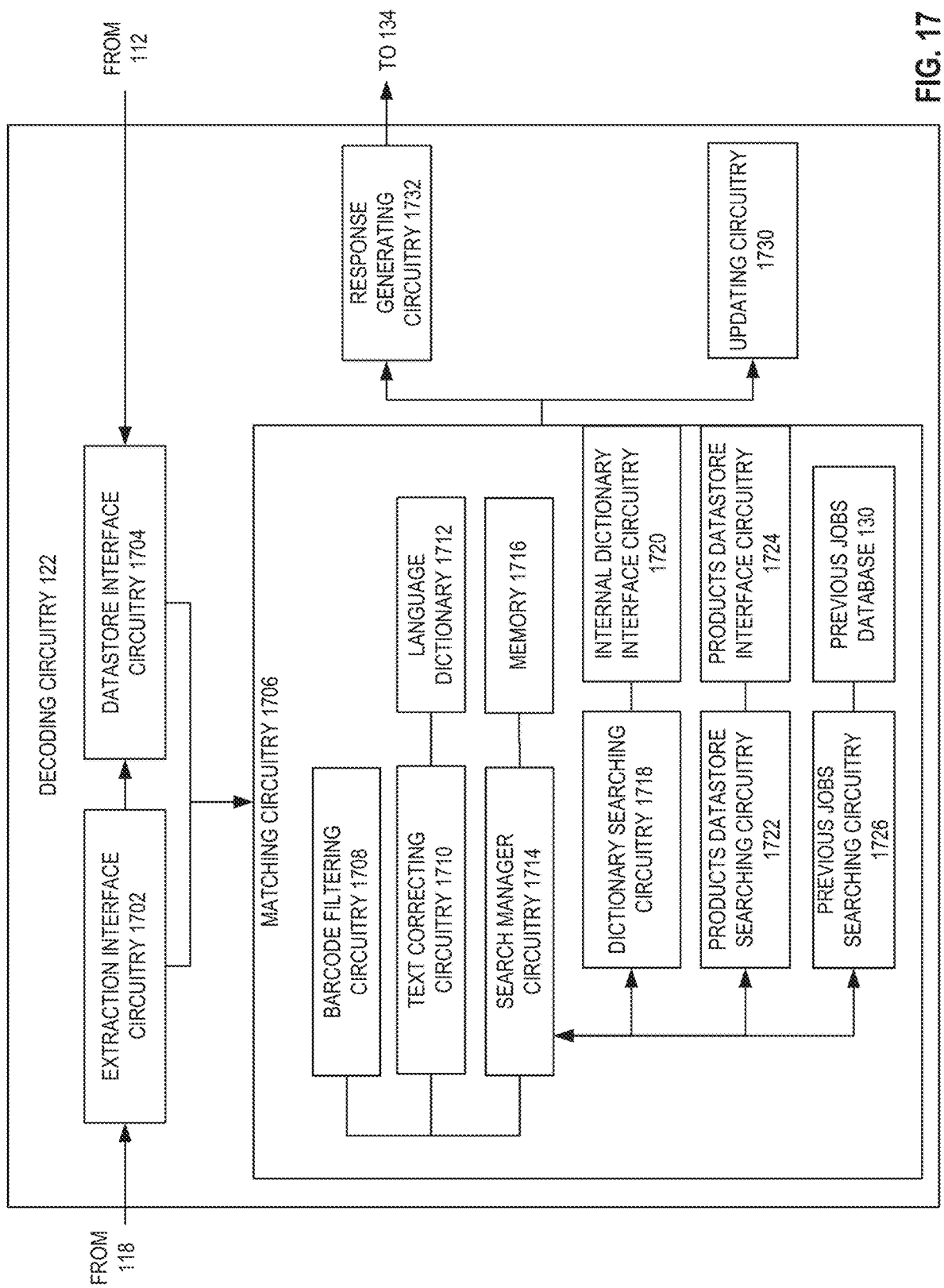
FIG. 17 is a block diagram of the example decoding circuitry of FIGS. 1 and/or 2.

FIGS. 16A-16D illustrated example column detections output by the example U-Net model 1400 and post-processed by example column detection circuitry 312 of FIG. 3. FIG. 16A illustrates a first output 1602. FIG. 16B illustrates a first output 1604. FIG. 16C illustrates a first output 1606. FIG. 16D illustrates a first output 1608. As illustrated in FIGS. 16A-16D, the example U-Net model and post-processing block FIG. 17 is a block diagram of example decoding circuitry 122 to generate purchase data by decoding purchase information extracted from a receipt image 108 and barcodes 110 uploaded by a panelist. The decoding circuitry 122 of FIG. 17 may be instantiated (e.g., creating an instance of, bring into being for any length of time, materialize, implement, etc.) by processor circuitry such as a central processing unit executing instructions. Additionally or alternatively, the decoding circuitry 122 of FIG. 17 may be instantiated (e.g., creating an instance of, bring into being for any length of time, materialize, implement, etc.) by an ASIC or an FPGA structured to perform operations corresponding to the instructions. It should be understood that some or all of the decoding circuitry 122 of FIG. 17 may, thus, be instantiated at the same or different times. Some or all of the circuitry may be instantiated, for example, in one or more threads executing concurrently on hardware and/or in series on hardware. Moreover, in some examples, some or all of the decoding circuitry 122 of FIG. 17 may be implemented by one or more virtual machines and/or containers executing on the microprocessor.

The decoding circuitry 122 includes example extraction interface circuitry 1702, which is structured to provide an interface between the decoding circuitry 122 and example extraction circuitry 118. For example, the decoding circuitry 122 can obtain (e.g., receive and/or retrieve) purchase information corresponding to an example receipt image 108 that was extracted by the extraction circuitry 118. In some examples, the purchase information includes a list of products purchased (e.g., items) by the panelist as listed in the receipt image 108 and corresponding prices and quantities. In some examples the purchase information includes a store ID (e.g., retailer ID), store name (e.g., retailer name), and/or other retailer-related information. In some examples, the extraction interface circuitry 1702 notifies example datastore interface circuitry 1704 of the obtained purchase information. In some examples, the extraction interface circuitry 1702 transmits the purchase information to example matching circuitry 1706.

The example datastore interface circuitry 1704 is structured to provide an interface between the decoding circuitry 122 and the example basket datastore 112. For example, the decoding circuitry 122 can receive and/or retrieve barcodes 110 from the basket datastore 112 via the example datastore interface circuitry 1704. In some examples, the decoding circuitry 122 obtains the barcodes 110 that correspond to the receipt image 108 from which the obtained purchase information was extracted. In some examples, the datastore interface circuitry 302 transmits the barcodes 110 to the example matching circuitry 1706.

The example matching circuitry 1706 is structured to match items listed in the extracted purchase information with respective barcodes 110. For example, the matching circuitry 1706 can search one or more data sources to identify a match between an item and a respective barcode 110 and associate the item and corresponding price and quantity with the matched barcode 110. In some examples, the matching is based on a similarity search between an item description extracted by the extraction circuitry 118 and a database description as listed in a data source. In some examples, the matching circuitry 1706 receives a list of items extracted by the extraction circuitry 118 and a list of barcodes 110 provided by the panelist.

The matching circuitry 1706 includes example barcode filtering circuitry 1708, which is structured to remove barcodes 110 from the list of barcodes. In some examples, the barcode filtering circuitry 1708 removes duplicate barcodes 110. For example, the list of barcodes corresponding to the purchase data can include two or more identical barcodes 110. For example, the panelist may have purchased a plurality of an item (e.g., two cans of soup) and scanned a barcode 110 on each of the plurality of items (e.g., the barcode 110 on each of the two cans of soup). The barcode filtering circuitry 1708 can remove the duplicates to generate a list of unique barcodes.

In some examples, the barcode filtering circuitry 1708 can remove additional or alternative barcodes. In some examples, panelists are inconsistent about whether they scan a barcode 110 of plastic bag and/or whether the plastic bag is listed in the receipt image 108. Accordingly, in some examples, the barcode filtering circuitry 1708 removes barcodes 110 that correspond to purchase plastic bags. In some examples, the barcode filtering circuitry 1708 also removes the plastic bag from the list of items. For example, the barcode filtering circuitry 1708 can detect and remove the plastic bag from the list of items based on text matching in the product descriptions extracted by the extraction circuitry 118.

The matching circuitry 1706 of FIG. 17 includes example text correcting circuitry 1710. In some examples, text (e.g., product descriptions, etc.) extracted by the example OCR circuitry 116 can include typos, such as mis-identified or unidentified characters. For example, some languages include special characters that can be incorrectly detected by the OCR circuitry 116. For example, a character that includes a specific (e.g., small) symbol can be incorrectly detected and/or missed by the OCR circuitry 116. These failures of the OCR circuitry 116 can be difficult to predict because they happen can randomly within the same receipt. Further, this type of error can affect product searches in the data sources, causing inaccurate product matching. While such failures can be easy for a human to resolve when looking at the original receipt image, the failures can be difficult for a machine to handle. Accordingly, the example text correcting circuitry 1710 is structured to manage and/or correct such typos.

In some examples, the matching circuitry 1706 includes an example language dictionary(ies) 1712. For example, the matching circuitry 1706 can include a language dictionary 1712 corresponding to a main language of a country in which the DDS is executing. In some examples, the matching circuitry 1706 can include more than one language dictionary 1712. In some examples, the text correcting circuitry 1710 can utilize the language dictionary 1712 and implement a spell checker. For example, the text correcting circuitry 1710 can compare the list of items to the language dictionary 1712 to detect and/or correct mis-identified characters.

In some examples, the text correcting circuitry 1710 can apply text normalization techniques to the list of items to remove a dependency on special characters. For example, the text correcting circuitry 1710 can apply text normalization techniques to text extracted by the extraction circuitry 118 and to the data sources (e.g., the internal dictionary 124, products datastore 126, etc.) such that all sources of data used by the decoding circuitry 122 are normalized for the text similarity calculations and product searches. In some examples, the text normalization techniques aim to increase product matching accuracy for this particular type of error without decreasing the overall matching performance.

The matching circuitry 1706 includes example search manager circuitry 1714, which is structured to manage searching against a data source(s) (e.g., the internal dictionary 124, the products datastore 126, the previous jobs database 130, etc.). In some examples, the search manager circuitry 1714 generates input for a search query. For example, the input for the search query can include a single product description of a purchased item from the list of items extracted by the extraction circuitry 118 and the list of unique barcodes 110. In some examples, the input for the search query also includes a store ID and/or retailer ID.

In some examples, the matching circuitry 1706 includes example memory 1716, which is structured to store data. For example, the memory 1716 can store a list of unique barcodes, purchase information extracted by the extraction circuitry 118, a search response, etc. In some examples, the memory 1716 can store data until the data has been processed. For example, the search manager circuitry 1714 can store the list of unique barcodes, corresponding purchase information, and corresponding search results until each product listed in the purchase information has been matched or a search for a match has been exhausted.

In some examples, the memory 1716 can be one or more memory systems that include various types of computer memory. In some examples, the memory 1716 may be implemented by a volatile memory (e.g., a Synchronous Dynamic Random Access Memory (SDRAM), a Dynamic Random Access Memory (DRAM), a RAMBUS Dynamic Random Access Memory (RDRAM), a double data rate (DDR) memory, such as DDR, DDR2, DDR3, DDR4, mobile DDR (mDDR), etc.)) and/or a non-volatile memory (e.g., flash memory, a hard disk drive (HDD), etc.).

The matching circuitry 1706 includes example dictionary searching circuitry 1718, which is structured to search a dictionary such as the internal dictionary 124. In some examples, the dictionary searching circuitry 1718 is coupled to example internal dictionary interface circuitry 1720, which is structured to provide an interface between the dictionary searching circuitry 1718 and the internal dictionary 124. For example, the dictionary searching circuitry 1718 can generate a search query based on input received from the search manager circuitry 1714, and search the query against the internal dictionary 124 via the internal dictionary interface circuitry 1720. In some examples, the internal dictionary 124 is searched first (e.g., before the products datastore 126, the previous jobs database 130, etc.). If a match is identified, the match can be saved to a final response. If a match is not identified, the input can be used to search another data source, such as the products datastore 126.

In some examples, the search query for the search of the internal dictionary 124 can include a first item description, the list of unique barcodes, the retailer ID, and a search condition(s). In some examples, the search query can include three search conditions, which aim to return a substantially exact match between the item description and a barcode 110 based on the data in the internal dictionary 124. For example, a first example condition can be that a response(s) should match at least one barcode 110. A second example condition can include that the response(s) needs to match the provided store ID. A third example condition can include that the response(s) must match the item description as extracted by the extraction circuitry 118.

As noted above, the internal dictionary 124 includes records of previously associated product descriptions and barcodes 110. The records can include information for each previously recognized product, such as a receipt description (e.g., as extracted by extraction circuitry 118), a product description as listed in the products datastore 126, a store ID, a counter, a matched barcode(s) 110, etc. Thus, by searching one item description, the list of unique barcodes 110, and the store ID with the search conditions against the internal dictionary 124, the dictionary searching circuitry 1718 can determine whether a match can be identified based on the match being previously identified. For example, by searching the search query against the internal dictionary 124, the dictionary searching circuitry 1718 can identify barcodes in the internal dictionary 124 that correspond to the unique list of barcodes and to the store ID in the search query. If any such barcodes exist, the dictionary searching circuitry 1718 can determine whether one of the barcodes includes the first item description. In some examples, if one of the identified barcodes includes the first item description, the dictionary searching circuitry 1718 can identify a match and associate the barcode and the item description.

The matching circuitry 1706 includes example products datastore searching circuitry 1722, which is structured to search a products datastore (e.g., products datastore 126). In some examples, the products datastore searching circuitry 1722 is coupled to example products datastore interface circuitry 1724, which is structed to provide an interface between the products datastore searching circuitry 1722 and the products datastore 126. In some examples, the products datastore 126 is searched if the search against the internal dictionary 124 does not yield a match. For example, the products datastore 126 is searched to recognize a match between a product description and a barcode 110 if the product description not matched to a barcode 110 during the internal dictionary 124 search. In some examples, the search manager circuitry 1714 transmits the input to the products datastore searching circuitry 1722. In some examples, the products datastore searching circuitry 1722 searches the products datastore 126 a first time using a first search query that includes the retailer ID. If the first search does not yield a match, the products datastore searching circuitry 1722 can search the products datastore 126 a second time using a second search query that excludes the retailer ID.

As noted above, in some examples, the products datastore 126 is copy of a large database that is obtained on a weekly basis. The products datastore 126 includes a plurality of products and corresponding attributes for a given country and/or market. In some examples, the products datastore 126 is implemented with example ElasticSearch technology, which is an open-source full-text search and analytics engine. In some examples, the ElasticSearch technology as applied to the products datastore 126 enables the products datastore searching circuitry 1722 to search and analyze large volumes of data quickly.

In some examples, the first search query for the search of the products datastore 126 can include a first item description (e.g., of an item not matched during the internal dictionary 124 search), the list of unique barcodes, the retailer ID, and a search condition(s). In some examples, the search query can include numerous search conditions, which aim to return a return a candidate result(s) and corresponding similarity score(s) for matches between the first item description and a barcode 110. In some results, the products datastore searching circuitry 1722 can replace a generic description extracted by the extraction circuitry 118 with an assigned description to increase chances of identifying a match.

In some examples, the first search of the products datastore 126 that includes a retailer ID can be limited to products belonging to the retailer ID. To do so, in some examples, the search manager circuitry 1714 can obtain a "group code" and/or a "global store code" (e.g., for a favorite store) from a database (e.g., the database 120 and/or the retailer database 128 via an interface) to add to the first search query. If the retailer ID provided by the panelist is from a favorite list, the search manager circuitry 1714 can add the global store identifier to the first search query. In some examples, the products datastore searching circuitry 1722 searches the query against the products datastore 126 via the products datastore interface circuitry 1724. In some examples, searching the query against the products datastore 126 includes identifying barcodes in the products datastore 126 that correspond to the unique list of barcodes in the query and comparing product descriptions associated with the barcodes in the products datastore 126 with the first item description. In some such examples, the products datastore searching circuitry 1724 generates a similarity value (e.g., similarity score, etc.) for the product descriptions associated with the barcodes identified in the products datastore 126 based on the comparisons. In some examples, the products datastore searching circuitry 1724 selects one of the barcodes identified in the products datastore 126 based on the similarity values. For example, the products datastore searching circuitry 1724 may selected the barcode that receives that highest similarity value above a threshold value.

If a match is identified, the match can be saved to the final response. If a match is not identified, the products datastore searching circuitry 1722 can generate a second search query to be searched against the products datastore 126. For example, the products datastore searching circuitry 1722 can generate the second search query that includes the first item description (e.g., of the item not matched during the internal dictionary 124 search or the first products datastore 126 search), the list of unique barcodes, and a search condition(s). In some examples, item descriptions and barcodes that remain unmatched after a second search of the products datastore 126 can be added to a list of unassociated products.

The matching circuitry 1706 includes example previous jobs searching circuitry 1726, which is structured to search a previous jobs database (e.g., previous jobs database 130). In some examples, the previous jobs database 130 is implemented with example ElasticSearch technology, enabling the previous jobs searching circuitry 1726 to search and analyze large volumes of data quickly. In some examples, the previous jobs searching circuitry 1726 can search the previous jobs database 130 with a plurality of un-matched product descriptions and barcodes 110. In some examples, the previous jobs searching circuitry 1726 can add matched items to the final response and put any un-matched product descriptions and barcodes 110 into another list. For example, the other list can be a list of items and barcodes to be added to the previous jobs database 130.

In some examples, the matching circuitry 1706 includes the example previous jobs database 130. In additional or alternative examples, the previous jobs database 130 can be stored in another location that is accessible by the previous jobs database 130. The example previous jobs database 130 can be implemented by any memor(ies), storage device(s) and/or storage disc(s) for storing data such as, for example, flash memory, magnetic media, optical media, etc. Furthermore, the data stored in the example previous jobs database 130 may be in any data format such as, for example, binary data, comma delimited data, tab delimited data, structured query language (SQL) structures, image data, etc.

In some examples, one item description and one barcode 110 can remain unmatched after the internal dictionary 124, products datastore 126, previous jobs database 130 and/or other data sources have been searched. This can sometimes be referred to as a "single match scenario." In such a single match scenario, the search manager circuitry 1714 is structured to associate the one remaining item description and one remaining barcode 110 and add the association to the final response.

The decoding circuitry 122 includes example updating circuitry 1730, which is structured to update a data source such as the internal dictionary 124 and/or the previous jobs database 130. In some examples, the updating circuitry 1730 saves unmatched item descriptions and barcodes 110 in the previous jobs database 130 to keep track of previous processed receipts. In some examples, the previous jobs searching circuitry 1726 updates the previous jobs database 130.

In some examples, the updating circuitry 1730 updates the internal dictionary 124 to leverage historic data for recognized items in previous processed receipts. In some examples, the internal dictionary 124 is updated after a basket has been processed. If the recognized items came directly from the dictionary search, only the counter inside the dictionary entry is incremented by one. If the items were recognized in the other search steps, a new entry will be added per recognized receipt description. In some examples, products matched using the products datastore 126 can be recorded (e.g., added) to the internal dictionary 124 such that in the future, product searches can yield results faster.

The decoding circuitry 122 includes examples response generating circuitry 1732, which is structured to generate a final response. For example, after the search manager circuitry 1722 has matched each item in the list of items and/or exhausted searches of available data source, the response generating circuitry 1732 is structured to aggregate and format the matched items to as the final response. In some examples, the final response is transmitted to example report generating circuitry (e.g., report generating circuitry 134 of FIG. 1) corresponding to a document decoding service (e.g., document decode circuitry 114).

In some examples, the decoding circuitry 122 includes means for matching a product description and a barcode. For example, the means for matching a product description and a barcode may be implemented by matching circuitry 1706. In some examples, the matching circuitry 1706 may be instantiated by processor circuitry such as the example processor circuitry 3512 of FIG. 35. For instance, the matching circuitry 1706 may be instantiated by the example general purpose processor circuitry 3600 of FIG. 36 executing machine executable instructions such as that implemented by at least blocks 2714 of FIGS. 27 33, and 34. In some examples, the matching circuitry 1706 may be instantiated by hardware logic circuitry, which may be implemented by an ASIC or the FPGA circuitry 3700 of FIG. 37 structured to perform operations corresponding to the machine readable instructions. Additionally or alternatively, the matching circuitry 1706 may be instantiated by any other combination of hardware, software, and/or firmware. For example, the matching circuitry 1706 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the matching circuitry 1706 includes means for searching. For example, the means for searching may be implemented by example dictionary searching circuitry 1718, example products datastore searching circuitry 1722, and/or example previous jobs searching circuitry 1726. In some examples, the dictionary searching circuitry 1718, products datastore searching circuitry 1722, and/or previous jobs searching circuitry 1726 may be instantiated by processor circuitry such as the example processor circuitry 3512 of FIG. 35. For instance, the dictionary searching circuitry 1718, products datastore searching circuitry 1722, and/or previous jobs searching circuitry 1726 may be instantiated by the example general purpose processor circuitry 3600 of FIG. 36 executing machine executable instructions such as that implemented by at least blocks 3312 of FIGS. 33, 3406 and 6412 of FIG. 34, and/or 3422 of FIG. 34, respectively. In some examples, the dictionary searching circuitry 1718, products datastore searching circuitry 1722, and/or previous jobs searching circuitry 1726 may be instantiated by hardware logic circuitry, which may be implemented by an ASIC or the FPGA circuitry 3700 of FIG. 37 structured to perform operations corresponding to the machine readable instructions. Additionally or alternatively, the dictionary searching circuitry 1718, products datastore searching circuitry 1722, and/or previous jobs searching circuitry 1726 may be instantiated by any other combination of hardware, software, and/or firmware. For example, the dictionary searching circuitry 1718, products datastore searching circuitry 1722, and/or previous jobs searching circuitry 1726 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the decoding circuitry 122 of FIG. 1 is illustrated in FIG. 17, one or more of the elements, processes, and/or devices illustrated in FIG. 17 may be combined, divided, re-arranged, omitted, eliminated, and/or implemented in any other way. Further, the example extraction interface circuitry 1702, example datastore interface circuitry 1704, example matching circuitry 1706, example barcode filtering circuitry 1708, example text correcting circuitry 1710, example search manager circuitry 1714, example dictionary searching circuitry 1718, example internal dictionary interface circuitry 1720, example products datastore searching circuitry 1722, example products datastore interface circuitry 1724, example previous jobs searching circuitry 1726, example updating circuitry 1730, example response generating circuitry 1732, and/or, more generally, the example decoding circuitry 122 of FIG. 1, may be implemented by hardware alone or by hardware in combination with software and/or firmware. Thus, for example, any of the example extraction interface circuitry 1702, example datastore interface circuitry 1704, example matching circuitry 1706, example barcode filtering circuitry 1708, example text correcting circuitry 1710, example search manager circuitry 1714, example dictionary searching circuitry 1718, example internal dictionary interface circuitry 1720, example products datastore searching circuitry 1722, example products datastore interface circuitry 1724, example previous jobs searching circuitry 1726, example updating circuitry 1730, example response generating circuitry 1732, and/or, more generally, the example decoding circuitry 122, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example decoding circuitry 122 of FIG. 1 may include one or more elements, processes, and/or devices in addition to, or instead of, those illustrated in FIG. 17, and/or may include more than one of any or all of the illustrated elements, processes and devices.

Figure 18:
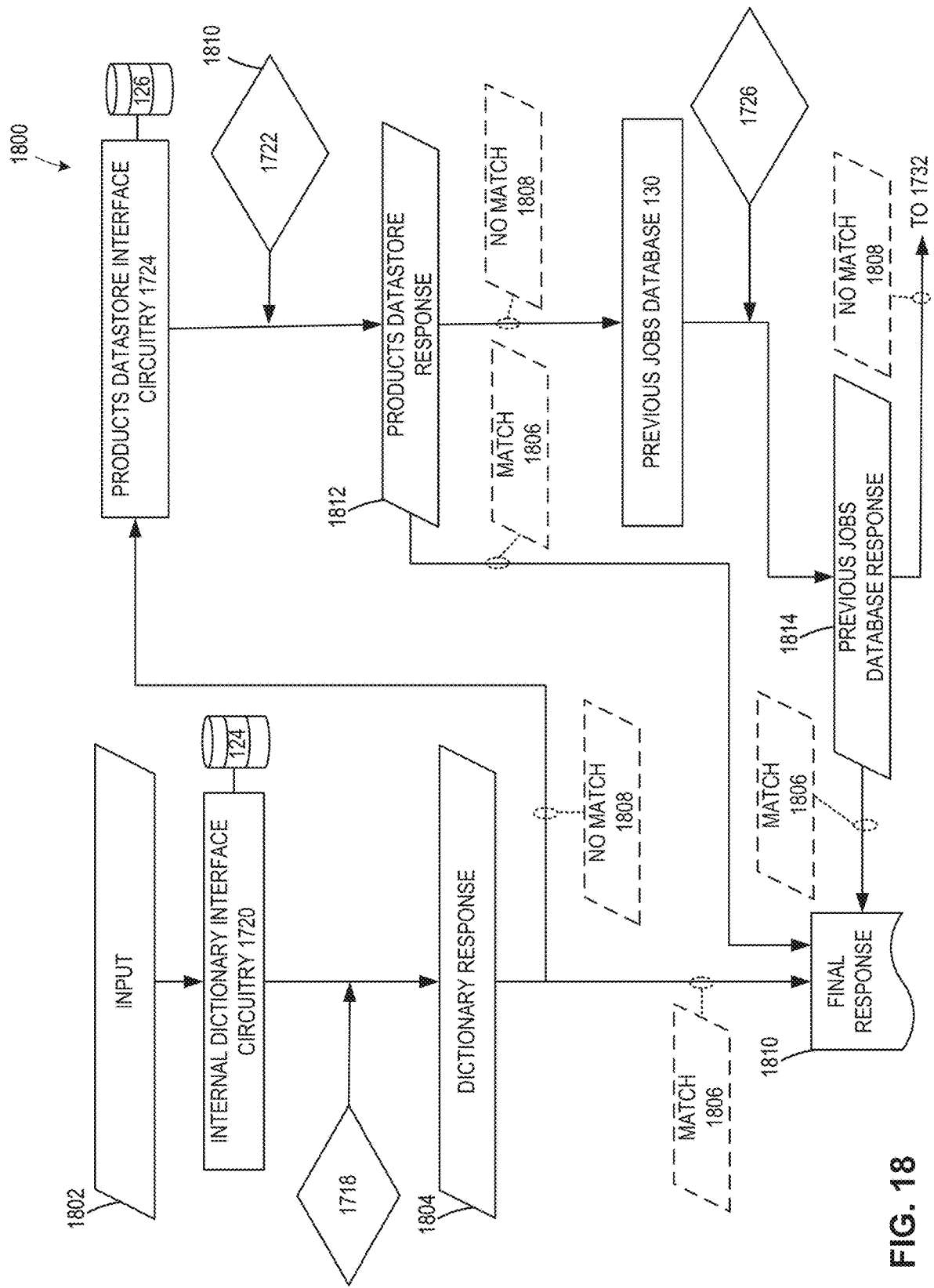
FIG. 18 is a block diagram of an example framework to match a purchased product and a barcode constructed in accordance with the teachings of this disclosure.

FIG. 18 is a block diagram of an example framework 1800 to implement the example matching circuitry 1706 of FIG. 17. In some examples, the framework 1800 is implemented by the example search manager circuitry 1714. In some examples, the framework 1800 includes the search manager circuitry 1714 generating an input 1802 that includes a list of items (e.g., including product descriptions, quantity, price, etc.) corresponding to an example receipt image 108 that includes any number of purchased items and corresponding barcodes 110. The framework 1800 can be used to search the items against the internal dictionary 124, the products datastore 126, and/or the previous jobs database 130 to associate the items with respective barcodes 110. In the illustrated example of FIG. 18, the framework 1800 is structured to search each item in the list of items (e.g., one at a time) against a first data source before searching a second data source. For example, the framework 1800 is structured to search each item against the internal dictionary 124 first. In some examples, associated items are stored in a final response. In some examples, unassociated items are searched against the products datastore 126.

In some examples, the framework 1800 begins with the example search manager circuitry 1714 providing the input 1802 to the dictionary searching circuitry 1718. In some examples, the dictionary searching circuitry 1718 generates a first search query that includes a portion of the input 1802. For example, the search query can include a product description for a first item of the list of items, a unique list of barcodes (e.g., with duplicates and/or matched barcodes removed), and a retailer ID corresponding to a retailer from which the items were purchased. In some examples, dictionary searching circuitry 1718 can then search the first search query against the internal dictionary 124 via the example internal dictionary interface circuitry 1720. The dictionary searching circuitry 1718 can obtain an example dictionary response 1804. For example, the dictionary response 1804 can include an indication of a match 1806 or no-match 1808. In some examples, the dictionary searching circuitry 1718 saves the match 1806 response to a final response 1810 and removes a matched barcode 110 from the list of unique barcodes.

In some examples, the dictionary searching circuitry 1718 can generate a second search query that includes a product description for a second item of the list of items, a unique list of barcodes (e.g., with duplicates and/or matched barcodes removed), and the retailer ID. The dictionary searching circuitry 1718 can then search the second search query against the internal dictionary to obtain another dictionary response 1804. In some examples, the dictionary searching circuitry 1718 can iterate this process until each item in the list of items has been searched.

In some examples, the search manager circuitry 1714 transmits items of the list of items that received a no-match 1808 response from the internal dictionary 124 search to the products datastore searching circuitry 1722. In some examples, the products datastore searching circuitry 1722 generates a first search query that includes a product description for a first un-matched item, a unique list of barcodes, and the retailer ID. The products datastore searching circuitry 1722 can then search the first search query against the products datastore 126 via the example products datastore interface circuitry 1724. For example, the products datastore searching circuitry 1722 can look up the barcodes in the products datastore 126 and compare corresponding products datastore 126 descriptions with the product description extracted by the extraction circuitry 118.

In some examples, the products datastore searching circuitry 1722 obtains an example products datastore response 1804 that can include an indication of a match 1812 or no-match 1808. In some examples, the products datastore searching circuitry 1722 saves the match 1806 response to the final response 1810 and removes a matched barcode 110 from the list of unique barcodes. If the products datastore response 1804 includes a no-match 1808 response, the products datastore searching circuitry 1722 can remove the retailer ID from the first search query and re-search the products datastore 126. A match 1806 response can be saved to the final response 1810. In some examples, the products datastore searching circuitry 1722 can iterate this process until each item in the list of no-match items has been twice searched (e.g., with the retailer ID and without the retailer ID).

In some examples, the search manager circuitry 1714 transmits items of the list that received a no-match 1808 response from the products datastore 126 search to the previous jobs searching circuitry 1726. In some examples, the previous jobs searching circuitry 1726 generates a search query that includes any un-matched product descriptions, any unmatched barcodes, and the retailer ID. In some examples, the search query includes a condition to obtain an intersection of the product descriptions and barcodes between the current basket and past baskets. The previous jobs searching circuitry 1726 can search the search query against the previous jobs database 130. In some examples, the previous jobs searching circuitry 1726 obtains an example previous jobs response 1814. If one barcode and one receipt description are minimum matched (e.g., min-matched), the search manager circuitry 1714 may assign the barcode 110 to the item description and send the match 1806 to the final response.

In some examples, if only one barcode and one receipt description are left un-matched, the search manager circuitry 1714 associates the barcode and receipt description. In some such examples, all items of the receipt are recognized. Once the recognized items are formatted and aggregated to the final response, they can be transmitted to example report generating circuitry 134 of FIG. 1. Further, the example updating circuitry 1730 can add matched item descriptions and barcodes 110 to the internal dictionary 124.

Figure 19:
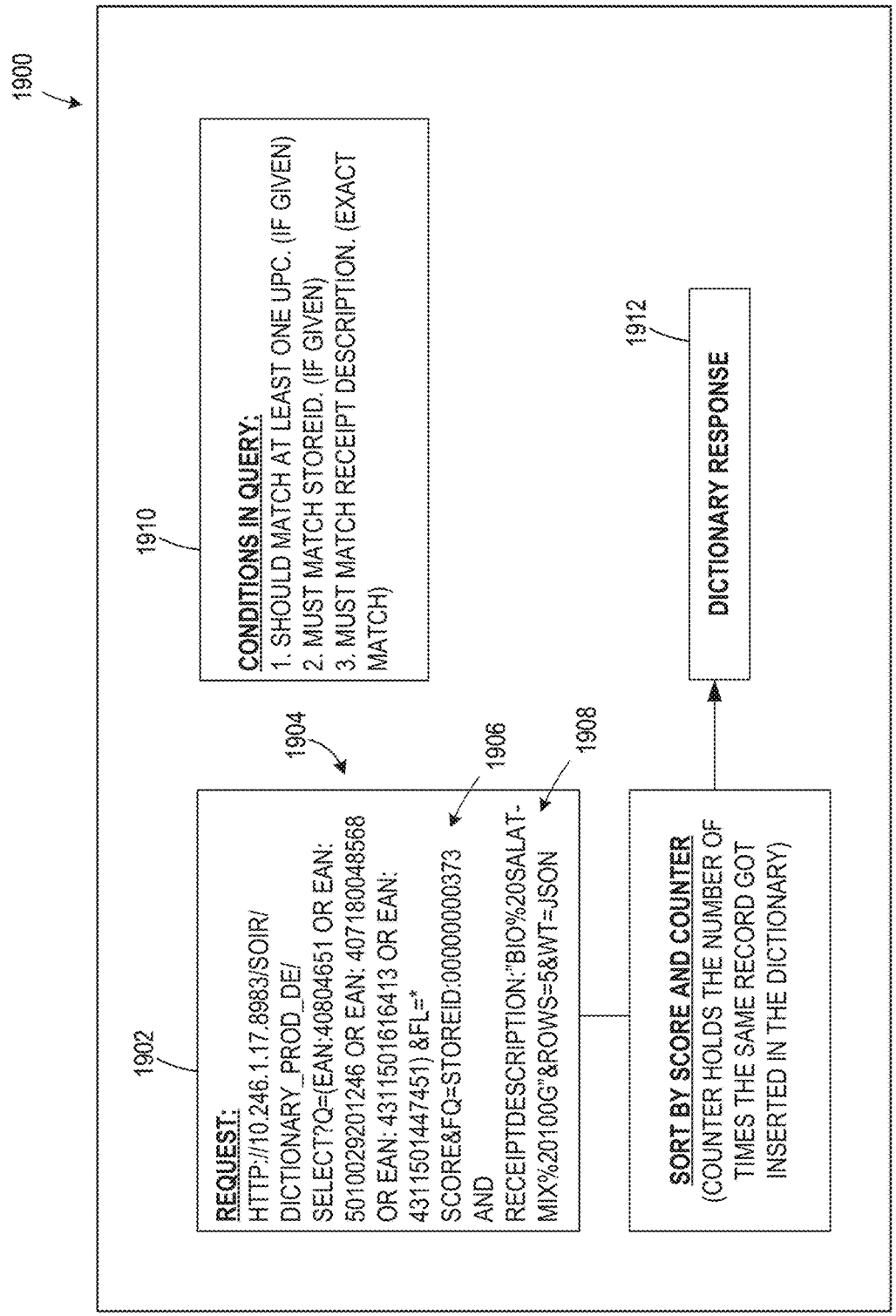
FIG. 19 is an illustration of an example search query generated to search an example internal dictionary.

FIG. 19 illustrates an example search query 1900 generated by the example dictionary searching circuitry 1718 to search the example internal dictionary 124. The search query 1900 includes a request 1902, which corresponds to an input (e.g., input 1802). Accordingly, the search query 1900 includes a list of unique barcodes 1904, a store ID 1906, and an example product description 1908 as extracted by the extraction circuitry 118. The search query 1900 also include example conditions 1910. In the illustrated example of FIG. 19, the conditions include (1) a result should match at least one barcode, (2) the result should match the store ID 1906, and (3) the results should match the receipt description exactly. However, additional or alternative conditions can be used in additional or alternative examples. In some examples, as in the illustrated example of FIG. 19, the results can be sorted by a score (e.g., a similarity score) and a counter (e.g., a number of time the same record added to the internal dictionary 124).

In the illustrated example of FIG. 19, the dictionary searching circuitry 1718 searches the search query 1900 against the internal dictionary 124 to obtain a dictionary response 1912. In some examples, the dictionary response 1912 can include several matches and/or suggestions. In some such examples, the search manager circuitry 1714 can select one result based on the score returned by the search query for each result and/or based on the counter for each suggested entry. In some examples, the dictionary response 1912 can include a single matched entry. In some such examples, the search manager circuitry 1714 determines the single match as a match and associates the product description and matched barcode. In some examples, the dictionary response 1912 can include no matches at all. In some such examples, the search manager circuitry 1714 can mark the item description as unrecognized and add the item description to a list of unrecognized items that will be used to search the products datastore 126.

Figure 20:
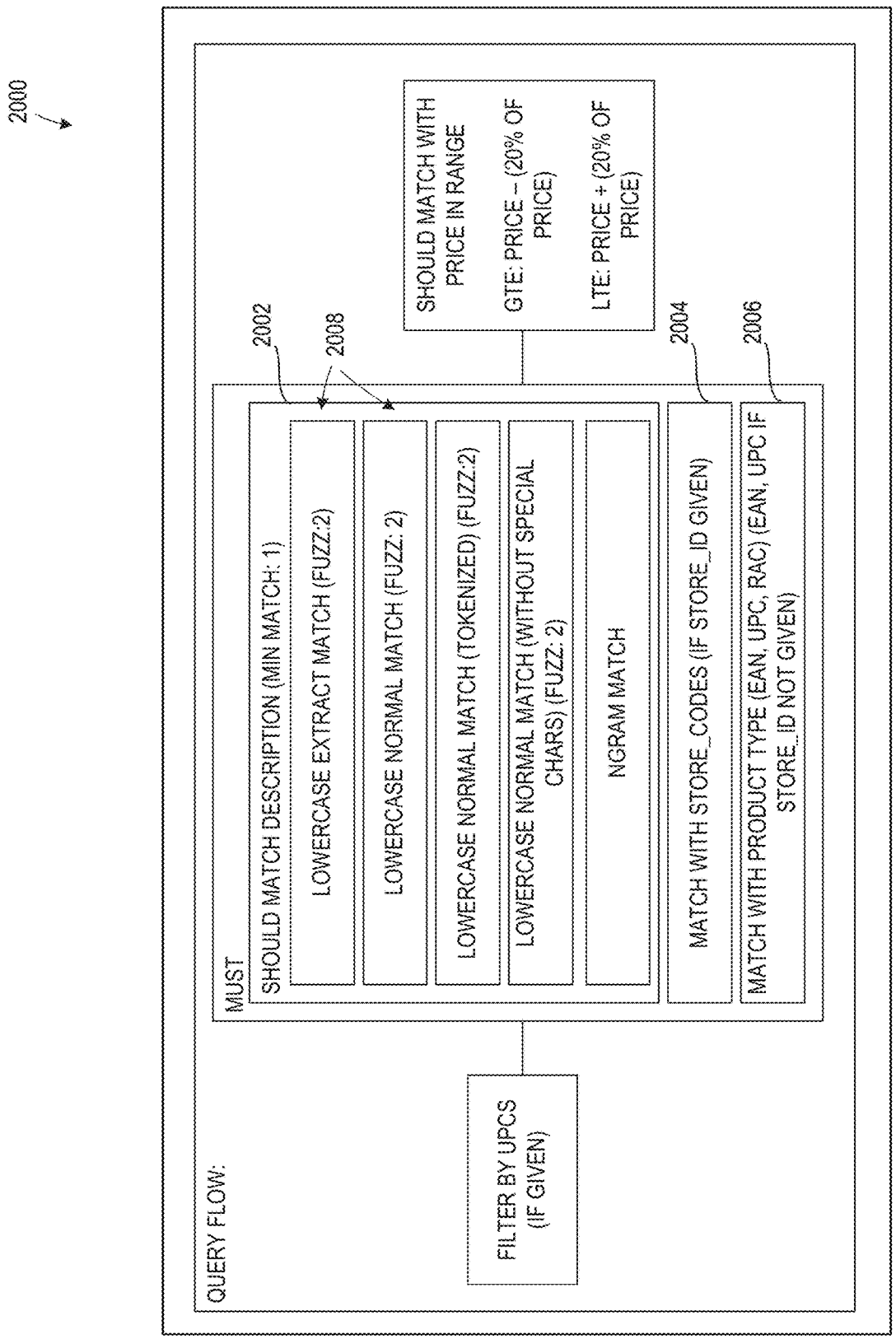
FIG. 20 is an illustration of another example search query generated to search an example products datastore.

FIG. 20 illustrates an example search query 2000 generated by the example products datastore searching circuitry 1722 to search the example products datastore 126. The search query 2000 includes an example product description region 2002, an example store ID region 2004, and an example a barcodes region 2006 that includes a list of unique barcodes. The product description region 2002 includes example conditions 2008. In some examples, the conditions 2008 create a complex query that contributes to scoring of each candidate result. For example, the conditions 2008 can include conditions for a plurality of similar matches such as n-gram matches, tokenized matches, etc. In some examples, as in the illustrated example of FIG. 20, the results can be filtered by barcodes (e.g., based on a similarity score). Below is an example search query 2000 that includes a store ID:

```
{
  'size': 5,
  'explain': False,
  'query': {
    'bool': {
      'filter': { 'terms': { 'ean': ['UPC1', 'UPC2', ... 'UPCN', ] } },
      'must': [{
        'bool': {
          'should': [{
            'match': {
              'description.keyword': {
                'query': 'RECEIPT DESCRIPTION',
                'fuzziness': 2,
                'boost': 2
              }
            }
          }, {
            'match': {
              'description.lowercase_keyword': {
                'query': 'RECEIPT DESCRIPTION',
                'fuzziness': 2,
                'boost': 1
              }
            }
          }, {
            'match': {
              'description.lowercase_text': {
                'query': 'RECEIPT DESCRIPTION',
                'fuzziness': 2,
                'boost': 1
              }
            }
          }, {
            'match': {
              'description.ngram': {
                'query': 'RECEIPT DESCRIPTION',
                'fuzziness': 2,
                'boost': 1
              }
            }
          }, {
            'match': {
              'description': {
                'query': 'RECEIPT DESCRIPTION',
                'fuzziness': 2,
                'boost': 1
              }
            }
          }, {
            'match': {
              'description': {
                'query': 'RECEIPT DESCRIPTION tokenized',
                'fuzziness': 2,
                'boost': 1
              }
            }
          }, {
            'match': {
              'description': {
                'query': 'RECEIPT DESC. without special chars',
                'fuzziness': 2,
                'boost': 1
              }
            }
          }
          ],
          'minimum_should_match': 1
        }
      }, {
        'bool': { 'filter': { 'terms': { 'storecode': ['STORE_CODE', 'all'] } } }
      }, {
        'terms': { 'type': ['ean', 'upc', 'rac','bvw','pzn'] }
      }
      ], // close must section
      'should': [{
```

-continued

```
        'range': {
          'price': {
            'gte': 0.80 * ITEM_PRICE,
            'lte': 1.20 * ITEM_PRICE,
            'boost': 1
          }
        }
      }]
    }
  }
}
```

In some examples, the store ID region 2004 can be removed from the search query 2000. In some examples, the products datastore search circuitry 1722 can remove RAC type barcodes because these are retailer specific codes that are not targeted when searching without store codes. Below is an example search query 2000 without a store ID:

```
{
  'size': 5,
  'explain': False,
  'query': {
    'bool': {
      'filter': { 'terms': { 'ean': ['UPC1', 'UPC2', ... 'UPCN', ] } },
      'must': [{
        'bool': {
          'should': [{
            'match': {
              'description.keyword': {
                'query': 'RECEIPT DESCRIPTION',
                'fuzziness': 2,
                'boost': 2
              }
            }
          }, {
            'match': {
              'description.lowercase_keyword': {
                'query': 'RECEIPT DESCRIPTION',
                                    'fuzziness': 2,
                'boost': 1
              }
            }
          },{
            'match': {
              'description.lowercase_text': {
                'query': +'RECEIPT DESCRIPTION',
                'fuzziness': 2,
                'boost': 1
              }
            }
          }, {
            'match': {
              'description.ngram': {
                'query': 'RECEIPT DESCRIPTION',
                'fuzziness': 2,
                'boost': 1
              }
            }
          }, {
            'match': {
              'description': {
                'query': 'RECEIPT DESCRIPTION',
                'fuzziness': 2,
                'boost': 1
              }
            }
          }, {
            'match': {
              'description': {
                'query': 'RECEIPT DESCRIPTION tokenized', '
                fuzziness': 2,
                'boost': 1
              }
            }
          }, {
```

```
            'match': {
                'description': {
                    'query': 'RECEIPT DESC. without special chars',
                    'fuzziness': 2,
                    'boost': 1
                }
            }
        }
    ],
    "minimum_should_match": 1,
    "must": [ { "terms": {"type": [ "ean","upc","bvw","pzn"] }
    } ]
        }
    }
}
```

FIG. 21 illustrates an example matrix 2100 including example matching scores 2102 for pairs of product descriptions and barcodes and a list 2104 of the identified matches that can be output by the example products datastore searching circuitry 1722. For example, the matrix 2100 can be used to resolve matching between the barcodes and descriptions. The example matrix 2100 of FIG. 21 includes a row 2106 having receipt descriptions, a column 2108 having barcodes, and cells 2110 that include values with scores for each pair (row, column).

Figure 22:
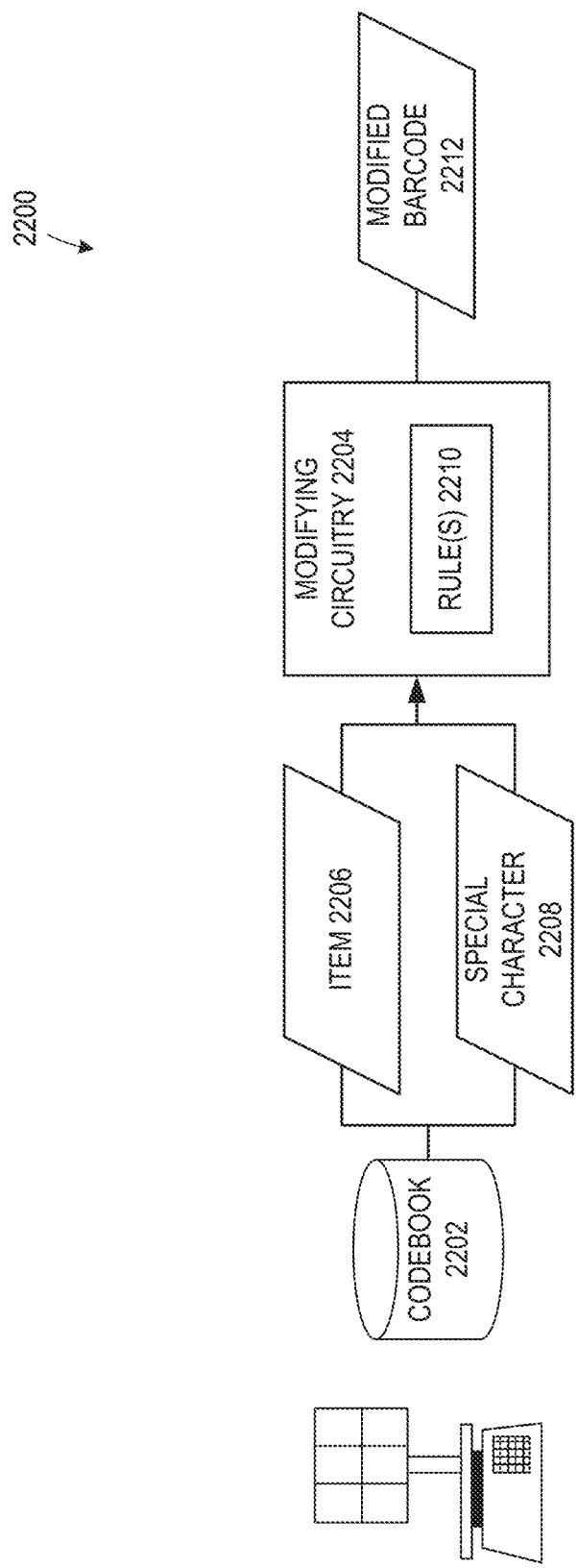
FIG. 22 is a block diagram of example framework to process products having variable weights.

The products datastore searching circuitry 1722 generates a search query using the list of unique barcodes and one item description detected from the receipt. As a result, the products datastore searching circuitry 1722 fills one row of the matrix on each query. In some examples, the products datastore searching circuitry 1722 matches a barcode with an item description based on a highest score above a threshold. For example, the threshold can be a score of at least 90. However, the threshold can be high or lower is additional or alternative examples. Thus, the products datastore searching circuitry 1722 can identify a match between a barcode and item description that receive the highest score above a threshold. In the illustrated example of FIG. 21, this process can resulted in a single match scenario. That is, the "Sieria Toilet wC-paperi 8rl kelt" did not receive a score above the threshold value of 90. However, the other product descriptions did receive scores above the threshold value. Accordingly, each product description searched by the products datastore searching circuitry 1722 received a matched barcode. The results are illustrated in the list 2104 of the identified matches FIG. 22 is a block diagram of example framework to process products having variable weights. In some examples, the framework is implemented by the example document decoding circuitry 114. In some examples, there are two main types of Variable Weighted Products including Variable Weight Products (VWP) and Branded Variable Weight Products (BVWP). In some examples, VWPs and BVWPs barcode's are treated differently inside a data source, such as the products datastore 126. In some examples, the decoding circuitry 122 can rely on the products datastore 126 to perform product matching and, thus, the decoding circuitry 122 can be structured to implement specific rules to correctly handle these special barcodes.

In some examples, the VWPs can be codebook items that may have special characteristics (e.g. organic banana vs non-organic, etc.). In some examples, the products datastore 126 stores this type of product with an identifier made of the main barcode plus concatenated characteristics. However, in some examples, rules for the concatenation are defined inside by a system that is external to the products datastore 126. In some examples, an application a panelist used to upload basket information can implement a set of pop-ups for the panelist to pick the characteristics that apply to the purchased VWP. However, in some examples, the application does not concatenate the characteristics to produce the final barcode. Thus, in some examples, the document decode circuitry 114 needs to replicate the external system's rules to find the correct product in the products datastore 126. In some examples, the rules can vary by country.

The framework of FIG. 22 includes an example codebook 2202, which is structured to store barcodes for a plurality of products. The example codebook 2202 of the illustrated example of FIG. 22 is implemented by any memor(ies), storage device(s) and/or storage disc(s) for storing data such as, for example, flash memory, magnetic media, optical media, etc. Furthermore, the data stored in the codebook 2202 may be in any data format such as, for example, binary data, comma delimited data, tab delimited data, structured query language (SQL) structures, image data, etc.

In some examples, the framework includes example modifying circuitry 2204, which is structured to modify a barcode based on rules. For example, a panelist may use the codebook 2202 to select an example item 2206 and an example special character 2208. The modifying circuitry 2204 can be used to modify the barcode by applying the rules. Thus, in some examples, the modifying circuitry 2204 includes an example rule(s) 2210. In some examples, the rules are stored in the application. In some examples, the rules are stored in a database, such as the database 120 of FIG. 1. In some examples, a first rule 2210 can be designated for a barcode that does not include characteristics. For example, the rule 2210 can be to add double zero at the end of the code. In some examples, a check digit can be calculated and attached to the end of the barcode. The check digit is used to verify the VWP. In some examples, a second rule 2210 can be designated for a barcode that includes a single characteristic. For example, the rule 2210 can be to add a zero at the end of the barcode, concatenate with the digits of the characteristic from position 14 of the barcode, and add a check digit. In some examples, a third rule 2210 can be designated for a barcode that includes several characteristics. For example, the rule 2210 can be to concatenate with the digits of the characteristics from position 14 of the barcode and add the check digit. Below is an example of a codebook prefix and the rules as applied for no characteristics, a single characteristic, and several characteristics:

```
Example:
    codebook barcode prefix = ['6438161']
    codebook start position = 13
    codebook concatenate digit = 1
No characteristics:
    UPC: 6438161001
        6438161001 + 0 + 0 => 643816100100
    calculated check digit is 2 => 6438161001002
Single characteristic:
    UPC: 6438161001,
    Characteristics: [{"id": "01","selectionNumber": "00000000010104"}]
    6438161001 + 0 + 4 =643816100104
    calculated check digit is 0 => 6438161001040
Several characteristics:
    UPC: 6438161001,
    Characteristics: [{"id": "01","selectionNumber": "00000000010104"},
        {"id": "02","selectionNumber": "00000000010103"}]
    6438161001+ 4 + 3 =643816100143
    calculated check digit is 9 => 6438161001439
```

In some examples, an example modified barcode 2212 (e.g., as it is expected to appear in the products datastore 126) can also be stored in the example internal dictionary 124 when the item is recognized. In some such examples, the internal dictionary 124 search can output a dictionary result that includes the original barcode as provided without any replacement of digits.

In some examples, a BVWP barcode as input into the application by the panelist can include a barcode with a length of 13 digits and a prefix digit of "23". The decoding circuitry 122 can identify digits from position 8 to position 12 as the variable weight of the purchase product. In some examples, before using this barcode for searching the products datastore 126, the decoding circuitry 122 can replace the weight digits with zeros, which can be a format used by the monitoring entity 102 when this type of product is incorporated into the products datastore 126. In some examples, a last digit can be a check digit for consistency purposes that is calculated using the other positions from 1 to 12. Therefore, when replacing the zeroes, the decoding circuitry 122 may need to recalculate the check digit. For example, an example BVWP uploaded by a panelist can be 2396274906008. After replacing the weight and recalculating the checked digit, the modified barcode can be 2396274900000. In some examples, a modified barcode (e.g., as it is expected to appear in the products datastore 126) can also be stored in the example internal dictionary 124 when the item is recognized. In some such examples, the internal dictionary 124 search can output a dictionary result that includes the original barcode as provided without any replacement of digits.

Figure 23:
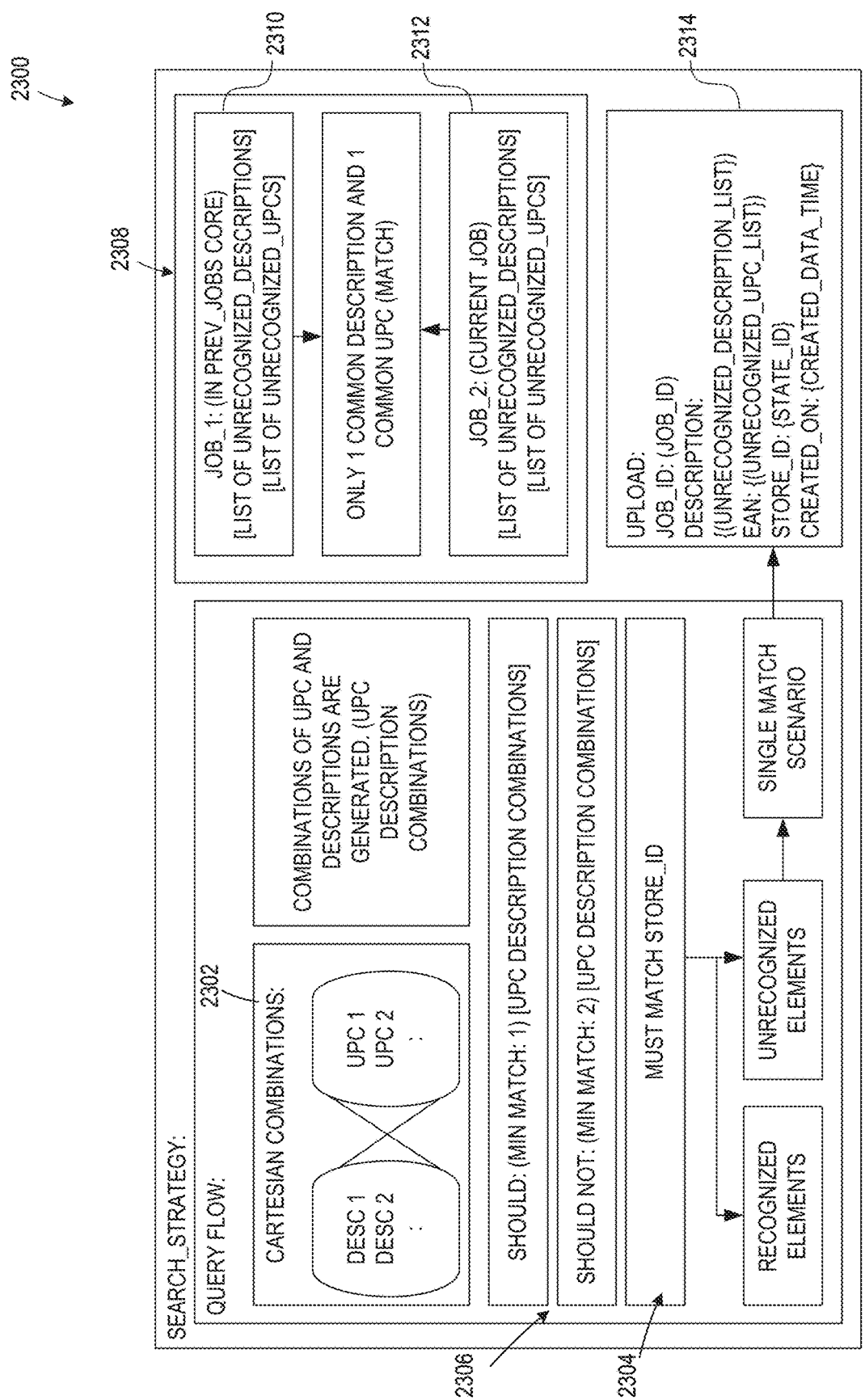
FIG. 23 is an illustration of another example search query generated to search an example previous jobs database.

FIG. 23 illustrates another example search query 2300 generated by the example previous jobs searching circuitry 1726 to search the example previous jobs database 130. In some examples, the search query 2300 can be used to search the previous jobs database 130 and to upload un-matched product descriptions and barcodes to the previous jobs database 130. The search query 2300 includes an example combination region 2302 into which the previous jobs searching circuitry 1726 inputs the un-matched products descriptions and barcodes. The search query 2300 also includes an example store ID region 2304 and an example conditions regions 2306. In some examples, the conditions 2306 include a minimum matching condition. For example, the minimum matching condition can be used such that during the search, a result that includes a match between at least one product description and barcode can be returned.

In the illustrated example of FIG. 23, example results region 2308 can compare an example previous job 2310 to the current job 2312. A match can be determine based on at least one common product description and one common barcode. In some examples, the matched product descriptions and barcodes can be added to a final response and un-matched product descriptions and barcodes can be transmitted to an example upload section 2314 to be uploaded to the previous jobs database 130.

Figure 24:
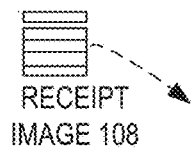
FIG. 24 is a block diagram of another example implementation of the example extraction circuitry of FIGS. 1,2 and/or 3.
Figure 24:
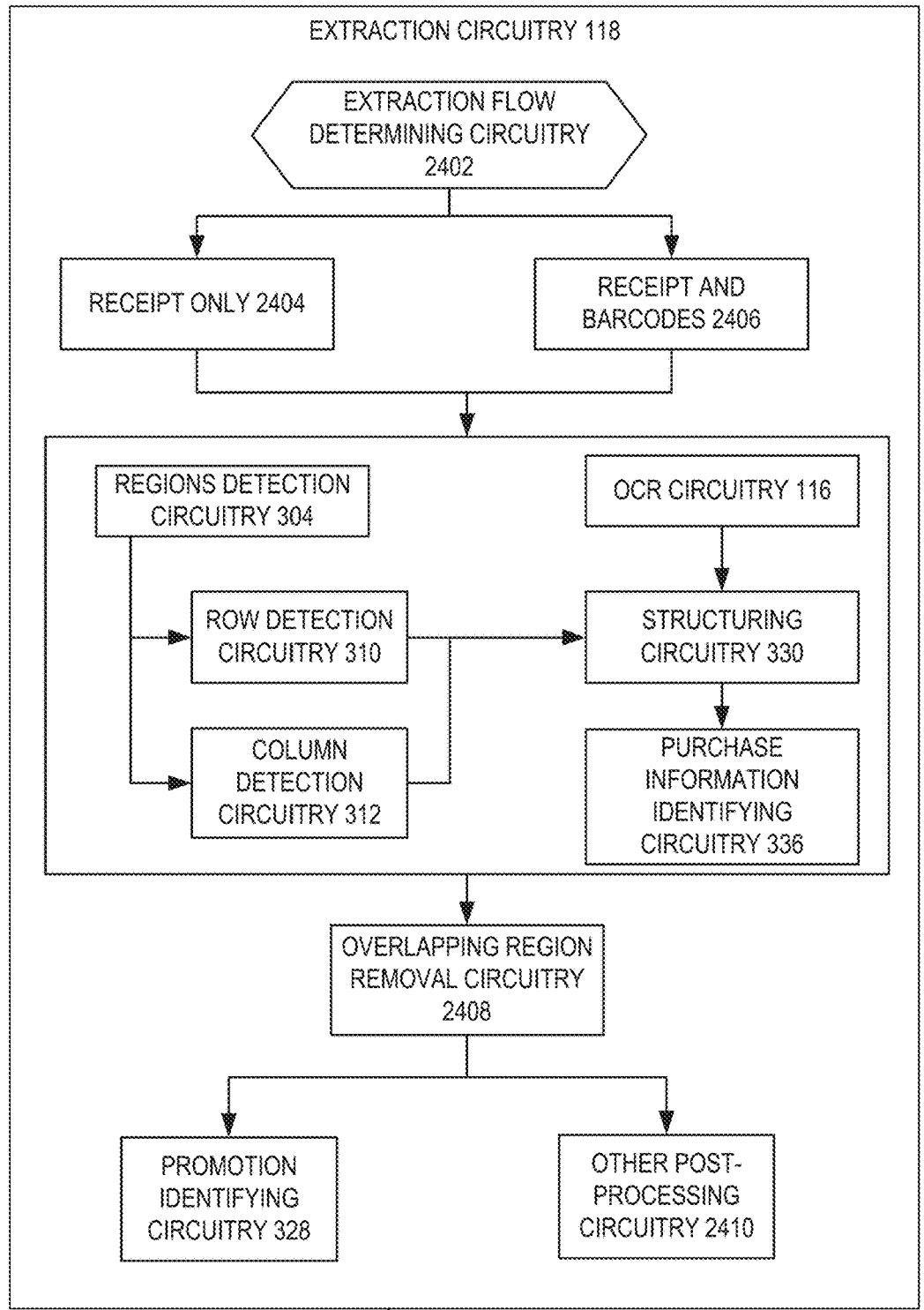

FIG. 24 is a block diagram of another example implementation of the example extraction circuitry 118 of FIGS. 1, 2, and/or 3. FIG. 24 illustrates example steps applied to a receipt image 108 that is to be processed by example document decode circuitry 114 and/or another DDS. The example extracting circuitry 118 of FIG. 24 includes example extraction flow determining circuitry 2402, which is structured to identify a path on which to send the receipt image 108. In the illustrated example of FIG. 24, there are two possible paths (e.g., scenarios, etc.), including a "receipt only" flow 2404 and a "receipt and barcode(s)" flow 2406. In some examples, the path on which the receipt image 108 should be sent to is determined based on which information the panelist uploaded, such as the receipt image 108 and metadata or the receipt image 108, metadata, and barcodes 110. In some examples, the receipt only flow 2404 can be used when barcodes 110 are unavailable. For example, the panelist may not be asked to provide barcodes 110 to save a burden (e.g., time, work, etc.) of the panelist.

In the illustrated example of FIG. 24, the receipt image 108 initially takes the same path in both the receipt only flow 2404 and the receipt and barcodes flow 2406. That is, the extraction circuitry 118 applies the same or similar technique to a receipt only and/or a receipt and barcodes upload. For example, the regions detection circuitry 304 can detect regions of interest on either receipt image 108. In some examples, the extraction circuitry 118 can include example overlapping region removal circuitry 2408, which is structured to remove overlapping regions (e.g., overlapping bounding boxes corresponding to products). For example, the overlapping region removal circuitry 2408 may be applied to a receipt image 108 that was uploaded in multiple parts (e.g., for a long receipt). In some examples, other post-processing steps can be applied by example post-processing circuitry 2410.

Figure 25:
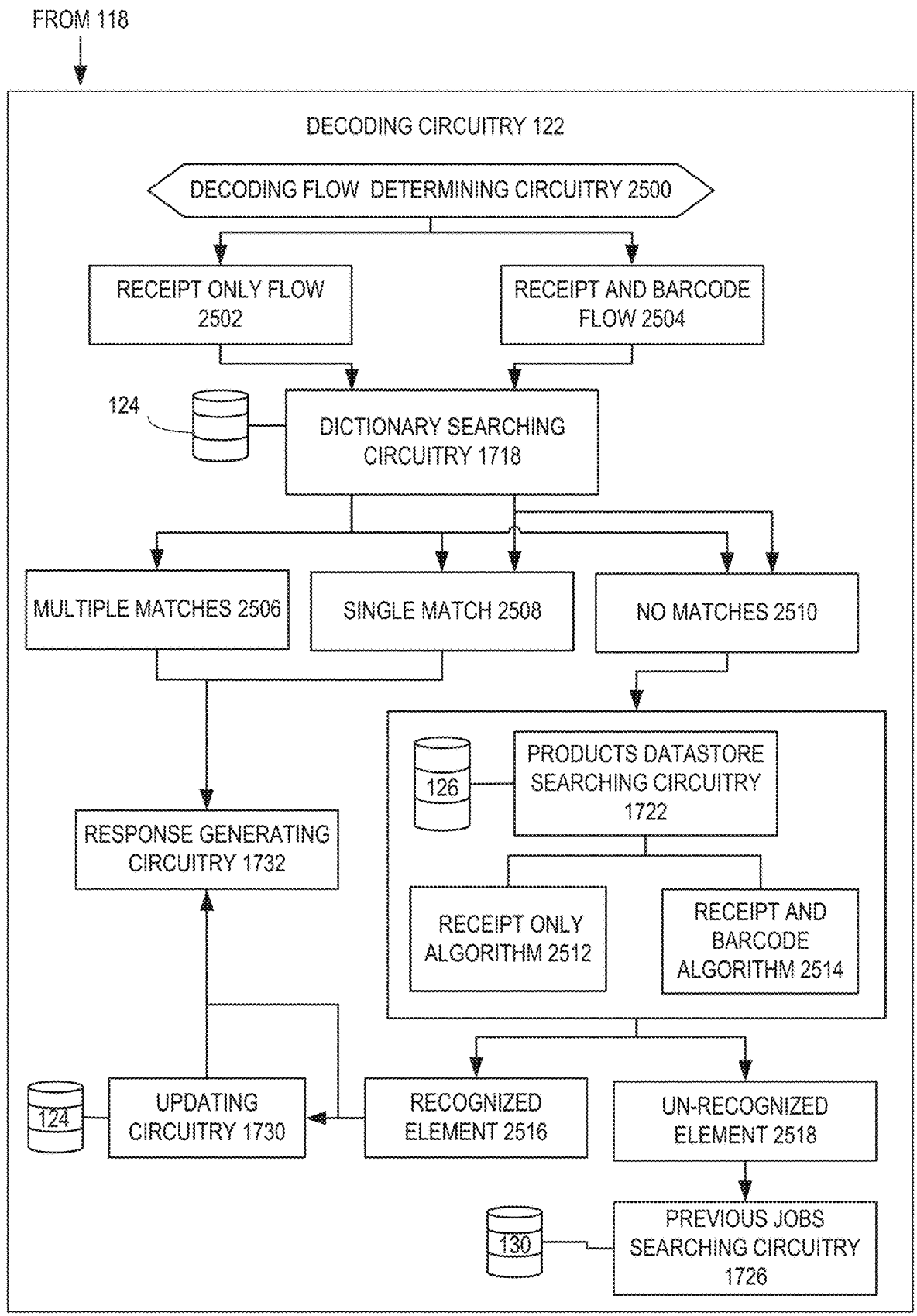
FIG. 25 is a block diagram of another example implementation of the example decoding circuitry of FIG. 1, 2, and/or 17.

FIG. 25 is a block diagram of another example implementation of the example decoding circuitry of FIG. 1, 2, and/or 17. FIG. 25 illustrates example primary steps applied to a basket that is to be processed by example document decode circuitry 114 and/or another DDS. The example decoding circuitry 122 of FIG. 25 includes example decoding flow determining circuitry 2500, which is structured to identify a path on which to send the basket. In the illustrated example of FIG. 25, there are two possible paths (e.g., scenarios, etc.), including a "receipt only" flow 2502 and a "receipt and barcode(s)" flow 2504. In some examples, the path on which the basket should be sent to is determined based on which basket information the panelist uploaded, such as the receipt image 108 and metadata or the receipt image 108, metadata, and barcodes 110.

In receipt only flow 2502, the decoding circuitry 122 is structured to use purchase information obtained from the extraction circuitry 118 and other metadata provided by the panelist. In some examples, the receipt only flow 2502 can be used when barcodes 110 are unavailable. For example, the panelist may not be asked to provide barcodes 110 to save a burden (e.g., time, work, etc.) of the panelist. In some examples, the receipt only flow 2502 is not ideal because an available dictionary (e.g., internal dictionary 124) does not include a sufficient amount of receipt descriptions mapped to barcodes. In the receipt and barcodes flow 2504, in addition to the purchase information and metadata, the decoding circuitry 122 can receive a list of barcodes 110 (e.g., scanned barcodes and/or manually selected codebook barcodes) from the panelist.

In the illustrated example of FIG. 25, baskets are searched against the internal dictionary 124 using the dictionary searching circuitry 1718 first, regardless of whether the basket takes the receipt only flow 2502 or the receipt and barcodes flow 2504. In the receipt only flow 2502, the internal dictionary 124 search can yield multiple matches 2506, a single match 2508, or no matches 2510. The receipt and barcode flow 2504 internal dictionary 124 search can yield the single match 2508 or the no match 2510. In either flow, the multiple match 2508 response and the single match response 2508 can be transmitted to the example response generating circuitry 1732 to be saved to a final response.

In either flow, product descriptions and barcodes that received the no-match response 2510 can be searched against the products datastore 126 using the products datastore searching circuitry 1722. However, algorithms applied to generate the search query can be different depending on which path the basket took. For example, the products datastore searching circuitry 1722 can generate the search query based on an example receipt only algorithm 2512 for the receipt only path 2502. Further, the products datastore searching circuitry 1722 can generate the search query based on an example receipt and barcode algorithm 2514 for the receipt and barcodes path 2504.

In the illustrated example of FIG. 25, either flow can results in a recognized element 2516 or an unrecognized element 2518 for the search query. In some examples, the recognized element 2516 can be transmitted to the updating circuitry 1730 to update the internal dictionary 124. In some examples, the recognized element 2516 can also be transmitted to the response generating circuitry 1732 to be added to the final response. Further, in either flow, the unrecognized element 2518 can be transmitted to the previous jobs searching circuitry 1726 to search the previous jobs database 130 and/or to upload the unrecognized element 2518 to the previous jobs database 130.

Flowcharts representative of example hardware logic circuitry, machine readable instructions, hardware implemented state machines, and/or any combination thereof for implementing the document decoding circuitry FIGS. 1, 2, 3, 9, 10, 17, 24, and/or 25 is shown in FIGS. 26-34. The machine readable instructions may be one or more executable programs or portion(s) of an executable program for execution by processor circuitry, such as the processor circuitry 3512 shown in the example processor platform 3500 discussed below in connection with FIG. 35 and/or the example processor circuitry discussed below in connection with FIGS. 36 and/or 37. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 26-34, many other methods of implementing the example document decode circuitry 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 26-34 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 26:
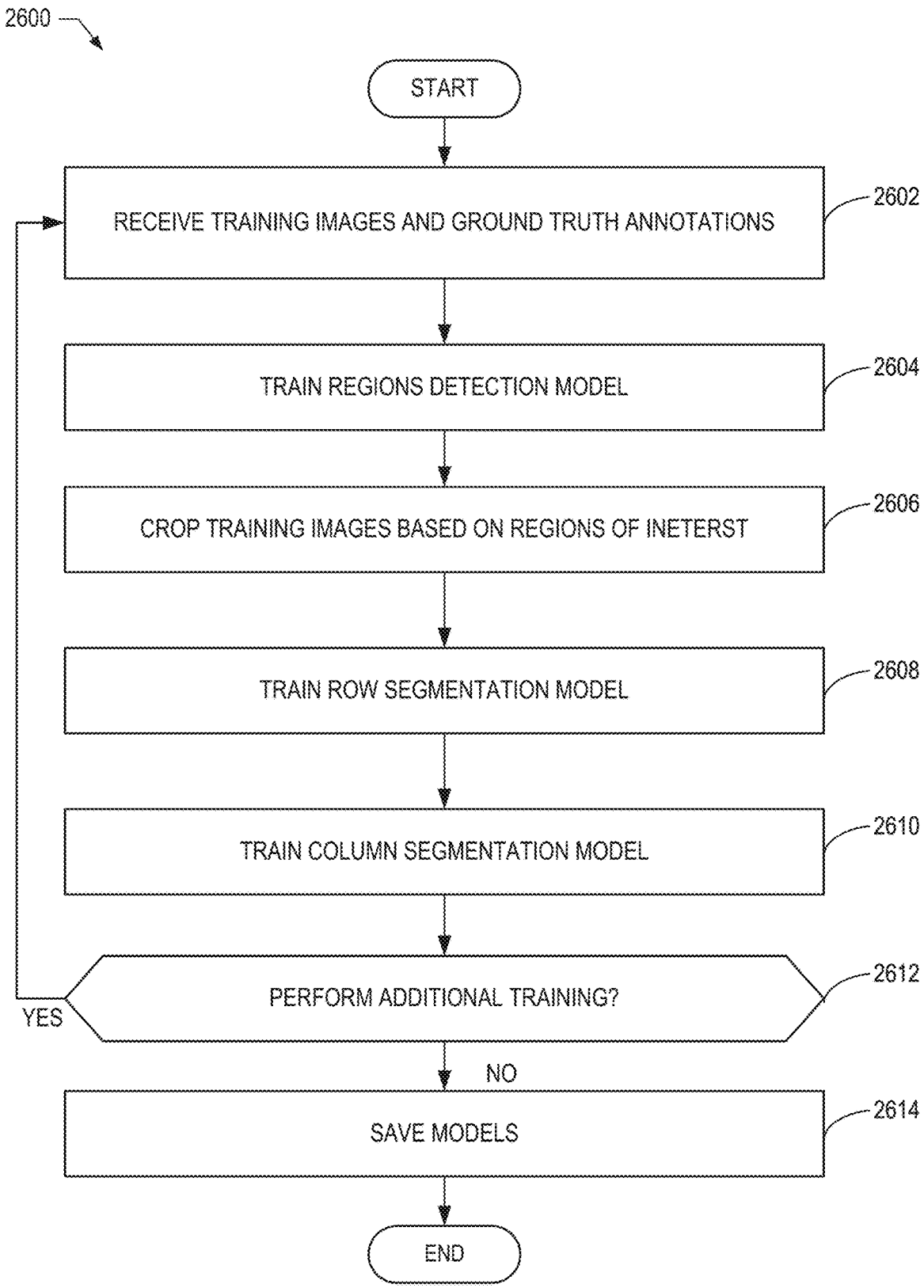
FIGS. 26-34 flowcharts representative of example machine readable instructions and/or example operations that may be executed by example processor circuitry to implement the document decode circuitry of FIGS. 1, 2, 3, 9, 10, 17, 18, 24, and/or 25.

FIG. 26 is a flowchart representative of example machine readable instructions and/or example operations 2600 that may be executed and/or instantiated by processor circuitry to train document decode models. The machine readable instructions and/or the operations 2600 of FIG. 26 begin at block 2602, at which the example machine learning circuity 136 receives example training images (e.g., training images 1002) and example ground truth annotations (e.g., ground truth annotations 1006). For example, the machine learning circuitry 136 can receive and/or retrieve the training images 1002 and ground truth annotations 1006 from an example database (e.g., database 120). In some examples, the training images 1002 and ground truth annotations 1006 can correspond to pairs of trainings images in which one image is an original image and the other image is a labeled image.

At block 2604, example regions detection model training circuitry 1004 trains an example regions detection model (e.g., regions detection model 306) to detect regions of interest. For example, the regions detection model training circuitry 1004 trains the regions detection model 306 to detect a receipt region and a column region. In some examples, the regions detection model training circuitry 1004 trains the regions detection model 306 using a faster R-CNN architecture. In some examples, the regions detection model training circuitry 1004 trains the regions detection model 306 using the training images 1002 and determines a performance of the trained regions detection model 306 using the ground truth annotations. For example, the ground truth annotations 1006 can include labeled receipt regions and labeled products regions corresponding to the training images 1002.

At block 2606, example cropping circuitry (e.g., cropping circuitry 1008) crops the training images 1002 based on the regions of interest using the ground truth annotations 1006. In some examples, the cropping circuitry 1008 can crop the training images 1002 using the receipt regions in the ground truth annotations 1006 to generate example row training images (e.g., row training images 1010). In some examples, the cropping circuitry 1008 can crop the training images 1002 using the products regions in the ground truth annotations 1006 to generate example column training images (e.g., column training images 1014).

At block 2608, example row training circuitry (e.g., row detection model training circuitry 1012) trains an example row detection model (e.g., row segmentation model(s) 314). For example, the row detection model training circuitry 1012 trains the row segmentation model 314 to classify each pixel in an image as belonging to a row class or a background class. In some examples, the row detection model training circuitry 1012 trains the row segmentation model 314 using an example dhSegment architecture.

At block 2610, example column detection model training circuitry (e.g., column detection model training circuitry 1016) trains an example column segmentation model (e.g., column segmentation model(s) 320). For example, the column detection model training circuitry 1016 trains the column segmentation model 320 to classify each pixel in an image as belonging to a column class or a background class. In some examples, the column detection model training circuitry 1016 trains the column segmentation model 320 using an example U-Net architecture.

At block 2612, the example machine learning circuitry 136 determines whether to perform additional training. For example, the machine learning circuitry 136 may decide to continue training the regions detection model(s) 306, the row segmentation model(s) 314, and/or the column segmentation model(s) 320. In some examples, the machine learning circuitry 136 may decide to train additional or alternative regions detection model(s) 306, row segmentation model(s) 314, and/or column segmentation model(s) 320. In some examples, the machine learning circuitry 136 may decide to train other models, such as models to structure a receipt layout, to store information in a database, etc. If the answer to block 2612 is YES, and the machine learning circuitry 136 decides to train more models, control advances back to block 2602 at which the machine learning circuitry 136 receives training images and ground truth annotations. If the answer to block 2612 is NO, and the machine learning circuitry 136 decides not to perform additional training, the model training circuitry 2614 saves the models (Block 2614). For example, the machine learning circuitry 136 may save the models 306, 314, 320 to the example database 120 and/or another storage device (e.g., with a cloud service provider).

Figure 27:
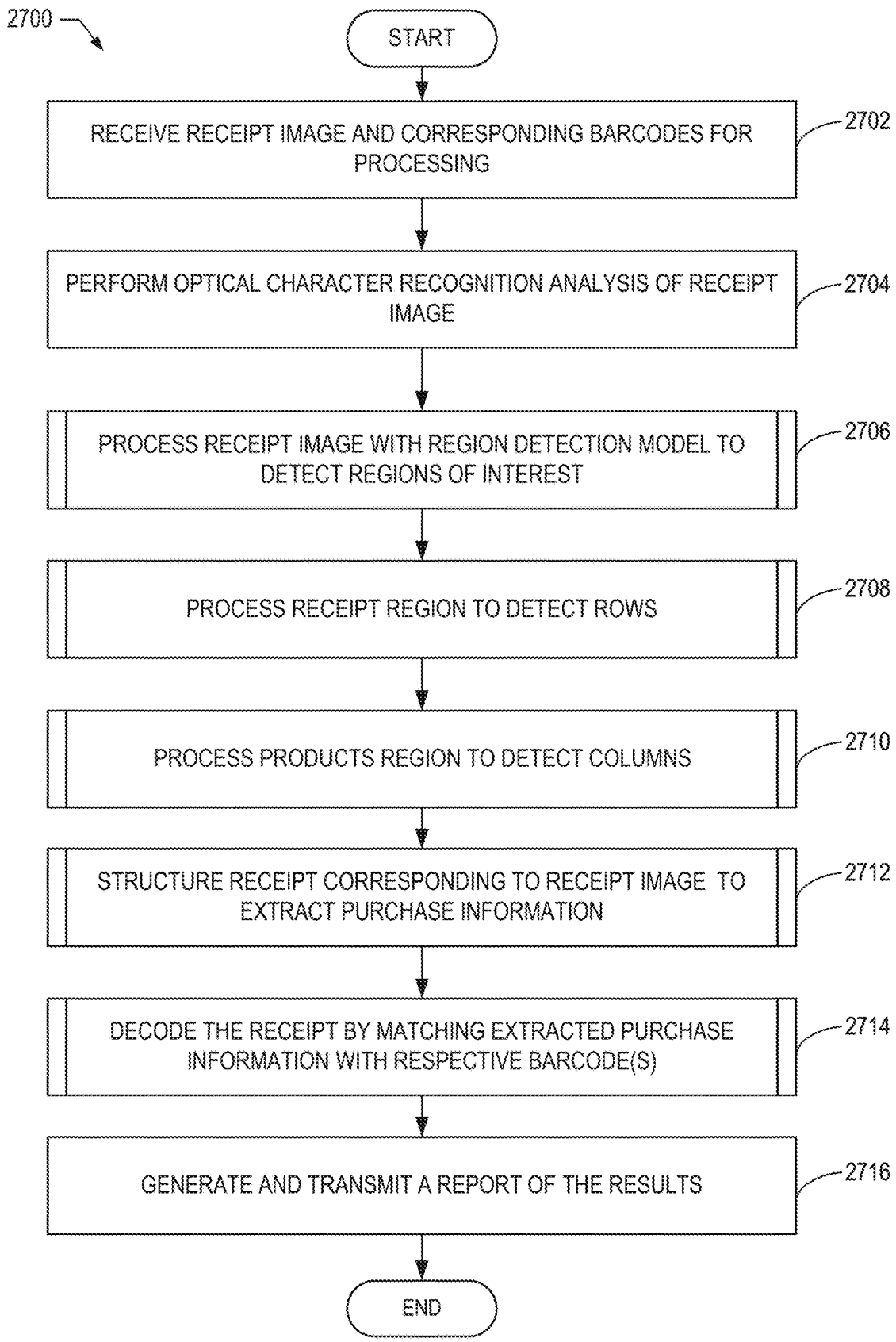

FIG. 27 is a flowchart representative of example machine readable instructions and/or example operations 2700 that may be executed and/or instantiated by processor circuitry to decode a purchased basket provided by a panelist or other consumer/participant. The machine readable instructions and/or the operations 2700 of FIG. 27 begin at block 2702, at which the document decode circuitry 114 receives a receipt image (e.g., receipt image 108) and corresponding barcodes (e.g., barcodes 110) for processing. For example, the document decode circuitry 114 can receive and/or retrieve the receipt image 108 and corresponding barcodes 110 from an example basket datastore (e.g., basket datastore 112).

At block 2704, example OCR circuitry (e.g., OCR circuitry 116) performs OCR analysis of the receipt image 108. For example, the OCR circuitry 116 applies an OCR algorithm over the image to detect text. In some examples, the OCR circuitry 116 outputs a plurality of bounding boxes corresponding to text, coordinates of the bounding boxes, and transcribed text within the bounding boxes. In some examples, the OCR circuitry 116 transmits the OCR output to example extraction circuitry (e.g., extraction circuitry 118).

At block 2706, example regions detection circuitry (e.g., regions detection circuitry 304) processes the receipt image 108 with a regions detection model 306 to detect regions of interest. For example, the regions detection circuitry 304 can apply the regions detection model 306 to the receipt image 108 to detect a receipt region and a products regions, as described above and in further detail below. In some examples, example image cropping circuitry (e.g., image cropping circuitry 308) applies a cropping operation on the receipt image 108 based on the detected regions of interest, and transmits the cropped images to example row detection circuitry (e.g., row detection circuitry 310) and example column detection circuitry (e.g., column detection circuitry 312).

At block 2708, the example row detection circuitry 310 processes the receipt region of the receipt image 108 to detect rows that correspond to lines of text, as described above and in further detail below. For example, the row detection circuitry 310 can apply an example row segmentation model 314 to the receipt region to output a pixel-wise mask. In some examples, the row detection circuitry 310 applies post-processing techniques to detect bounding boxes corresponding to the rows.

At block 2710, the example column detection circuitry 312 processes the products region of the receipt image 108 to detect columns, as described above and in further detail below. For example, the column detection circuitry 312 can apply an example column segmentation model 320 to the products region to output a pixel-wise classifier. In some examples, the column detection circuitry 312 applies post techniques to detect bounding boxes corresponding to the columns.

At block 2712, example data extracting circuitry (e.g., data extracting circuitry 326) detects and builds a structure a receipt corresponding to the receipt image 108 to extract purchase information from the receipt, as described above and in further detail below. For example, the purchase information can include purchase products, prices, quantities, discounts, etc. In some examples, the data extracting circuitry 326 can receive and/or retrieve the text data output by the OCR circuitry 116, row data output by the row detection circuitry 310, and column data output by the column detection circuitry 312 to facilitate building of the receipt's structure. For example, the data extracting circuitry 326 organizes the detected row and columns based on coordinates of their respective bounding boxes and maps words output by the OCR circuitry 116 to respective rows and columns based on IoU calculations. In some examples, forming the receipt's structure generates a digitized receipt from which the data extracting circuitry 326 can extract the purchase information.

At block 2714, example decoding circuitry (e.g., decoding circuitry 122) decodes the receipt by matching extracted purchase information with respective barcodes 110, as described above and in further detail below. For example, the decoding circuitry 122 can receive and/or retrieve the extracted purchase information from the extraction circuitry 118 and corresponding barcodes 110 uploaded by the panelist (e.g., from the basket datastore 112). In some examples, the decoding circuitry 122 generates a search query and searches the query against a first data source. For example, the first data source can be an example internal dictionary (e.g., internal dictionary 124). In some examples, the decoding circuitry 122 generates a second search query and searches the query against a second data source (e.g., if the first search does not yield a match). For example, the second data source can be an example products datastore (e.g., products datastore 126). In some examples, the decoding circuitry 122 generates a third search query and searches the query against a third data source (e.g., if the second search does not yield a match). For example, the third data source can be an example previous jobs database (e.g., previous jobs database 130).

At block 2716, example report generating circuitry (e.g., report generating circuitry 134) generates a report of the results. For example, the report can include decoded purchase data that includes prices and quantities associated with specific purchased barcodes. In some examples, the report generating circuitry 134 transmits the report to an example monitoring entity (e.g., monitoring entity 102). In some examples, the monitoring entity 102 can be a marketing research entity that further analyzing the results to extract insights.

Figure 28:
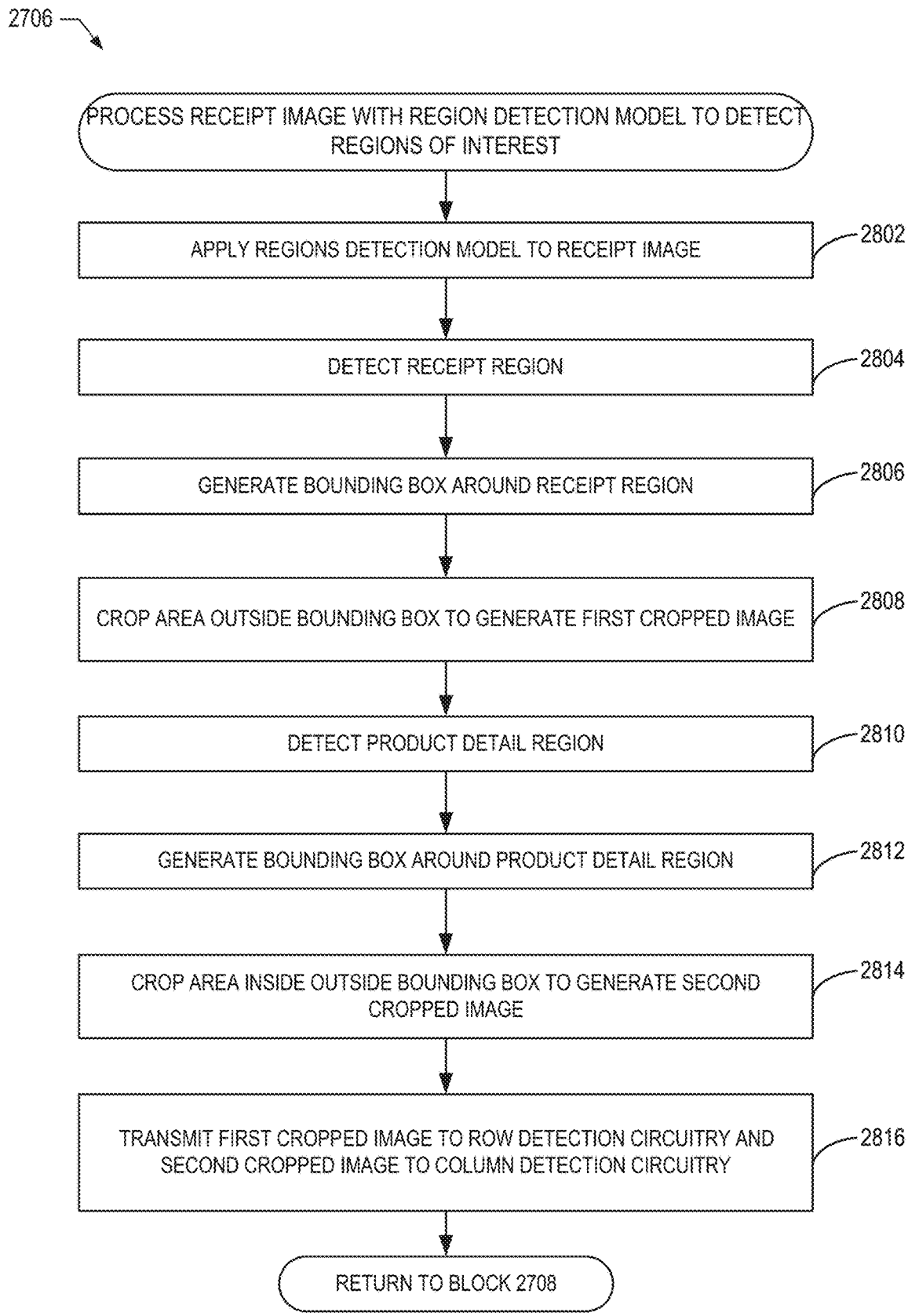

FIG. 28 is a flowchart representative of example machine readable instructions and/or example operations 2706 that may be executed and/or instantiated by processor circuitry to detect regions of interest of a receipt image 108. The machine readable instructions and/or the operations 2706 of FIG. 28 begin at block 2802, at which the regions detection circuitry 304 applies the regions detection model 306 to the receipt image 108. For example, the regions detection model 306 can be an R-CNN that detects and classifies the regions of interest.

At block 2804, the regions detection circuitry 304 (e.g., via the regions detection model 306) detects the receipt region, which is a rectangular region of the receipt image 108 in which the corresponding receipt is positioned. For example, the regions detection model 306 can apply a selective search algorithm to detect the receipt region. At block 2806, the regions detection circuitry 304 (e.g., via the regions detection model 306) generates a bounding box around the receipt region. In some examples, the bounding box can include reference coordinates that correspond to the receipt region's position within the receipt image 108. At block 2808, the example image cropping circuitry 308 crops an area outside the bounding box to generate a first cropped image that corresponds to the receipt region.

At block 2810, the regions detection circuitry 304 (e.g., via the regions detection model 306) detects the products region, which is a rectangular region around text of the receipt image 108 that contains purchase details. For example, the regions detection model 306 can apply a selective search algorithm to detect the products region. At block 2812, the regions detection circuitry 304 (e.g., via the regions detection model 306) generates a bounding box around the products region. In some examples, the bounding box can include reference coordinates that correspond to the products region's position within the receipt image 108. At block 2814, the example image cropping circuitry 308 crops an area outside the bounding box to generate a second cropped image that corresponds to the products region.

At block 2816, the regions detection circuitry 304 transmits the first cropped image to the example row detection circuitry 310 and transmits the second cropped image to the example column detection circuitry 312. For example, the regions detection circuitry 304 transmits the receipt region to the row detection circuitry 310 and the products region to the column detection circuitry 312.

Figure 29:
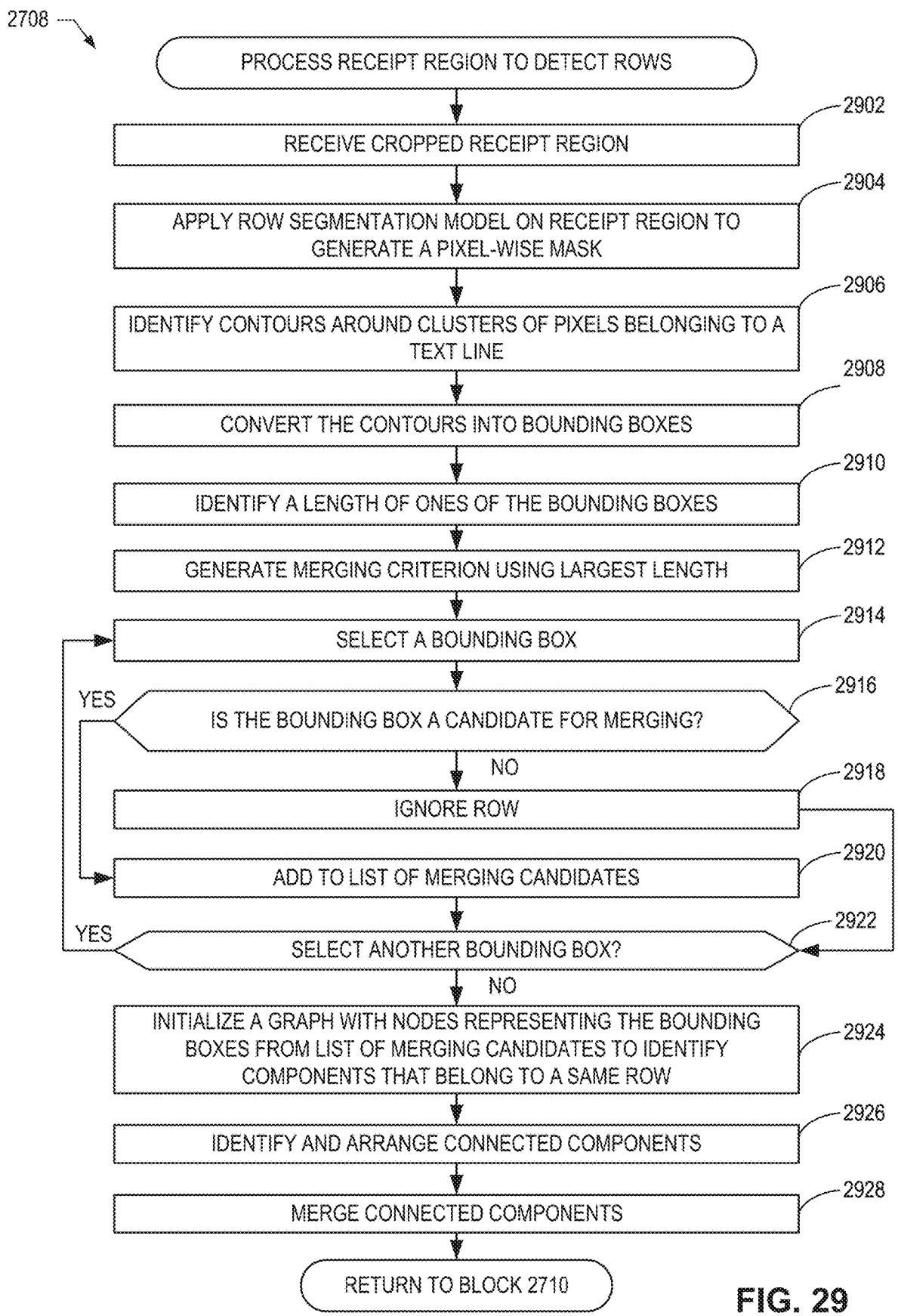

FIG. 29 is a flowchart representative of example machine readable instructions and/or example operations 2708 that may be executed and/or instantiated by processor circuitry to detect rows from the receipt region of the receipt image 108. The machine readable instructions and/or the operations 2708 of FIG. 29 begin at block 2902, at which the example row detection circuitry 310 receives the cropped receipt region of the receipt image 108. At block 2904, the row detection circuitry 310 applies a row segmentation model 314 on the receipt region to generate an example pixel-wise mask. For example, the row segmentation model 314 can be CNN-based model trained as a pixel-wise predictor (e.g., using an example dhSegment architecture). In some examples, the row segmentation model 314 outputs the pixel-wise mask that classifies each pixel within the receipt region as belonging to either a text line or background. In some examples, the pixel-wise mask includes groups of pixels classified as row pixels in clusters.

At block 2906, example bounding box generating circuitry (e.g., bounding box generating circuitry 316) identifies contours around the clusters of pixels belonging to a text line. For example, the contour can be a free connection of dots that form a convex closed form. At block 2908, the bounding box generating circuitry 316 converts each contour into a minimal geometric representation that can be projected into a set of intersecting lines (e.g., four intersecting lines). For example, the set of intersecting lines can form a polygon that includes four angles (e.g., 90 degree angles). For example, the polygon can corresponding to a bounding box. Accordingly, the bounding box generating circuitry 316 can generate a plurality of bounding boxes that represent lines of text within the receipt region.

At block 2910, example line merging circuitry 318 identifies lengths of ones of the bounding boxes generated by the bounding box generating circuitry 316. For example, the line merging circuitry 318 can identify the lengths of the bounding boxes using coordinates of each of the bounding boxes. At block 2912, the line merging circuitry 318 generates a merging criterion using a largest length. For example, the line merging circuitry 318 compares lengths of the ones of the bounding boxes and identifies the longest bounding box.

The line merging circuitry 318 generates the merging criterion by multiplying the largest length by a value between 0 and 1 (e.g., 0.9). Accordingly, the merging criterion is a threshold value.

At block 2914, the line merging circuitry 318 selects a bounding box to determine whether the bounding box is a candidate for line merging. The bounding box can be any bounding box generated by the example bounding box generating circuitry 316. At block 2916, the line merging circuitry 318 determines whether the bounding box is a candidate for line merging. For example, the line merging circuitry 318 compares a length of the bounding box to the merging criterion. If the length of the bounding box is greater than or equal to the threshold value of the merging criterion, the line merging circuitry 318 determines the bounding box is not a candidate for merging (e.g., block 2916: NO). If the answer to block 2916 is NO, control advances to block 2918 at which the line merging circuitry 318 decides to ignore the bounding box during the line merging process. If the length of the bounding box is less that the threshold value of the merging criterion, the line merging circuitry 318 determines the bounding box is a candidate for merging (e.g., block 2916: YES). If the answer to block 1916 is YES, control advances to block 2920, at which the line merging circuitry 318 adds the bounding box to a list of merging candidates.

At block 2922, the line merging circuitry 318 determines whether to select another bounding box. For example, if another bounding box has not been compared to the merging criterion, the line merging circuitry 318 can determine to select another bounding box (e.g., block 2922: YES). If the answer to block 2922 is YES, control advances to block 2914 at which the lines merging circuitry 2914 selects a bounding box. If the line merging circuitry 318 has compared each bounding box to the merging criterion, the line merging circuitry 318 can determine not to select another bounding box (e.g., block 2922: NO).

If the answer to block 2922 is NO, control advances to block 2924 at which the line merging circuitry 318 initializes a graph with nodes representing the bounding boxes from the list of merging candidates to identify components that belong to a same row. For example, the line merging circuitry 318 can initialize the graph with a plurality of nodes, wherein each of the plurality of nodes represents a respective bounding boxes in the list of merging candidates. In some examples, the line merging circuitry 318 identifies the bounding boxes that belong to the same row by adding edges between any two nodes that satisfy two conditions. For example, the first condition can be that the bounding boxes share a positive vertical coordinate and the second condition can be that the bounding boxes do not have an overlapping horizontal coordinate.

At block 2926, the line merging circuitry 318 identifies and arranges connected components (e.g., nodes) within the graph. In some examples, the line merging circuitry 318 applies a depth-first search (DFS) algorithm to the graph to identify the connected components within the graph. In some examples, the line merging circuitry 318 arranges the connected components corresponding to the nodes in a left to right order. For example, arranging the connected components in a left to right order enables the line merging circuitry 318 to merge a leftmost and a rightmost bounding boxes and ignore other (e.g., intermediate) bounding boxes.

At block 2928, the line merging circuitry 318 merges the connected components. That is, the line merging circuitry 318 merges bounding boxes that have been identified as belonging to the same row. In some examples, the row detection circuitry 310 outputs a list of bounding boxes that are fitted to printed text lines (e.g., rows) within the receipt region (e.g., and coordinates of the bounding boxes).

Figure 30:
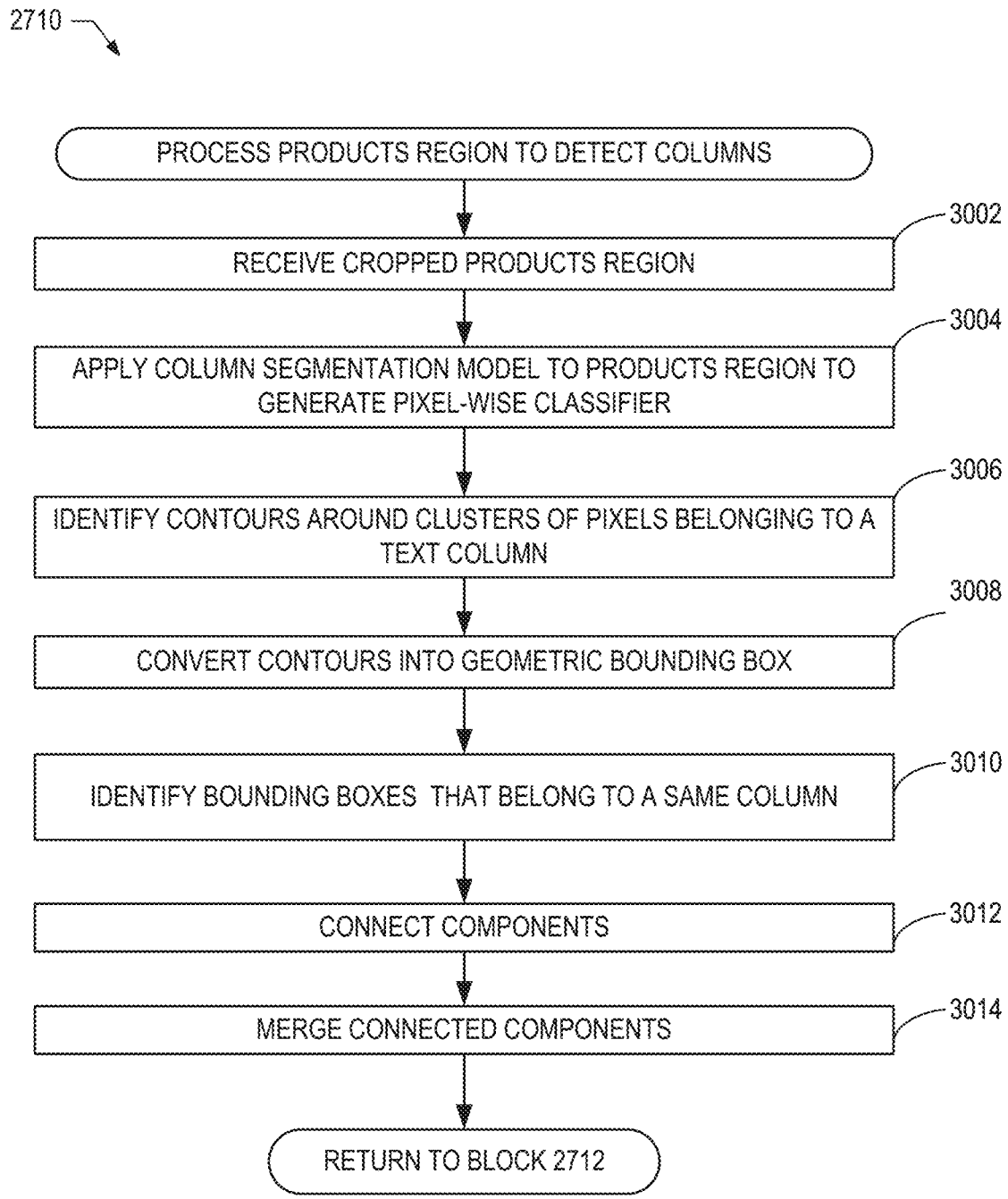

FIG. 30 is a flowchart representative of example machine readable instructions and/or example operations 2710 that may be executed and/or instantiated by processor circuitry to detect columns from the products regions of the receipt image 108. The machine readable instructions and/or the operations 2710 of FIG. 30 begin at block 3002, at which the example column detection circuitry 312 receives the cropped products region of the receipt image 108. At block 3004, the column detection circuitry 312 applies a column segmentation model 320 on the products region to generate an example pixel-wise classifier. For example, the column segmentation model 320 can be CNN-based model trained as a pixel-wise predictor (e.g., using an example U-Net architecture). In some examples, the column segmentation model 320 outputs the pixel-wise classifier that classifies each pixel within the products region as belonging to either a text area or background. In some examples, the pixel-wise classifier includes groups of pixels classified as columns pixels in clusters.

At block 3006, example bounding box generating circuitry (e.g., bounding box generating circuitry 322) identifies contours around the clusters of pixels belonging to a column. For example, the contour can be a free connection of dots that form a convex closed form. At block 3008, the bounding box generating circuitry 322 converts each contour into a minimal geometric representation that can be projected into a set of intersecting lines (e.g., four intersecting lines). For example, the set of intersecting lines can form a polygon that includes four angles (e.g., 90 degree angles). For example, the polygon can corresponding to a bounding box. Accordingly, the bounding box generating circuitry 322 can generate a plurality of bounding boxes that represent columns of text within the products region.

At block 3010, example column merging circuitry (e.g., column merging circuitry 324) initializes a graph with nodes representing the bounding boxes from plurality of bounding boxes generated by the bounding box generating circuitry 322. For example, the column merging circuitry 324 can initialize the graph with a plurality of nodes, wherein each of the plurality of nodes represents a respective bounding boxes in of the plurality of bounding boxes. In some examples, the column merging circuitry 324 identifies the bounding boxes that belong to the same column by adding edges between any two nodes that satisfy two conditions. For example, the first condition can be that the bounding boxes share a positive horizontal coordinate and the second condition can be that the bounding boxes do not have an overlapping vertical coordinate.

At block 3012, the column merging circuitry 324 identifies and arranges connected components (e.g., nodes) within the graph. In some examples, the column merging circuitry 324 applies a depth-first search (DFS) algorithm to the graph to identify the connected components within the graph. In some examples, the column merging circuitry 324 arranges the connected components corresponding to the nodes in a top to bottom order. For example, arranging the connected components in a top to bottom order enables the column merging circuitry 324 to merge a topmost and a bottommost bounding boxes and ignore other (e.g., intermediate) bounding boxes.

At block 3014, the column merging circuitry 324 merges the connected components. That is, the column merging circuitry 324 merges bounding boxes that have been identified as belonging to the same column. In some examples, the column detection circuitry 312 outputs a list of bounding boxes that are fitted to columns within the products region (e.g., and coordinates of the bounding boxes).

Figure 31:
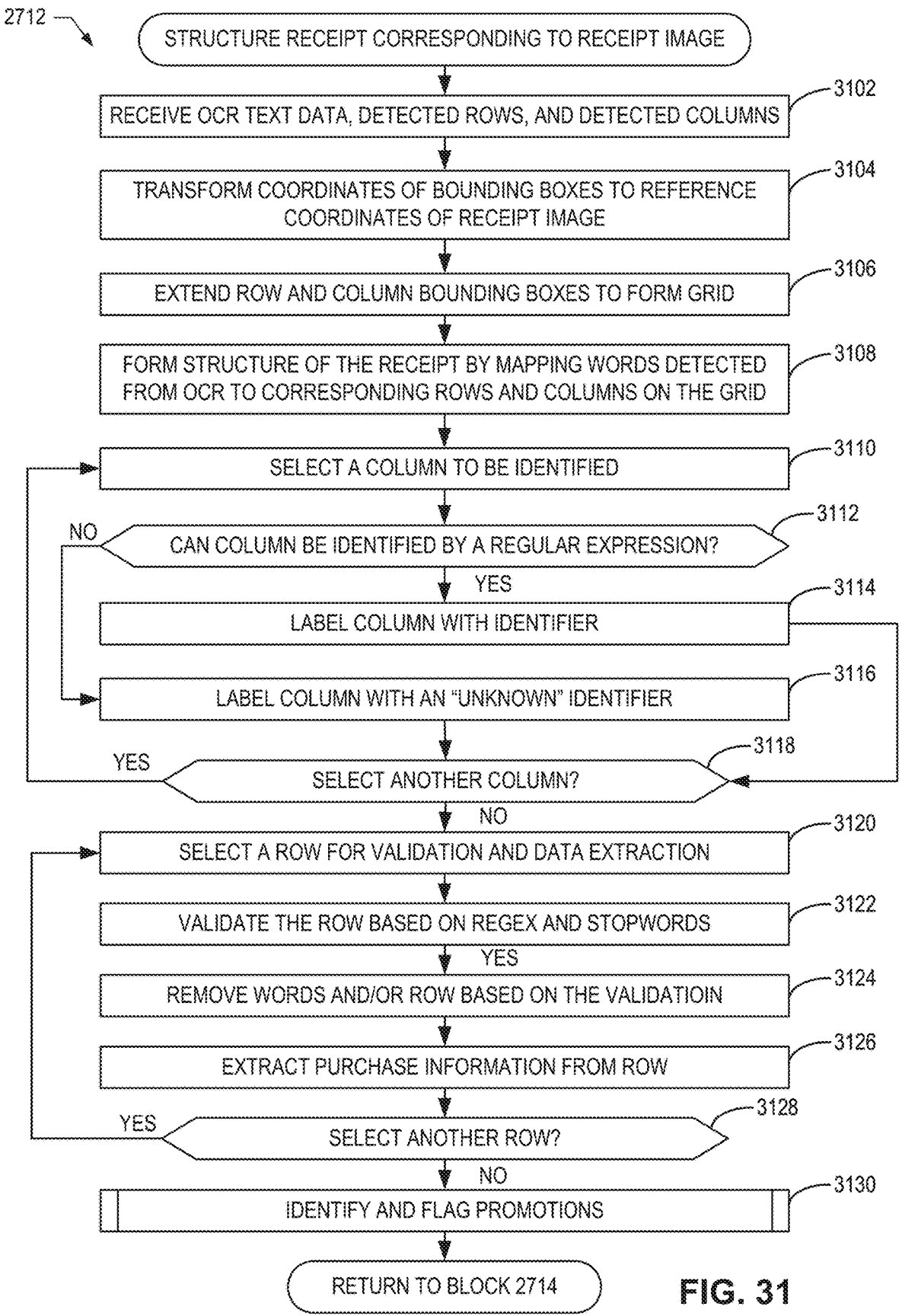

FIG. 31 is a flowchart representative of example machine readable instructions and/or example operations 2712 that may be executed and/or instantiated by processor circuitry to determine and form a structure of a receipt corresponding to the receipt image 108 to extract purchase information. The machine readable instructions and/or the operations 2712 of FIG. 31 begin at block 3102, at which the data extracting circuitry 326 receives the OCR text data, detected rows, and detected columns. For example, the data extracting circuitry 326 receives text data, text bounding boxes, and respective coordinates from the OCR circuitry 116, the row bounding boxes and respective coordinates from the row detection circuitry 310, and the column bounding boxes and respective coordinates from the column detection circuitry 312.

At block 3104, example structuring circuitry (e.g., structuring circuitry 330) transforms the coordinates of the bounding boxes to reference coordinate of the receipt image 108. For example, the coordinates of the bounding boxes may need to be transformed because text bounding boxes were generated using the receipt image 108 while the row bounding boxes were generated using the cropped receipt region and the column bounding boxes were generated using the cropped products region. In some examples, the structuring circuitry 330 transforms the row bounding boxes based on the receipt region's location within the receipt image 108 and transforms the column bounding boxes based on the products region's location within the receipt image 108.

At block 3106, the structing circuitry 330 extends the row bounding boxes and the column bounding boxes to form a grid. For example, the structuring circuitry 330 can extend the row bounding boxes to an intersection with a products region's horizontal boundary(ies). Further, the structuring circuitry 330 can extend the column bounding boxes to an intersection with the products region's vertical boundary(ies). In some examples, the extensions can enable inclusion of words or characters near a borders that may have been missed by the row bounding boxes and/or the column bounding boxes.

At block 3108, example mapping circuitry (e.g., mapping circuitry 332) determines and forms the structure the receipt by mapping words detected by the OCR circuitry 116 to corresponding rows and columns on the grid. In some examples, the mapping circuitry 332 determines IoU calculations for the text bounding boxes and the row bounding boxes and/or column bounding boxes. For example, the mapping circuitry 332 can compare determine an IoU calculation for each text bounding boxes with each row bounding box to determine whether the IoU meets a threshold value (e.g., 0.5). Similarly, the mapping circuitry 332 can compare determine an IoU calculation for each text bounding boxes with each column bounding box to determine whether the IoU meets the threshold value. If an IoU calculation meets the threshold value, the text bounding box can be associated with the respective row bounding box and/or column bounding box.

At block 3110, example column identifying circuitry (e.g., column identifying circuitry 334) selects a column to be identified. For example, the column identifying circuitry 334 may select a column bounding box corresponding to a respective column to identify the column. At block 3112, the column identifying circuitry 334 implements a regex engine to determine whether the column can be identified by a regular expression (e.g., regex). For example, the regex can include item description (e.g., product description), price, product code, etc. In other words, the column identifying circuitry 334 determines whether the column can be identified by a regex based on text within the column. If the column contains text that is defined by one of the regex, the column identifying circuitry 334 determines that the column follows the regex and classifies the column based on the regex. If the column identifying circuitry 334 determines that the column can be identified by a regex (e.g., block 3112: YES), the column identifying circuitry 334 labels the column with the respective identifier (e.g., the regex) and control advances to block 3118. If the column identifying circuitry 334 determines that the column cannot be identified by a regex (e.g., block 3112: NO), the column identifying circuitry 334 labels the column with an "unknown" identifier and control advances to block 3118.

At block 3118, the column identifying circuitry 334 determines whether to select another column. For example, if each column bounding box has been identified by a regex or an "unknown" identifier, the column identifying circuitry 334 may determine not to select another column (e.g., block 3118: NO). If the answer to block 3118 is NO, control advances to block 3120. If a column bounding box has not yet been identified by a regex or an "unknown" identifier, the column identifying circuitry 334 may determine to select another column (e.g., block 3118: YES). If the answer to block 3118 is YES, control advances to block 3110 at which the column identifying circuitry 334 selects another column.

At block 3120, example purchase data identifying circuitry (e.g., purchase information extracting circuitry 336) selects a row for validation and data extraction. For example, the purchase information extracting circuitry 336 can select a row that includes text data and compare the text data to a corresponding regex and/or dictionary of stopwords. At block 3122, the purchase information extracting circuitry 336 validates the row based on the corresponding regex and stopwords. For example, the purchase information extracting circuitry 336 may compare the words in the row to the regex to determine whether the words in the row match the regex. Further, the purchase information extracting circuitry 336 can determine whether the row includes a stopword, such as total, promotion, and/or another word that does not correspond to a purchased item.

At block 3124, the purchase information extracting circuitry 336 removes words determined to not qualify the regex. For example, the purchase information extracting circuitry 336 may remove a price from an item description column and/or a letter in a price column. Further, the purchase information extracting circuitry 336 may remove the row if the row contains a stopword because the row is not needed for the decoding process.

At block 3126, the purchase information extracting circuitry 336 extracts purchase information from the row. For example, the purchase information extracting circuitry 336 can extract the purchase information that includes a product description, price, and quantity. In some examples, the price is in the product description column. Accordingly, the purchase information extracting circuitry 336 is constructed to extract the quantity from the product description.

At block 3128, the purchase information extracting circuitry 336 determines whether to select another row. For example, if each has been validated and extracted, the purchase information extracting circuitry 336 may determine not to select another row (e.g., block 3128: NO). If the answer to block 3128 is NO, control advances to block 3130. If a row has been validated or extracted, purchase information extracting circuitry 336 may determine to select another row (e.g., block 3128: YES). If the answer to block 3128 is YES, control advances to block 3120 at which the purchase information extracting circuitry 336 selects another row.

At block 3130, example promotion identifying circuitry (e.g., promotion identifying circuitry 328) identifies promotions and/or multi-buys in the receipt. For example, the promotion identifying circuitry 328 can identify various types of promotions including multibuy using a product description and respective price.

Figure 32:
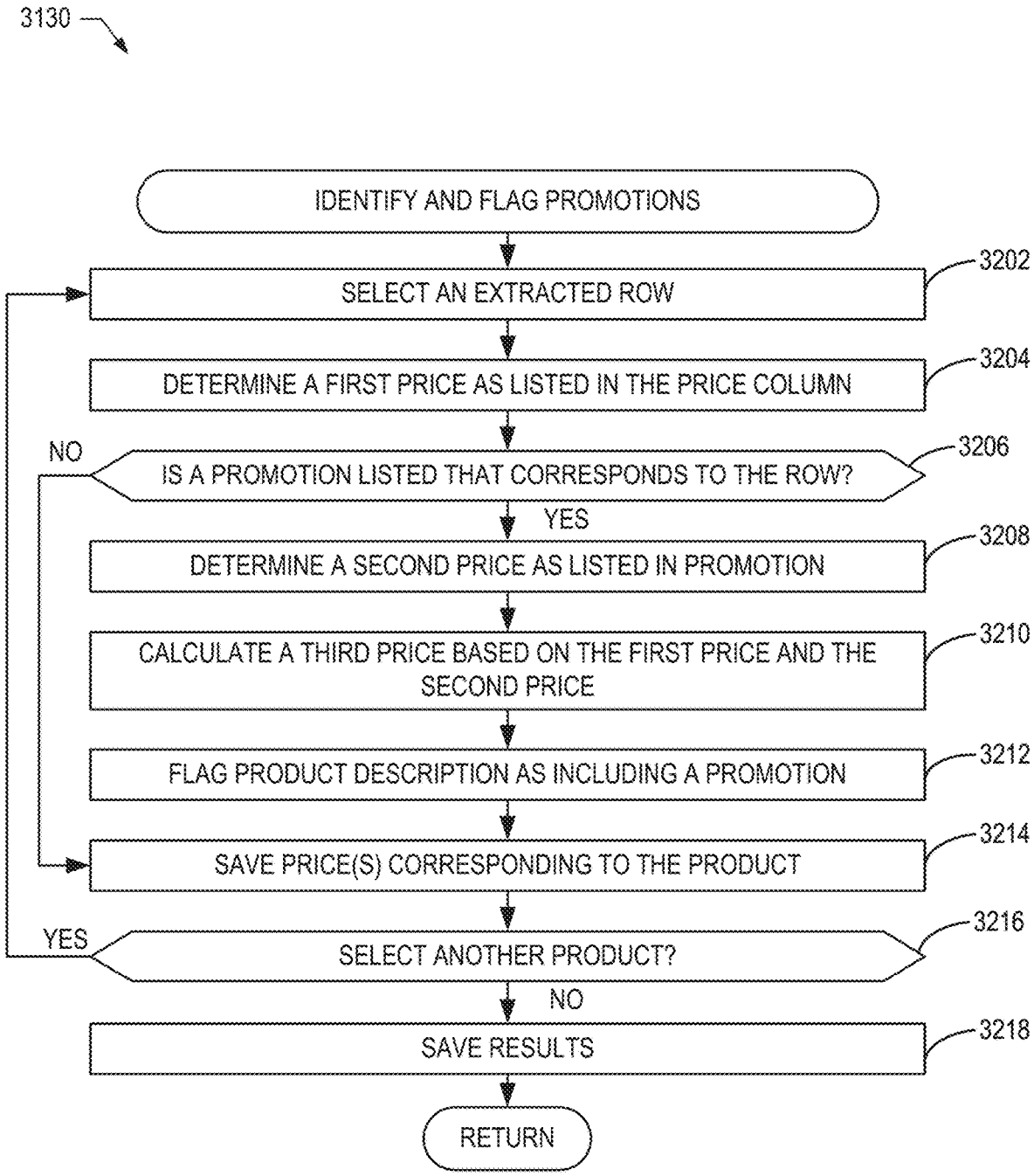

FIG. 32 is a flowchart representative of example machine readable instructions and/or example operations 3130 that may be executed and/or instantiated by processor circuitry to identify and flag promotions. The machine readable instructions and/or the operations 3130 of FIG. 32 begin at block 3202, at which the promotion identifying circuitry 328 selects an extracted row. For example, the extracted row can include a product description for a purchased product and a price. At block 3204, the promotion identifying circuitry 328, identifies a first price as listed in the price column. For example, the price may be an original price of the product or a discounted price of the product.

At block 3206, the promotion identifying circuitry 328 determines whether a promotion is listed that corresponds to the row. For example, the promotion can be a discount, a multi-buy, a coupon, etc. In some examples, the promotion identifying circuitry 328 can analyze text within the product description to identify a key word that indicates the promotion was applied to the product. For example, the product description can include a word such as buy-one-get-one (e.g., BOGO). In some examples, the promotion identifying circuitry 328 determines whether the promotion is listed in a discount section. For example, some receipts include a section of the receipt that lists the discounts. If the answer to block 3206 is NO, and a promotion is not listed that corresponds to the row, control advances to block 3214 at which the promotion identifying circuitry 328 saves the first price corresponding to the product. In some examples, the first price is the original price and the price paid and the discount amount is zero. If the answer to block 3206 is YES, a promotion is listed that corresponds to the row, control advances to block 3208

At block 3208, the promotion identifying circuitry 328 determines a second price as listed in the promotion. For example, the second price may be the price paid for the discount amount. At block 3210, the promotion identifying circuitry 328 calculate a third price based on the first price and the second price. For example, if the first price is the original price and the second price is the discount amount, the third price is the price paid for the product. If the first price is the price paid for the product and the second price is the discount amount, the third price is the original price of the product.

At block 3212, the promotion identifying circuitry 328 flags the product description as including a promotion. For example, the promotion identifying circuitry 328 can apply an indication, such as a code, to the row that indicates a promotion was applied to the product. At block 3212, the promotion identifying circuitry 328 saves the prices (e.g., the first price, second price, and third price) corresponding to the purchased product.

At block 3216, the promotion identifying circuitry 328 determines whether to select another row. For example, the promotion identifying circuitry 328 may be structured to extract a paid price after discounting, a discount amount, and an original price for each extracted purchased product. If the prices have been determines for each product, the promotion identifying circuitry 328 may determine not to select another row (e.g., block 3216: NO). If the answer to block 3216 is NO, control advances to block 3218. If a purchased product has not been analyzed to determine the three prices, the promotion identifying circuitry 328 may determine to select another row (e.g., block 3216: YES). If the answer to block 3216 is YES, control advances to block 3218 at which the promotion identifying circuitry 328 saves the results. For example, the promotion identifying circuitry 328 save the three prices for each purchased product with the purchase information extracted by the purchase information extracting circuitry 336.

Figure 33:
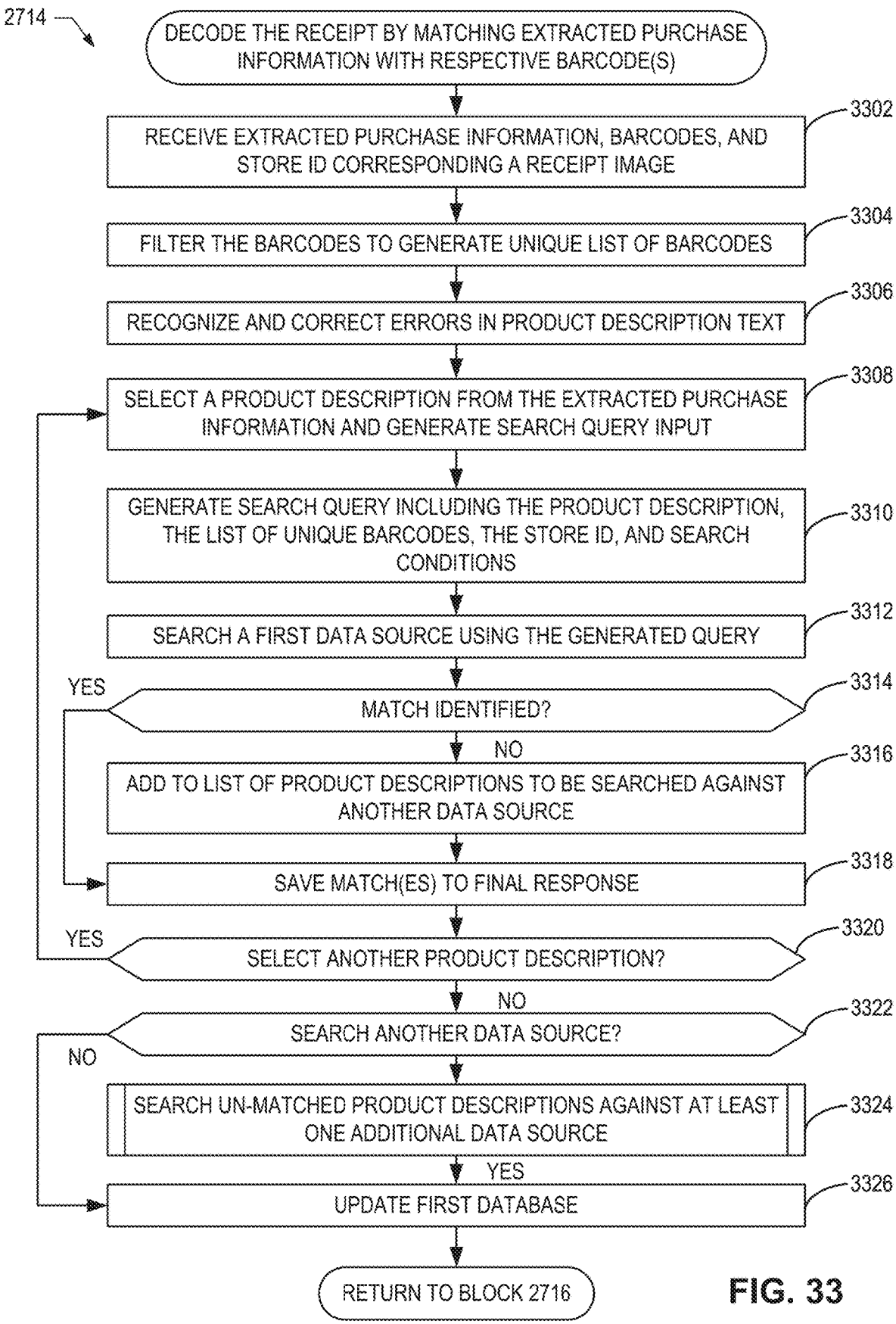

FIG. 33 is a flowchart representative of example machine readable instructions and/or example operations 2714 that may be executed and/or instantiated by processor circuitry to match extracted information with barcodes 110. The machine readable instructions and/or the operations 2714 of FIG. 33 begin at block 3302, at which the decoding circuitry 122 receives extracted purchase information, barcodes, and a store ID corresponding to a receipt image 108. For example, the decoding circuitry 122 can receive the extracted purchase information from the extraction circuitry 118 via example extraction interface circuitry (e.g., extraction information circuitry 1702). Further, the decoding circuitry 122 can receive the barcodes (e.g., barcodes 110) and store ID from the basket datastore 112 via example datastore interface circuitry (e.g., datastore interface circuitry 1704. In some examples, the decoding circuitry 122 retrieves the barcodes and store ID from the basket datastore 112 in response to receiving the extracted purchase information from the extraction circuitry 118.

At block 3304, example barcode filtering circuitry (e.g., barcode filtering circuitry 1708) filters the barcodes 110 to generate a unique list of barcodes. For example, the barcode filtering circuitry 1708 may remove duplicate barcodes uploaded by a panelist, barcodes corresponding to plastic bags, and/or other types of barcodes that may not be needed during the decoding process.

At block 3306, example text correcting circuitry (e.g., text correcting circuitry 1710) recognizes and corrects error in product description text. For example, the text correcting circuitry 1710 can search for typos such as mis-identified or un-identified character (e.g., special characters) using an example language dictionary (e.g., language dictionary 1712). In some examples, the text correcting circuitry 1710 may perform a text normalization on the text of the product descriptions.

At block 3308, example search manager circuitry (e.g., search manager circuitry 1714) selects a product description from the extracted purchase information and generates search query input. For example, the search query input includes the first product description, the list of unique barcodes, and the store ID. In some examples, the search manager circuitry 1714 removes matched barcodes to update the list of unique barcodes. In some examples, the search manager circuitry 1714 transmits the input to example dictionary searching circuitry (e.g., dictionary searching circuitry 1718).

At block 3310, the dictionary searching circuitry 1718 generates a search query that includes the product description, the list of unique barcodes, the store ID, and search conditions. For example, the search conditions can include a condition that a response(s) should match at least one barcode, a condition that the response(s) needs to match the provided store ID, a condition that the response(s) should match the item description as extracted by the extraction circuitry 118, and/or another searching condition not disclosed herein.

At block 3312, the dictionary searching circuitry 1718 searches a first data source using the generated search query. For example, the dictionary searching circuitry 1718 can search an example internal dictionary (e.g., internal dictionary 124) via example internal dictionary interface circuitry (e.g., internal dictionary interface circuitry 1720). At block 3312, the dictionary searching circuitry 3312 determines whether a match is identified. For example, if a dictionary response includes a recognized matched between the product description and a barcode from the list of unique barcodes, the dictionary searching circuitry 3312 determines that the matched has been identified (e.g., the answer to block 3312 is YES). If the answer to block 3312 is YES, control advances to block 3318 at which the search manager circuitry 1714 saves the match to a final response. If the answer to block 3312 is NO, and a match was no identified, the search manager circuitry 1714 adds the product description to a list of product descriptions to be searched against another data source (e.g., block 3316).

At block 3320, the search manager circuitry 1714 determines whether to select another product description. For example, the search manager circuitry 1714 may determines whether any product descriptions extracted by the extraction circuitry 118 have yet to be searched against the first data source. If the answer to block 3320 is YES, control advances back to block 3308 at which the search manager circuitry 1714 selects a product description from the extracted purchase information and generates search query input. If the answer to block 3320 is NO, control advances to block 3322.

At block 3322, the search manager circuitry 1714 determines whether to search another data source. For example, the search manager circuitry 1714 may decide to search another data source if there are product descriptions in the list of product descriptions to be searched against another data source. In some examples, the search manager circuitry 1714 decides not to search another data source if each product description extracted by the extraction circuitry 118 has been matched. If the answer to block 3322 is YES, and the search manager circuitry 1714 decides to search another data source, control advances to block 3324. If the answer to block 3322 is NO, and the search manager circuitry 1714 decides not to search another data source, control advances to block 3326.

At block 3324, the matching circuitry 1706 searches un-matched product descriptions against least one additional data source. For example, the matching circuitry 1706 may search an example products datastore (e.g., products datastore 126) and/or an example previous jobs database (e.g., previous jobs database 130).

At block 3326, example updating circuitry (e.g., updating circuitry 1730) updates the first data source. For example, the updating circuitry 1730 can update the internal dictionary 124 with matched product descriptions and barcodes.

Figure 34:
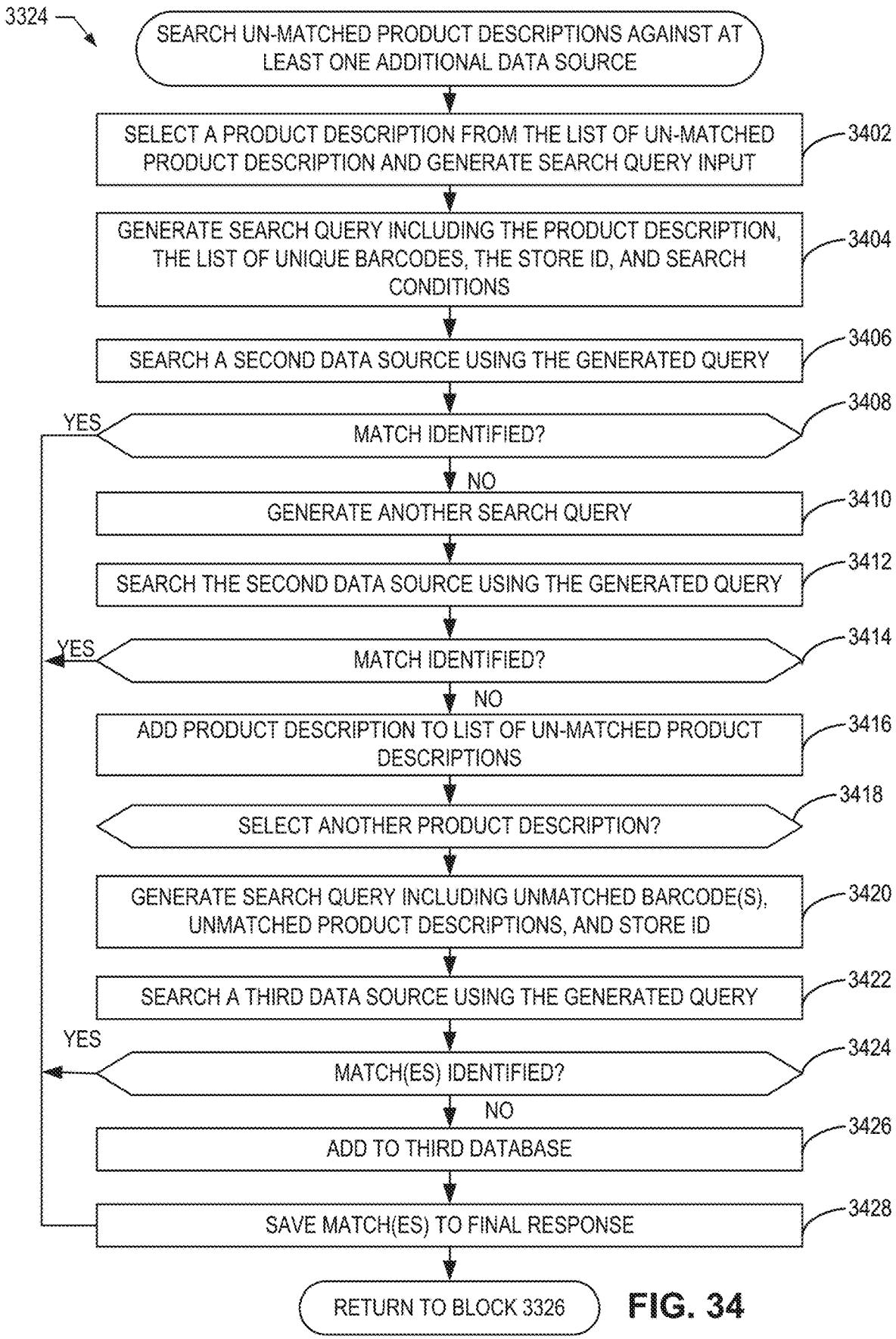

FIG. 34 is a flowchart representative of example machine readable instructions and/or example operations 3318 that may be executed and/or instantiated by processor circuitry to search another database. The machine readable instructions and/or the operations 3318 of FIG. 34 begin at block 3402, at which the search manager circuitry 1714 selects a product description from the list of un-matched product descriptions and generates search query input. For example, the searching query input can include the selected product description, an updated list of unique barcodes (e.g., that does not include previously matched barcodes), and the store ID.

At block 3404, example products datastore search circuitry (e.g., products datastore searching circuitry 1722) generates a first search query that includes the product description, the list of unique barcodes, the store ID, and search conditions. For example, the search conditions can include a variety search conditions that aim to return a candidate result(s) and corresponding similarity score(s) for matches between the product description and a barcode. In some examples, the search query also includes a group store code and/or a global store code to limits a search of the products datastore 126 to products belonging to the store ID.

At block 3406, the products datastore searching circuitry 1722 searches a second data source using the generated search query. For example, the products datastore searching circuitry 1722 can search the products datastore 126 via example products datastore interface circuitry (e.g., products datastore interface circuitry 1724). In some examples, the products datastore searching circuitry 1722 searches against the products datastore 126 by lookup up the barcodes in the list of unique barcodes and comparing products description corresponding to the barcodes as listed in the products datastore 126 and comparing those products descriptions to the product description in the search query. The result can include candidates that are similar and corresponding similarity scores.

At block 3408, the products datastore searching circuitry 1722 determines whether a match is identified. For example, if a response includes a candidate result with a corresponding similarity score that reaches a threshold value, the products datastore searching circuitry 1722 determines that the matched has been identified (e.g., the answer to block 3312 is YES). If the query returns more than one candidate result with corresponding similarity scores that reaches the threshold value, the products datastore searching circuitry 1722 selects the barcode with highest (e.g., largest) similarity score. If the answer to block 3408 is YES, control advances to block 3428 at which the search manager circuitry 1714 saves the match to the final response. If the answer to block 3408 is NO, and a match was not identified, control advances to block 3410.

At block 3410, the product datastore searching circuitry 1722 generates another search query. For example, the product datastore searching circuitry 1722 can generate the second search query by removing the store ID from the first search query. At block 3412, the product datastore searching circuitry 1722 searches the second search query against the products datastore 126 via the products datastore interface circuitry 1724. For example, the products datastore searching circuitry 1722 searches the query against the products datastore 126 to identify barcodes with similar products descriptions to the product description in the query.

At block 3412, the product datastore searching circuitry 1722 determines whether a match is identified. For example, if a response includes a candidate result with a corresponding similarity score that reaches a threshold value, the products datastore searching circuitry 1722 determines that the matched has been identified (e.g., the answer to block 3410 is YES). If the answer to block 3410 is YES, control advances to block 3428 at which the search manager circuitry 1714 saves the match to the final response. If the answer to block 3410 is NO, and a match was not identified, control advances to block 3416. At block 3416, the search manager circuitry 1714 add the product description to a list of un-matched product descriptions.

At block 3418, the search manager circuitry 1714 determines whether to select another product description. For example, the search manager circuitry 1714 may determines whether any product descriptions in the list of un-matched have yet to be searched against the second data source. If the answer to block 3418 is YES, control advances back to block 3402 at which the search manager circuitry 1714 selects a product description from the list of un-matched product descriptions and generates search query input. If the answer to block 3418 is NO, control advances to block 3420.

At block 3420, example previous jobs searching circuitry (e.g., previous jobs searching circuitry 1726) generates a search query that includes the list of un-product descriptions (e.g., generated after the products datastore 126 searches), the unmatched barcodes, the store ID, and search conditions. For example, the search condition can be to obtain an intersection of the product descriptions and barcodes between the current basket and past baskets. At block 3422, the previous jobs searching circuitry 1726 searches a third data source using the generated search query. For example, the previous jobs searching circuitry 1726 can search an example previous jobs database (e.g., previous jobs database 130).

At block 3424, the previous jobs searching circuitry 1726 determines whether any match(es) is identified. For example, the previous jobs searching circuitry 1726 may identify a match if one barcode and one receipt description are minimum matched (e.g., min-matched). If the answer to block 3424 is YES, control advances to block 3428 at which the search manager circuitry 1714 saves the match to the final response. If the answer to block 3424 is NO, control advances to block 3436. At block 3426, the previous jobs searching circuitry 1726 uploads the un-matched products descriptions, barcodes, and store ID to the previous jobs database 130. For example, the previous jobs searching circuitry 1726 can add an entry into the previous jobs database 130 that includes the un-matched purchase information and/or other information or data related to the receipt image 108.

Figure 35:
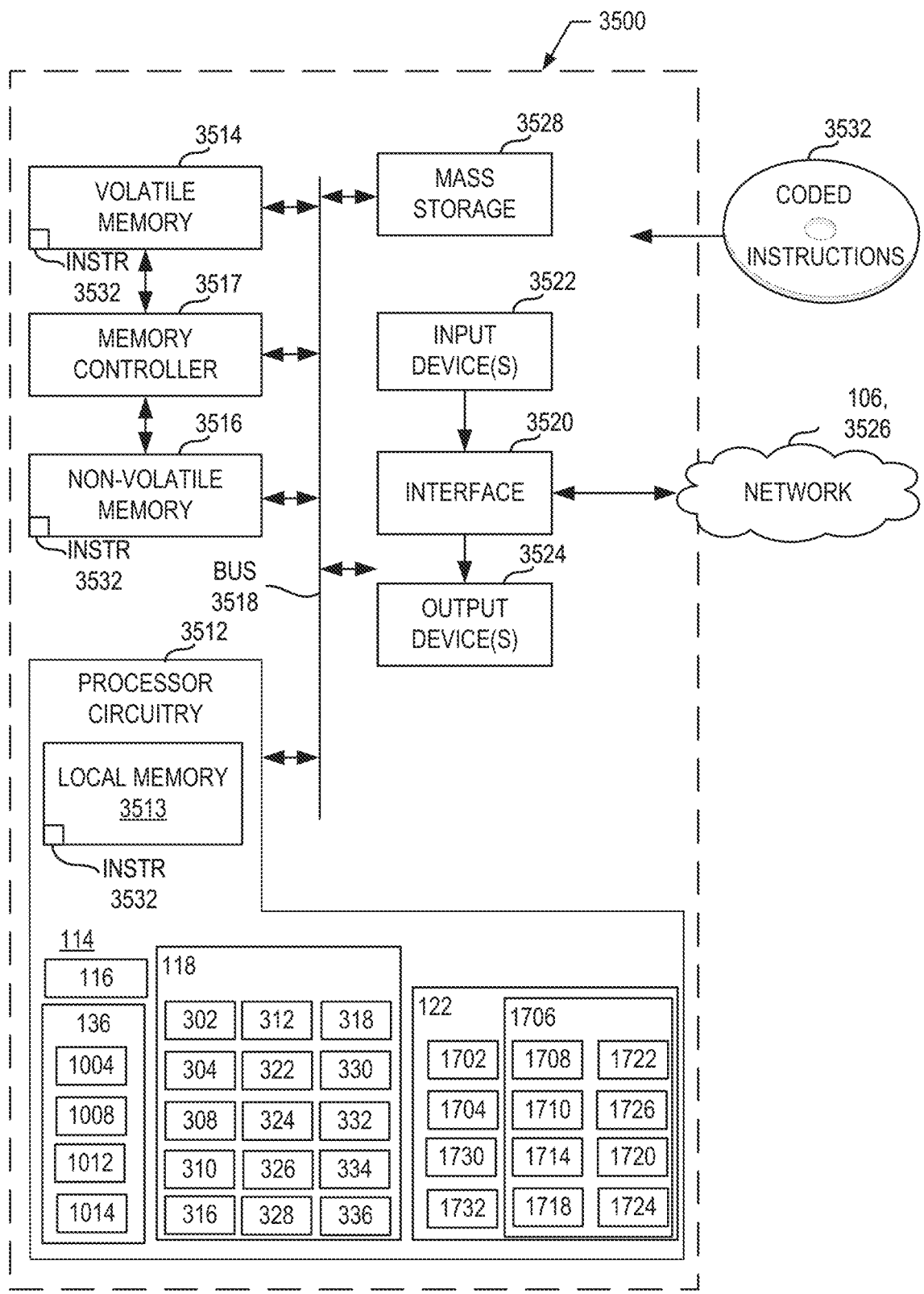
FIG. 35 is a block diagram of an example processing platform including processor circuitry structured to execute the example machine readable instructions and/or the example operations of FIG. 3 to implement the document decode circuitry of FIGS. 1, 2, 3, 9, 10, 17, 18, 24, and/or 25.

FIG. 35 is a block diagram of an example processor platform 3500 structured to execute and/or instantiate the machine readable instructions and/or the operations of FIGS. 26-34 to implement the document decode circuitry 114 of FIG. 1. The processor platform 3500 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a gaming console, or any other type of computing device.

The processor platform 3500 of the illustrated example includes processor circuitry 3512. The processor circuitry 3512 of the illustrated example is hardware. For example, the processor circuitry 3512 can be implemented by one or more integrated circuits, logic circuits, FPGAs, microprocessors, CPUs, GPUs, DSPs, and/or microcontrollers from any desired family or manufacturer. The processor circuitry 3512 may be implemented by one or more semiconductor based (e.g., silicon based) devices. In this example, the processor circuitry 3512 implements example OCR circuitry 116, example extraction circuitry 118, example datastore interface circuitry 302, example regions detection circuitry 304, example image cropping circuitry 308, example row detection circuitry 310, example bounding box generating circuitry 316, example line merging circuitry 318, example column detection circuitry 312, example bounding box generating circuitry 322, example column merging circuitry 324, example data extracting circuitry 326, example promotion identifying circuitry 328, example structuring circuitry 330, example mapping circuitry 332, example column identifying circuitry 334, example purchase information extracting circuitry 336, example decoding circuitry 122, example extraction interface circuitry 1702, example datastore interface circuitry 1704, example matching circuitry 1706, example barcode filtering circuitry 1708, example text correcting circuitry 1710, example search manager circuitry 1714, example dictionary searching circuitry 1718, example internal dictionary interface circuitry 1720, example products datastore searching circuitry 1722, example products datastore interface circuitry 1724, example previous jobs searching circuitry 1726, example updating circuitry 1730, example response generating circuitry 1732, example report generating circuitry 134, example machine learning circuitry 136, and/or, more generally, example document decode circuitry 114.

The processor circuitry 3512 of the illustrated example includes a local memory 3513 (e.g., a cache, registers, etc.). The processor circuitry 3512 of the illustrated example is in communication with a main memory including a volatile memory 3514 and a non-volatile memory 3516 by a bus 3518. The volatile memory 3514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 3516 may be implemented by flash memory and/or any other desired type of memory device. Access to the main memory 3514, 3516 of the illustrated example is controlled by a memory controller 3517.

The processor platform 3500 of the illustrated example also includes interface circuitry 3520. The interface circuitry 3520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 3522 are connected to the interface circuitry 3520. The input device(s) 3522 permit(s) a user to enter data and/or commands into the processor circuitry 3512. The input device(s) 3522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 3524 are also connected to the interface circuitry 3520 of the illustrated example. The output device(s) 3524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 3520 of the illustrated example, thus, typically includes a graphics driver card, a graphics driver chip, and/or graphics processor circuitry such as a GPU.

The interface circuitry 3520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 3526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 3500 of the illustrated example also includes one or more mass storage devices 3528 to store software and/or data. Examples of such mass storage devices 3528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 3532, which may be implemented by the machine readable instructions of FIGS. 26-34, may be stored in the mass storage device 3528, in the volatile memory 3514, in the non-volatile memory 3516, and/or on a removable non-transitory computer readable storage medium such as a CD or DVD.

Figure 36:
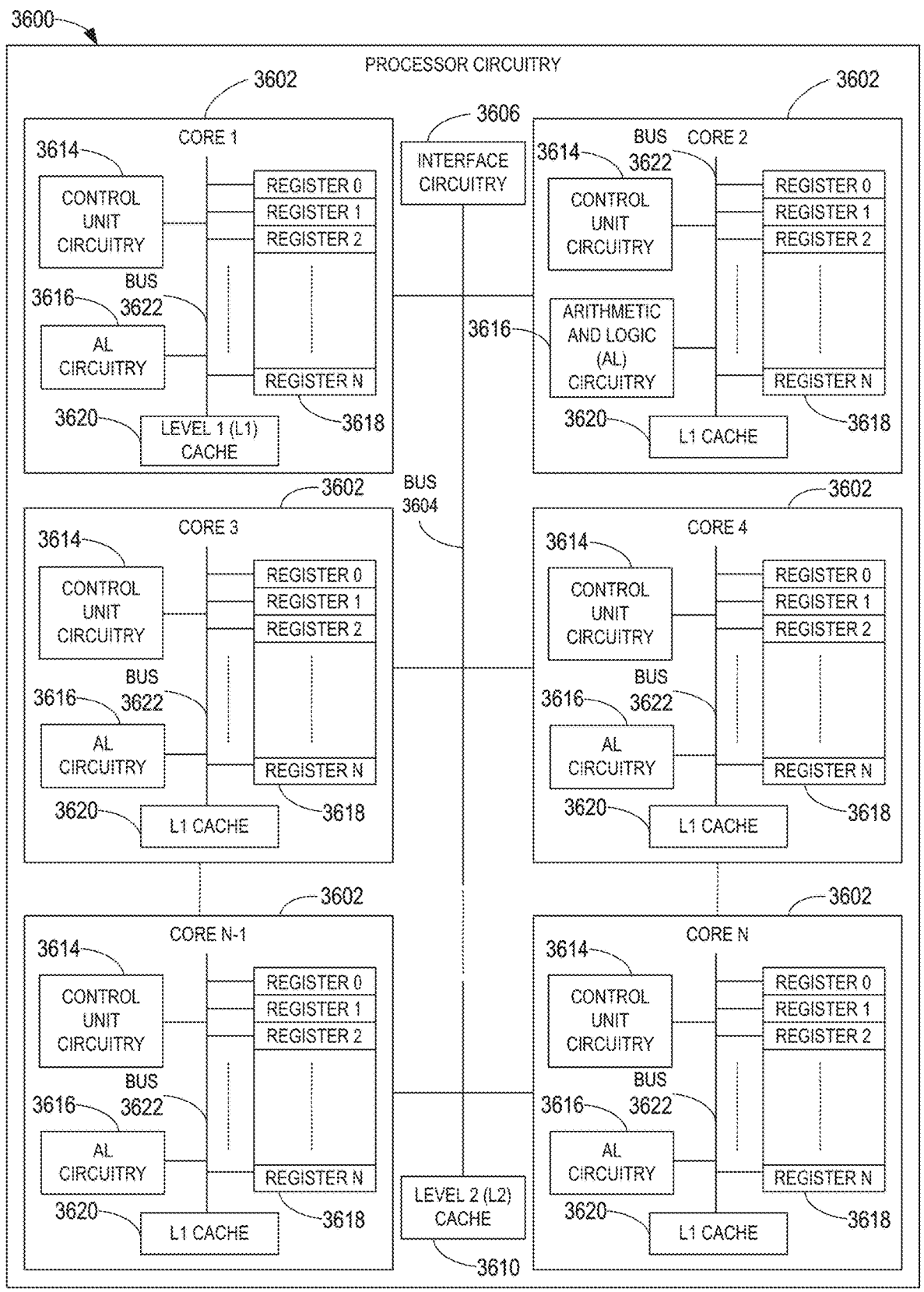
FIG. 36 is a block diagram of an example implementation of the processor circuitry of FIG. 35.

FIG. 36 is a block diagram of an example implementation of the processor circuitry 3512 of FIG. 35. In this example, the processor circuitry 3512 of FIG. 35 is implemented by a general purpose microprocessor 3600. The general purpose microprocessor circuitry 3600 executes some or all of the machine readable instructions of the flowchart of FIGS. 26-34 to effectively instantiate the document decode circuitry of FIG. 1 as logic circuits to perform the operations corresponding to those machine readable instructions. In some such examples, the circuitry of FIG. 1 is instantiated by the hardware circuits of the microprocessor 3600 in combination with the instructions. For example, the microprocessor 3600 may implement multi-core hardware circuitry such as a CPU, a DSP, a GPU, an XPU, etc. Although it may include any number of example cores 3602 (e.g., 1 core), the microprocessor 3600 of this example is a multi-core semiconductor device including N cores. The cores 3602 of the microprocessor 3600 may operate independently or may cooperate to execute machine readable instructions. For example, machine code corresponding to a firmware program, an embedded software program, or a software program may be executed by one of the cores 3602 or may be executed by multiple ones of the cores 3602 at the same or different times. In some examples, the machine code corresponding to the firmware program, the embedded software program, or the software program is split into threads and executed in parallel by two or more of the cores 3602. The software program may correspond to a portion or all of the machine readable instructions and/or operations represented by the flowcharts of FIGS. 26-34.

The cores 3602 may communicate by a first example bus 3604. In some examples, the first bus 3604 may implement a communication bus to effectuate communication associated with one(s) of the cores 3602. For example, the first bus 3604 may implement at least one of an Inter-Integrated Circuit (I2C) bus, a Serial Peripheral Interface (SPI) bus, a PCI bus, or a PCIe bus. Additionally or alternatively, the first bus 3604 may implement any other type of computing or electrical bus. The cores 3602 may obtain data, instructions, and/or signals from one or more external devices by example interface circuitry 3606. The cores 3602 may output data, instructions, and/or signals to the one or more external devices by the interface circuitry 3606. Although the cores 3602 of this example include example local memory 3620 (e.g., Level 1 (L1) cache that may be split into an L1 data cache and an L1 instruction cache), the microprocessor 3600 also includes example shared memory 3610 that may be shared by the cores (e.g., Level 2 (L2_cache)) for high-speed access to data and/or instructions. Data and/or instructions may be transferred (e.g., shared) by writing to and/or reading from the shared memory 3610. The local memory 3620 of each of the cores 3602 and the shared memory 3610 may be part of a hierarchy of storage devices including multiple levels of cache memory and the main memory (e.g., the main memory 3514, 3516 of FIG. 35).

Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 3602 may be referred to as a CPU, DSP, GPU, etc., or any other type of hardware circuitry. Each core 3602 includes control unit circuitry 3614, arithmetic and logic (AL) circuitry (sometimes referred to as an ALU) 3616, a plurality of registers 3618, the L1 cache 3620, and a second example bus 3622. Other structures may be present. For example, each core 3602 may include vector unit circuitry, single instruction multiple data (SIMD) unit circuitry, load/store unit (LSU) circuitry, branch/jump unit circuitry, floating-point unit (FPU) circuitry, etc. The control unit circuitry 3614 includes semiconductor-based circuits structured to control (e.g., coordinate) data movement within the corresponding core 3602. The AL circuitry 3616 includes semiconductor-based circuits structured to perform one or more mathematic and/or logic operations on the data within the corresponding core 3602. The AL circuitry 3616 of some examples performs integer based operations. In other examples, the AL circuitry 3616 also performs floating point operations. In yet other examples, the AL circuitry 3616 may include first AL circuitry that performs integer based operations and second AL circuitry that performs floating point operations. In some examples, the AL circuitry 3616 may be referred to as an Arithmetic Logic Unit (ALU). The registers 3618 are semiconductor-based structures to store data and/or instructions such as results of one or more of the operations performed by the AL circuitry 3616 of the corresponding core 3602. For example, the registers 3618 may include vector register(s), SIMD register(s), general purpose register(s), flag register(s), segment register(s), machine specific register(s), instruction pointer register(s), control register(s), debug register(s), memory management register(s), machine check register(s), etc. The registers 3618 may be arranged in a bank as shown in FIG. 36. Alternatively, the registers 3618 may be organized in any other arrangement, format, or structure including distributed throughout the core 3602 to shorten access time. The second bus 3622 may implement at least one of an I2C bus, a SPI bus, a PCI bus, or a PCIe bus Each core 3602 and/or, more generally, the microprocessor 3600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 3600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 37:
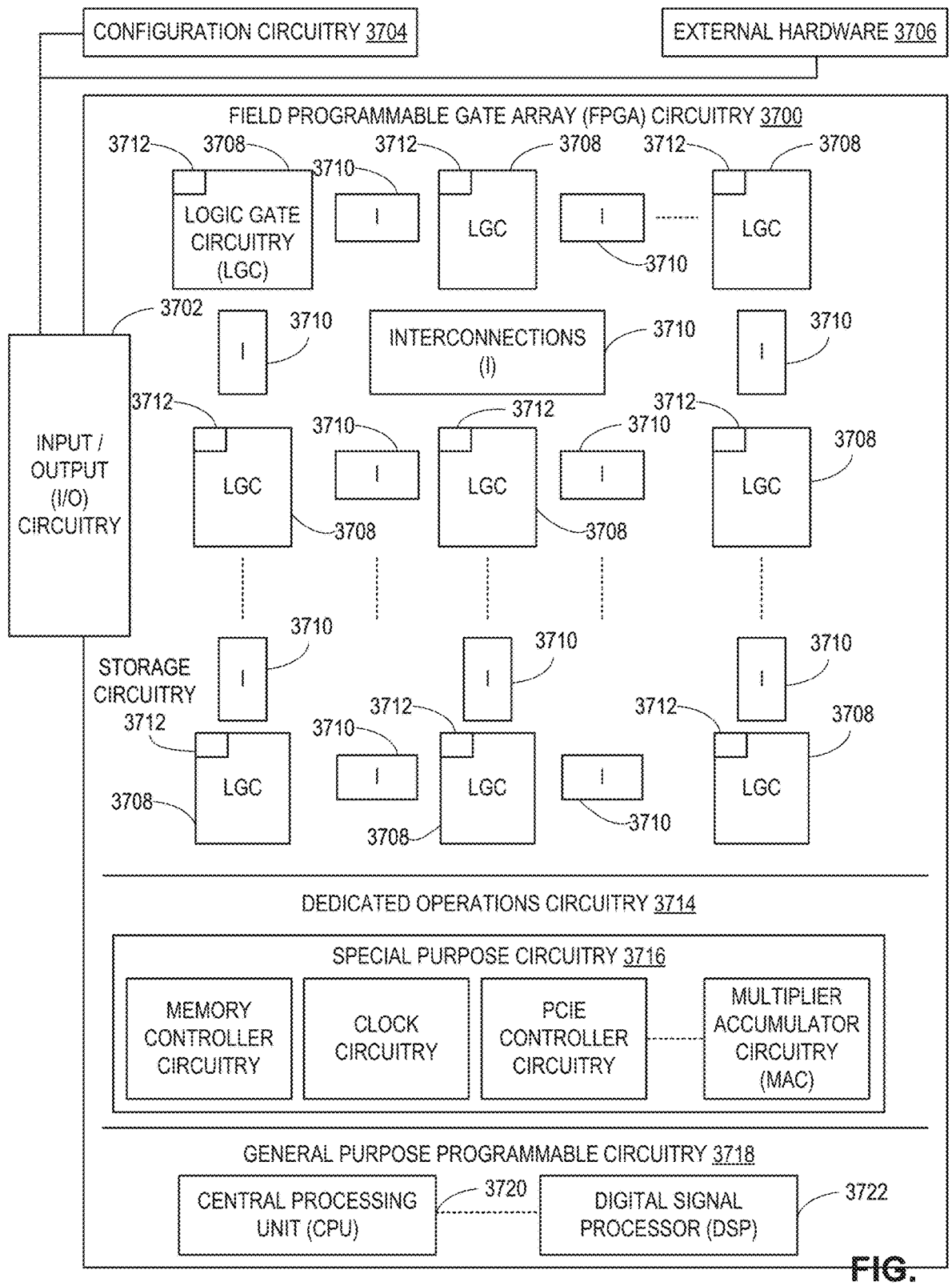
FIG. 37 is a block diagram of another example implementation of the processor circuitry of FIG. 35.

FIG. 37 is a block diagram of another example implementation of the processor circuitry 3512 of FIG. 35. In this example, the processor circuitry 3512 is implemented by FPGA circuitry 3700. The FPGA circuitry 3700 can be used, for example, to perform operations that could otherwise be performed by the example microprocessor 3600 of FIG. 36 executing corresponding machine readable instructions. However, once configured, the FPGA circuitry 3700 instantiates the machine readable instructions in hardware and, thus, can often execute the operations faster than they could be performed by a general purpose microprocessor executing the corresponding software.

More specifically, in contrast to the microprocessor 3600 of FIG. 36 described above (which is a general purpose device that may be programmed to execute some or all of the machine readable instructions represented by the flowcharts of FIGS. 26-34 but whose interconnections and logic circuitry are fixed once fabricated), the FPGA circuitry 3700 of the example of FIG. 37 includes interconnections and logic circuitry that may be configured and/or interconnected in different ways after fabrication to instantiate, for example, some or all of the machine readable instructions represented by the flowcharts of FIGS. 26-34. In particular, the FPGA 3700 may be thought of as an array of logic gates, interconnections, and switches. The switches can be programmed to change how the logic gates are interconnected by the interconnections, effectively forming one or more dedicated logic circuits (unless and until the FPGA circuitry 3700 is reprogrammed). The configured logic circuits enable the logic gates to cooperate in different ways to perform different operations on data received by input circuitry. Those operations may correspond to some or all of the software represented by the flowcharts of FIGS. 26-34. As such, the FPGA circuitry 3700 may be structured to effectively instantiate some or all of the machine readable instructions of the flowcharts of FIGS. 26-34 as dedicated logic circuits to perform the operations corresponding to those software instructions in a dedicated manner analogous to an ASIC. Therefore, the FPGA circuitry 3700 may perform the operations corresponding to the some or all of the machine readable instructions of FIGS. 26-34 faster than the general purpose microprocessor can execute the same.

In the example of FIG. 37, the FPGA circuitry 3700 is structured to be programmed (and/or reprogrammed one or more times) by an end user by a hardware description language (HDL) such as Verilog. The FPGA circuitry 3700 of FIG. 37, includes example input/output (I/O) circuitry 3702 to obtain and/or output data to/from example configuration circuitry 3704 and/or external hardware (e.g., external hardware circuitry) 3706. For example, the configuration circuitry 3704 may implement interface circuitry that may obtain machine readable instructions to configure the FPGA circuitry 3700, or portion(s) thereof. In some such examples, the configuration circuitry 3704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 3706 may implement the microprocessor 3600 of FIG. 36. The FPGA circuitry 3700 also includes an array of example logic gate circuitry 3708, a plurality of example configurable interconnections 3710, and example storage circuitry 3712. The logic gate circuitry 3708 and interconnections 3710 are configurable to instantiate one or more operations that may correspond to at least some of the machine readable instructions of FIGS. 26-34 and/or other desired operations. The logic gate circuitry 3708 shown in FIG. 37 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 3708 to enable configuration of the electrical structures and/or the logic gates to form circuits to perform desired operations. The logic gate circuitry 3708 may include other electrical structures such as look-up tables (LUTs), registers (e.g., flip-flops or latches), multiplexers, etc.

The interconnections 3710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 3708 to program desired logic circuits.

The storage circuitry 3712 of the illustrated example is structured to store result(s) of the one or more of the operations performed by corresponding logic gates. The storage circuitry 3712 may be implemented by registers or the like. In the illustrated example, the storage circuitry 3712 is distributed amongst the logic gate circuitry 3708 to facilitate access and increase execution speed.

The example FPGA circuitry 3700 of FIG. 37 also includes example Dedicated Operations Circuitry 3714. In this example, the Dedicated Operations Circuitry 3714 includes special purpose circuitry 3716 that may be invoked to implement commonly used functions to avoid the need to program those functions in the field. Examples of such special purpose circuitry 3716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 3700 may also include example general purpose programmable circuitry 3718 such as an example CPU 3720 and/or an example DSP 3722. Other general purpose programmable circuitry 3718 may additionally or alternatively be present such as a GPU, an XPU, etc., that can be programmed to perform other operations.

Although FIGS. 36 and 37 illustrate two example implementations of the processor circuitry 3512 of FIG. 35, many other approaches are contemplated. For example, as mentioned above, modern FPGA circuitry may include an on-board CPU, such as one or more of the example CPU 3720 of FIG. 37. Therefore, the processor circuitry 3512 of FIG. 35 may additionally be implemented by combining the example microprocessor 3600 of FIG. 36 and the example FPGA circuitry 3700 of FIG. 37. In some such hybrid examples, a first portion of the machine readable instructions represented by the flowcharts of FIGS. 26-34 may be executed by one or more of the cores 3602 of FIG. 36, a second portion of the machine readable instructions represented by the flowcharts of FIGS. 26-34 may be executed by the FPGA circuitry 3700 of FIG. 37, and/or a third portion of the machine readable instructions represented by the flowcharts of FIGS. 26-34 may be executed by an ASIC. It should be understood that some or all of the circuitry of FIG. 1 may, thus, be instantiated at the same or different times. Some or all of the circuitry may be instantiated, for example, in one or more threads executing concurrently and/or in series. Moreover, in some examples, some or all of the circuitry of FIG. 1 may be implemented within one or more virtual machines and/or containers executing on the microprocessor.

In some examples, the processor circuitry 3512 of FIG. 35 may be in one or more packages. For example, the processor circuitry 3600 of FIG. 36 and/or the FPGA circuitry 3700 of FIG. 37 may be in one or more packages. In some examples, an XPU may be implemented by the processor circuitry 3512 of FIG. 35, which may be in one or more packages. For example, the XPU may include a CPU in one package, a DSP in another package, a GPU in yet another package, and an FPGA in still yet another package.

Figure 38:
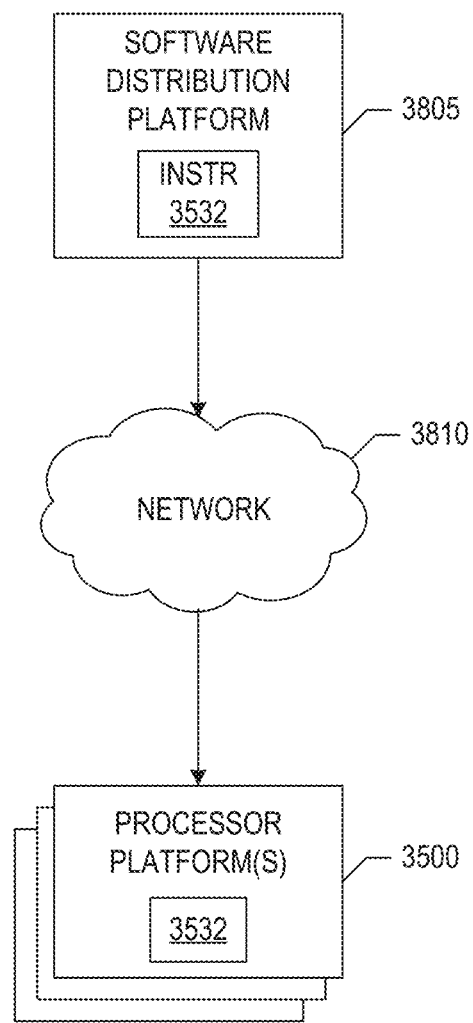
FIG. 38 is a block diagram of an example software distribution platform (e.g., one or more servers) to distribute software (e.g., software corresponding to the example machine readable instructions of FIGS. 26-34) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 3805 to distribute software such as the example machine readable instructions 3532 of FIG. 35 to hardware devices owned and/or operated by third parties is illustrated in FIG. 38. The example software distribution platform 3805 may be implemented by any computer server, data facility, cloud service, etc., capable of storing and transmitting software to other computing devices. The third parties may be customers of the entity owning and/or operating the software distribution platform 3805. For example, the entity that owns and/or operates the software distribution platform 3805 may be a developer, a seller, and/or a licensor of software such as the example machine readable instructions 3532 of FIG. 35. The third parties may be consumers, users, retailers, OEMs, etc., who purchase and/or license the software for use and/or re-sale and/or sub-licensing. In the illustrated example, the software distribution platform 3805 includes one or more servers and one or more storage devices. The storage devices store the machine readable instructions 3532, which may correspond to the example machine readable instructions 2600 and/or 2700 of FIGS. 26-34, as described above. The one or more servers of the example software distribution platform 3805 are in communication with a network 3810, which may correspond to any one or more of the Internet and/or any of the example networks 106 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 3532 from the software distribution platform 3805. For example, the software, which may correspond to the example machine readable instructions 2600 and/or 2700 of FIGS. 26-34, may be downloaded to the example processor platform 3500, which is to execute the machine readable instructions 3532 to implement the document decode circuitry 114. In some example, one or more servers of the software distribution platform 3805 periodically offer, transmit, and/or force updates to the software (e.g., the example machine readable instructions 3532 of FIG. 35) to ensure improvements, patches, updates, etc., are distributed and applied to the software at the end user devices.

From the foregoing, it will be appreciated that example systems, methods, apparatus, and articles of manufacture have been disclosed that decode purchase data using an image of a receipt and a plurality of barcodes uploaded by a cooperating consumer. Disclosed systems, methods, apparatus, and articles of manufacture improve the efficiency of using a computing device by extracting and decoding (e.g., automatically) purchase data using images of receipts. In some examples, the automated decoding process can eliminate or otherwise reduce erroneous human behaviors, collect more information e.g., more details of baskets of purchased goods and/or more baskets), detect a structural layout of a receipt in a manner that is independent of OCR output to reduce deficiencies in OCR techniques, speed up the decoding process by focusing on data that needs to be processed, reduce instances of falsely identifying other non-product related text in the receipt, etc. Disclosed systems, methods, apparatus, and articles of manufacture are accordingly directed to one or more improvement(s) in the operation of a machine such as a computer or other electronic and/or mechanical device.

Example methods, systems, and apparatus to extract and decode information from a receipt image have been disclosed herein. The following paragraphs provide various examples and example combinations of the examples disclosed herein.

Example 1 includes an apparatus comprising memory, interface circuitry, and processor circuitry to execute machine readable instructions to at least crop an image of a receipt based on detected regions of interest, apply a first mask to a first cropped image of the receipt to generate first bounding boxes, the first bounding boxes corresponding to rows of the receipt, apply a second mask to a second cropped image of the receipt to generate second bounding boxes, the second bounding boxes corresponding to columns of the receipt, generate a structure of the receipt by mapping words detected by an optical character recognition (OCR) engine to corresponding first bounding boxes and second bounding boxes based on a mapping criterion, classify the second bounding boxes corresponding to the columns by identifying an expression of interest in ones of the second bounding boxes, and generate purchase information by detecting and extracting text of interest from the structured receipt based on the classifications, wherein the purchase information includes purchased products listed in the receipt.

Example 2 includes the apparatus of example 1, wherein the regions of interest include (1) a receipt region corresponding to the receipt, and (2) a purchase region corresponding to an area of the receipt that includes information about the purchased products in the receipt.

Example 3 includes the apparatus of any of examples 1-2, wherein the first cropped image is the receipt region and the second cropped image is the purchase region.

Example 4 includes the apparatus of any of examples 1-3, wherein the first mask identifies ones of a plurality of pixels of the first cropped image as belonging to a first class or a second class.

Example 5 includes the apparatus of any of examples 1-4, wherein the first class is a text line and the second class is background.

Example 6 includes the apparatus of any of examples 1-5, wherein the second mask identifies ones of a plurality of pixels of the second cropped image as belonging to a first class or a second class.

Example 7 includes the apparatus of any of examples 1-6, wherein the first class is a column and the second class is another class.

Example 8 includes the apparatus of any of examples 1-7, wherein the processor circuitry is to execute the machine readable instructions to merge a first one of the first bounding boxes and a second one of the first bounding boxes based on a row connection criterion, the first one and the second one of the first bounding boxes to satisfy a length criterion.

Example 9 includes the apparatus of any of examples 1-10, wherein the processor circuitry is to execute the machine readable instructions to merge a first one of the second bounding boxes and a second one of the second bound boxes based on a column connection criterion.

Example 10 includes the apparatus of any of examples 1-9, wherein the expression of interest corresponds to a targeted fact.

Example 11 includes the apparatus of any of examples 1-10, wherein the targeted fact includes at least one of a product description, a quantity, or a price.

Example 12 includes the apparatus of any of examples 1-11, wherein the purchase information includes purchase details and promotion information, and wherein the processor circuitry is to execute the machine readable instructions to remove words from the first bounding boxes that do not correspond to the classification of respective second bounding boxes prior to generating the purchase details.

Example 13 includes the apparatus of any of examples 1-12, wherein the purchase details include, for ones of the purchased products in the receipt, a product description, a price, and a quantity.

Example 14 includes the apparatus of any of examples 1-13, wherein the processor circuitry executes the machine readable instructions to transmit the purchase details to decoding circuitry.

Example 15 includes the apparatus of any of examples 1-14, wherein to generate the promotion information, the processor circuitry is to execute the machine readable instructions to determine whether a product is associated with a promotion, in response to determining the product is associated with the promotion: identify a first price associated with the product, the first price corresponding to a price column, identify a second price associated with the product, the second price corresponding to the promotion, and calculate a third price based on the first price and the second price.

Example 16 includes the apparatus of any of examples 1-15, wherein the first price is an original price of the product, the second price is a discount amount, and the third price is the price paid for the product.

Example 17 includes at least one non-transitory computer readable storage medium comprising instructions that, when executed, cause processor circuitry to at least crop an image of a receipt based on detected regions of interest, apply a first mask to a first cropped image of the receipt to generate first bounding boxes, the first bounding boxes corresponding to rows of the receipt, apply a second mask to a second cropped image of the receipt to generate second bounding boxes, the second bounding boxes corresponding to columns of the receipt, form a structure of the receipt by mapping words detected by an optical character recognition (OCR) engine to corresponding first bounding boxes and second bounding boxes based on a mapping criterion, classify the second bounding boxes corresponding to the columns by identifying an expression of interest in ones of the second bounding boxes, and generate purchase information by detecting and extracting text of interest from the structured receipt based on the classifications, wherein the purchase information includes purchased items listed in the receipt.

Example 18 includes the at least one non-transitory computer readable storage medium of example 17, wherein the regions of interest include (1) a receipt region corresponding to the receipt, and (2) a purchase region corresponding to an area of the receipt that includes information about the purchased items in the receipt.

Example 19 includes the at least one non-transitory computer readable storage medium of any of examples 17-18, wherein the first cropped image is the receipt region and the second cropped image is the purchase region.

Example 20 includes the at least one non-transitory computer readable storage medium of any of examples 17-19, wherein the first mask identifies ones of a plurality of pixels of the first cropped image as belonging to a first class or a second class.

Example 21 includes the at least one non-transitory computer readable storage medium of any of examples 17-20, wherein the first class is a text line and the second class is background.

Example 22 includes the at least one non-transitory computer readable storage medium of any of examples 17-21, wherein the second mask identifies ones of a plurality of pixels of the second cropped image as belonging to a first class or a second class.

Example 23 includes the at least one non-transitory computer readable storage medium of any of examples 17-22, wherein the first class is a column and the second class is another class.

Example 24 includes the at least one non-transitory computer readable storage medium of any of examples 17-23, wherein the instructions, when executed, cause the processor circuitry to merge a first one of the first bounding boxes and a second one of the first bounding boxes based on a row connection criterion, the first one and the second one of the first bounding boxes to satisfy a length criterion.

Example 25 includes the at least one non-transitory computer readable storage medium of any of examples 17-24, wherein the instructions, when executed, cause the processor circuitry to merge a first one of the second bounding boxes and a second one of the second bound boxes based on a column connection criterion.

Example 26 includes the at least one non-transitory computer readable storage medium of any of examples 17-25, wherein the expression of interest corresponds to a targeted fact.

Example 27 includes the at least one non-transitory computer readable storage medium of any of examples 17-26, wherein the targeted fact includes at least one of an item description, a quantity, or a price.

Example 28 includes the at least one non-transitory computer readable storage medium of any of examples 17-27, wherein the instructions, when executed, cause the processor circuitry to the purchase information includes purchase details and promotion information, and wherein the processor circuitry is to execute the machine readable instructions to remove words from the first bounding boxes that do not correspond to the classification of respective second bounding boxes prior to generating the purchase details.

Example 29 includes the at least one non-transitory computer readable storage medium of any of examples 17-28, wherein the purchase details include, for ones of the purchased products in the receipt, a product description, a price, and a quantity.

Example 30 includes the at least one non-transitory computer readable storage medium of any of examples 17-29, wherein the instructions, when executed, cause the processor circuitry to transmit the purchase details to decoding circuitry.

Example 31 includes the at least one non-transitory computer readable storage medium of any of examples 17-30, wherein the instructions, when executed, cause the processor circuitry to generate the promotion information by determining whether an item is associated with a promotion, in response to determining the item is associated with the promotion: identifying a first price associated with the item, the first price corresponding to a price column, identifying a second price associated with the item, the second price corresponding to the promotion, and calculating a third price based on the first price and the second price.

Example 32 includes the at least one non-transitory computer readable storage medium of any of examples 17-31, wherein the first price is an original price of the item, the second price is a discount amount, and the third price is the price paid for the item.

Example 33 includes a method comprising cropping, by executing machine readable instructions with at least one processor, an image of a receipt based on detected regions of interest, applying, by executing machine readable instructions with the least one processor, a first mask to a first cropped image of the receipt to generate first bounding boxes, the first bounding boxes corresponding to rows of the receipt, applying, by executing machine readable instructions with the least one processor, a second mask to a second cropped image of the receipt to generate second bounding boxes, the second bounding boxes corresponding to columns of the receipt, generating, by executing machine readable instructions with the least one processor, a structure of the receipt by mapping words detected by an optical character recognition (OCR) engine to corresponding first bounding boxes and second bounding boxes based on a mapping criterion, classifying, by executing machine readable instructions with the least one processor, the second bounding boxes corresponding to the columns by identifying an expression of interest in ones of the second bounding boxes, and generating, by executing machine readable instructions with the least one processor, purchase information by detecting and extracting text of interest from the structured receipt based on the classifications, wherein the purchase information includes purchased products listed in the receipt.

Example 34 includes the method of example 33, wherein the regions of interest include (1) a receipt region corresponding to the receipt, and (2) a purchase region corresponding to an area of the receipt that includes information about the purchased products in the receipt.

Example 35 includes the method of any of examples 33-34, wherein the first cropped image is the receipt region and the second cropped image is the purchase region.

Example 36 includes the method of any of examples 33-35, wherein the first mask identifies ones of a plurality of pixels of the first cropped image as belonging to a first class or a second class.

Example 37 includes the method of any of examples 33-36, wherein the first class is a text line and the second class is background.

Example 38 includes the method of any of examples 33-37, wherein the second mask identifies ones of a plurality of pixels of the second cropped image as belonging to a first class or a second class.

Example 39 includes the method of any of examples 33-38, wherein the first class is a column and the second class is another class.

Example 40 includes the method of any of examples 33-39, further including merging a first one of the first bounding boxes and a second one of the first bounding boxes based on a row connection criterion, the first one and the second one of the first bounding boxes to satisfy a length criterion.

Example 41 includes the method of any of examples 33-40, further including merging a first one of the second bounding boxes and a second one of the second bound boxes based on a column connection criterion.

Example 42 includes the method of any of examples 33-41, wherein the expression of interest corresponds to a targeted fact.

Example 43 includes the method of any of examples 33-42, wherein the targeted fact includes at least one of a product description, a quantity, or a price.

Example 44 includes the method of any of examples 33-43, wherein the purchase information includes purchase details and promotion information, the method further including removing words from the first bounding boxes that do not correspond to the classification of respective second bounding boxes prior to generating the purchase details.

Example 45 includes the method of any of examples 33-44, wherein the purchase details include, for ones of the purchased products in the receipt, a product description, a price, and a quantity.

Example 46 includes the method of any of examples 33-45, further including transmitting the purchase details to decoding circuitry.

Example 47 includes the method of any of examples 33-46, wherein the generating the promotion information includes determining whether a product is associated with a promotion, in response to determining the product is associated with the promotion: identifying a first price associated with the product, the first price corresponding to a price column, identifying a second price associated with the product, the second price corresponding to the promotion, and calculating a third price based on the first price and the second price.

Example 48 includes the method of any of examples 33-47, wherein the first price is an original price of the product, the second price is a discount amount, and the third price is the price paid for the product.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   interface circuitry to obtain an image of a receipt;
   machine-readable instructions; and
   at least one processor circuit to be programmed by the machine-readable instructions to at least:
   cause generation of a first cropped image and a second cropped image based on the image of the receipt, the first and second cropped images based on regions of the receipt detected in the image;
   apply a first mask to the first cropped image to generate first bounding boxes, the first bounding boxes corresponding to rows of the receipt;
   apply a second mask to the second cropped image to generate second bounding boxes, the second bounding boxes corresponding to columns of the receipt;
   generate a structure of the receipt by mapping (a) words detected by an optical character recognition (OCR) engine to corresponding first bounding boxes based on a mapping criterion, and (b) ones of the words to respective ones of the second bounding boxes based on the mapping criterion;
   cause classification of the columns based on the ones of the words mapped to the respective ones of the second bounding boxes;
   extract purchase information from the structured receipt based on the classifications, the purchase information corresponding to products listed in the receipt, the products including a first product; and
   generate promotion information based on the first product being associated with a promotion by:
      identifying a first price associated with the first product, the first price corresponding to a first column, the first column classified as a price column;
      identifying a second price associated with the first product, the second price corresponding to the promotion; and
      determining a third price associated with the first product based on the first price and the second price.

2. The apparatus of claim 1, wherein the regions include (1) a receipt region, and (2) a purchase region, the purchase region corresponding to an area of the receipt that includes information about the products listed in the receipt.

3. The apparatus of claim 2, wherein the first cropped image is based on the receipt region and the second cropped image is based on the purchase region.

4. The apparatus of claim 1, wherein the first mask causes identification of first pixels of the first cropped image classified as belonging to a first class and second pixels of the first cropped image classified as belonging to a second class.

5. The apparatus of claim 4, wherein the first class is corresponds to a text line and the second class is corresponds to a background.

6. The apparatus of claim 1, wherein the second mask identifies of first pixels of the second cropped image classified as belonging to a first class and second pixels of the second cropped image classified as belonging to a second class.

7. The apparatus of claim 6, wherein the first class is corresponds to a column and the second class corresponds to another class.

8. The apparatus of claim 1, wherein one or more of the at least one processor circuit is to merge a first one of the first bounding boxes and a second one of the first bounding boxes based on a row connection criterion, the first one and the second one of the first bounding boxes to satisfy a length criterion.

9. The apparatus of claim 1, wherein one or more of the at least one processor circuit is to merge a first one of the second bounding boxes and a second one of the second bound boxes based on a column connection criterion.

10. The apparatus of claim 1, wherein one or more of the at least one processor circuit is to identify first words of the ones of the words assigned to the respective ones of the second bounding boxes that include a regular expression, the regular expression to correspond to a targeted fact.

11. The apparatus of claim 10, wherein the targeted fact includes at least one of a product description, a quantity, or a price.

12. The apparatus of claim 1, wherein the purchase information includes purchase details and promotion information, and wherein one or more of the at least one processor circuit is to;
   identify first ones of the words assigned to the first bounding boxes that do not correspond to a respective classification of a respective bounding box; and
   remove the first ones of the words from the first bounding boxes prior to extracting the purchase details.

13. The apparatus of claim 12, wherein the purchase details include, for respective ones of the products in the receipt, a respective product description, a respective price, and a respective quantity.

14. The apparatus of claim 13, wherein one or more of the at least one processor circuitry circuit is to cause decoding of the purchase details to decoding circuitry.

15. The apparatus of claim 1, wherein the first price is an original price of the first product, the second price is a discount amount, and the third price is a purchase price for the first product.

16. The apparatus of claim 1, wherein one or more of the at least one processor circuit is to apply a trained object detection model to the image to detect the regions.

17. At least one non-transitory computer readable storage medium comprising instructions that, when executed, to cause at least one processor circuit to at least:
cause generation of a first receipt region and a second receipt region based on an image of a receipt, the first and second receipt regions based on regions detected in the image;
apply a first mask to the first receipt region to generate first bounding boxes, the first bounding boxes corresponding to rows of the receipt;
apply a second mask to the second of the receipt region to generate second bounding boxes, the second bounding boxes corresponding to columns of the receipt;
form a structure of the receipt by (a) assigning words detected by an optical character recognition (OCR) engine to corresponding first bounding boxes based on a mapping criterion and (b) assigning ones of the words to respective ones of the second bounding boxes based on the mapping criterion;
cause classification of the the columns based on ones of the words assigned to the respective ones of the second bounding boxes;
extract purchase information from the structured receipt based on the classifications, the purchase information to include items listed in the receipt, the items to include a first item associated with a promotion; and
generate promotion information for the first item by:
identifying a first price associated with the first item, the first price corresponding identified from a first column classified as a price column;
identifying a second price associated with the first item, the second price corresponding to the promotion; and
determining a third price associated with the first item based on the first price and the second price.

18. The at least one non-transitory computer readable storage medium as defined in claim 17, wherein the instructions, are to cause one or more of the at least one processor circuit to merge a first one of the first bounding boxes and a second one of the first bounding boxes based on a row connection criterion, the first one and the second one of the first bounding boxes to satisfy a length criterion.

19. The at least one non-transitory computer readable storage medium as defined in claim 17, wherein the instructions cause one or more of the at least one processor circuit to apply a trained object detection model to the image to detect the regions.

20. An apparatus comprising:
means for generating row bounding boxes to generate row bounding boxes on an image based on a first mask, the first mask applied to a first region detected in the image, the row bounding boxes corresponding to rows of a receipt;
means for generating column bounding boxes to generate column bounding boxes on the image based on a second mask, the second mask to applied to a second region detected in the image, the column bounding boxes corresponding to columns of the receipt; and
means for extracting purchase information to:
generate a data structure to represent the receipt by (a) mapping words extracted from the image to respective ones of the row bounding boxes based on a mapping criterion and (b) mapping ones of the words to respective ones of the column bounding boxes based on the mapping criterion;
cause classification of the columns based on respective ones of the words mapped to the respective ones of the column bounding boxes, the columns including a price column;
extract purchase data from the data structure based on the classifications, the purchase data including a first product indicated in the receipt, the first product associated with a promotion; and
generate promotion data for the first product by:
identifying a first price associated with the first product, the first price identified from the price column;
identifying a second price associated with the first product, the second price corresponding to the promotion; and
determining a third price associated with the first product based on the first price and the second price.

* * * * *

UNITED STATES PATENT AND TRADEMARK OFFICE
CERTIFICATE OF CORRECTION

PATENT NO. : 12,327,425 B2
APPLICATION NO. : 17/710649
DATED : June 10, 2025
INVENTOR(S) : Yebes Torres et al.

Page 1 of 1

It is certified that error appears in the above-identified patent and that said Letters Patent is hereby corrected as shown below:

In the Claims

Column 82, Claim 6, Line 30, delete "identifies of first pixels" and insert --identifies first pixels--.

Column 83, Claim 14, Line 2, delete "circuitry".

Column 83, Claim 17, Line 21, delete "second of the receipt" and insert --second receipt--.

Column 83, Claim 17, Line 30, delete "the the" and insert --the--.

Signed and Sealed this
Twenty-ninth Day of July, 2025

Coke Morgan Stewart
*Acting Director of the United States Patent and Trademark Office*